United States Patent
Arbajian et al.

(10) Patent No.: US 12,073,300 B2
(45) Date of Patent: *Aug. 27, 2024

(54) SYSTEMS AND METHODS FOR POST-QUANTUM CRYPTOGRAPHY OPTIMIZATION

(71) Applicant: Wells Fargo Bank, N.A., San Francisco, CA (US)

(72) Inventors: Pierre Arbajian, Matthews, NC (US); Michael Erik Meinholz, Charlotte, NC (US); Andrew J. Garner, IV, State Road, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,760

(22) Filed: Jun. 16, 2023

(65) Prior Publication Data

US 2024/0119359 A1  Apr. 11, 2024

Related U.S. Application Data

(63) Continuation of application No. 17/819,017, filed on Aug. 11, 2022, now Pat. No. 11,727,310, which is a
(Continued)

(51) Int. Cl.
*G06N 20/00* (2019.01)
*G06N 5/04* (2023.01)
(Continued)

(52) U.S. Cl.
CPC ............... *G06N 20/00* (2019.01); *G06N 5/04* (2013.01); *H04L 9/0852* (2013.01);
(Continued)

(58) Field of Classification Search
CPC ........ G06N 20/00; G06N 5/04; H04L 9/0852; H04L 9/0891; H04L 9/3013; H04L 9/302
(Continued)

(56) References Cited

U.S. PATENT DOCUMENTS 5,764,765 A   6/1998   Phoenix et al.
5,915,025 A   6/1999   Taguchi et al.
(Continued)

FOREIGN PATENT DOCUMENTS

CN   101771619 A   7/2010
CN   102663278 A   9/2012
(Continued)

OTHER PUBLICATIONS

Prantl et al., "Benchmarking of Pre- and Post-Quantum Group Encryption Schemes with Focus on IoT," 2021 IEEE International Performance, Computing, and Communications Conference (IPCCC), Austin, TX, USA, 2021, pp. 1-10, doi: 10.1109/IPCCC51483.2021.9679365. (Year: 2021).*
(Continued)

*Primary Examiner* — Peter C Shaw
(74) *Attorney, Agent, or Firm* — K&L Gates LLP

(57) ABSTRACT

Systems, apparatuses, methods, and computer program products are disclosed for post-quantum cryptography (PQC). An example method includes receiving data. The example method further includes receiving a set of data attributes about the data. The set of data attributes comprises one or more sets of data environment data attributes that are each representative of a set of data environments associated with the data. The example method further includes receiving one or more sets of data environment threat data structures associated with one or more data environments in the one or more sets of data environments associated with the data. The example method further includes selecting one or
(Continued)

more cryptographic techniques for encrypting the data for at least the one or more data environments based on the set of data attributes, the one or more sets of data environment threat data structures, and a cryptograph optimization machine learning model.

20 Claims, 31 Drawing Sheets

Related U.S. Application Data continuation of application No. 16/777,362, filed on Jan. 30, 2020, now Pat. No. 11,449,799.

(51) Int. Cl.
*H04L 9/08* (2006.01)
*H04L 9/30* (2006.01)

(52) U.S. Cl.
CPC .......... *H04L 9/0891* (2013.01); *H04L 9/3013* (2013.01); *H04L 9/302* (2013.01)

(58) Field of Classification Search
USPC .......................................................... 706/12
See application file for complete search history.

(56) References Cited

U.S. PATENT DOCUMENTS

| | | | |
|---|---|---|---|
| 6,748,083 B2 | 6/2004 | Hughes et al. | |
| 7,171,557 B2 | 1/2007 | Kallahalla et al. | |
| 7,437,081 B2 | 10/2008 | Mitchell et al. | |
| 7,778,976 B2 | 8/2010 | D'Souza et al. | |
| 8,281,396 B2 | 10/2012 | Ali-Ahmad et al. | |
| 8,484,694 B2 | 7/2013 | Diebler et al. | |
| 8,490,188 B2 | 7/2013 | Kandek et al. | |
| 8,539,586 B2 | 9/2013 | Stephenson | |
| 8,811,613 B2 * | 8/2014 | Teruyama | H04L 9/0841 380/255 |
| 8,855,316 B2 * | 10/2014 | Wiseman | H04L 9/0855 380/278 |
| 8,925,093 B2 | 12/2014 | Ali-Ahmad et al. | |
| 9,258,322 B2 | 2/2016 | Kandek et al. | |
| 9,432,392 B2 | 8/2016 | Ali-Ahmad et al. | |
| 9,591,027 B2 | 3/2017 | Molloy et al. | |
| 9,613,099 B2 | 4/2017 | Molloy et al. | |
| 9,614,668 B1 | 4/2017 | Simmons et al. | |
| 9,621,594 B2 | 4/2017 | Kandek et al. | |
| 9,621,694 B2 | 4/2017 | Wong et al. | |
| 9,673,977 B1 | 6/2017 | Kalach | |
| 9,749,297 B2 | 8/2017 | Gvili | |
| 9,807,664 B1 * | 10/2017 | Ray | H04W 36/302 |
| 9,876,813 B2 | 1/2018 | Harutyunyan et al. | |
| 9,900,333 B2 | 2/2018 | Thakar et al. | |
| 9,916,455 B2 | 3/2018 | Kandek et al. | |
| 9,942,039 B1 | 4/2018 | Gutoski et al. | |
| 9,960,465 B2 | 5/2018 | Dudley et al. | |
| 10,003,457 B2 | 6/2018 | Hammon et al. | |
| 10,015,187 B2 | 7/2018 | Ali-Ahmad et al. | |
| 10,016,187 B2 | 7/2018 | Castro | |
| 10,021,140 B2 | 7/2018 | Molloy et al. | |
| 10,057,058 B2 | 8/2018 | Murakami et al. | |
| 10,089,489 B2 | 10/2018 | Goldfarb et al. | |
| 10,104,101 B1 | 10/2018 | Thakar et al. | |
| 10,108,801 B2 | 10/2018 | Shema et al. | |
| 10,116,443 B1 | 10/2018 | Kalach et al. | |
| 10,185,924 B1 | 1/2019 | McClintock et al. | |
| 10,229,274 B2 | 3/2019 | Kandek et al. | |
| 11,153,080 B1 * | 10/2021 | Nix | H04L 9/3093 |
| 2005/0138352 A1 | 6/2005 | Gauvreau et al. | |
| 2007/0014415 A1 | 1/2007 | Harrison et al. | |
| 2007/0046955 A1 | 3/2007 | Silverbrook | |
| 2007/0065154 A1 | 3/2007 | Luo et al. | |
| 2007/0076884 A1 | 4/2007 | Wellbrock et al. | |
| 2007/0143851 A1 | 6/2007 | Nicodemus et al. | |
| 2007/0144851 A1 | 6/2007 | Ginja et al. | |
| 2007/0195774 A1 | 8/2007 | Sherman et al. | |
| 2007/0260658 A1 | 11/2007 | Fiorentino et al. | |
| 2009/0228316 A1 | 9/2009 | Foley et al. | |
| 2010/0043081 A1 | 2/2010 | Kiayias et al. | |
| 2010/0175106 A1 | 7/2010 | Diebler et al. | |
| 2010/0175134 A1 | 7/2010 | Ali-Ahmad et al. | |
| 2010/0175135 A1 | 7/2010 | Kandek et al. | |
| 2011/0206204 A1 | 8/2011 | Sychev | |
| 2011/0213979 A1 | 9/2011 | Wiseman et al. | |
| 2012/0158725 A1 | 6/2012 | Molloy et al. | |
| 2012/0233700 A1 | 9/2012 | Ali-Ahmad et al. | |
| 2013/0263206 A1 * | 10/2013 | Nefedov | G06F 21/604 726/1 |
| 2014/0010234 A1 | 1/2014 | Patel et al. | |
| 2014/0068765 A1 | 3/2014 | Choi et al. | |
| 2014/0109169 A1 | 4/2014 | Kandek et al. | |
| 2014/0133652 A1 | 5/2014 | Oshida et al. | |
| 2014/0137228 A1 | 5/2014 | Shema et al. | |
| 2014/0268245 A1 | 9/2014 | Kawach et al. | |
| 2015/0106950 A1 | 4/2015 | Holman et al. | |
| 2015/0222765 A9 | 8/2015 | Kawach et al. | |
| 2016/0234009 A1 | 8/2016 | Li et al. | |
| 2016/0241396 A1 | 8/2016 | Fu et al. | |
| 2016/0330219 A1 | 11/2016 | Hasan | |
| 2016/0349626 A1 | 12/2016 | Matsumoto | |
| 2016/0359626 A1 | 12/2016 | Fu et al. | |
| 2016/0366094 A1 | 12/2016 | Mason et al. | |
| 2017/0104590 A1 | 4/2017 | Wang | |
| 2017/0155628 A1 | 6/2017 | Rohloff et al. | |
| 2017/0173262 A1 | 6/2017 | Veltz | |
| 2017/0214525 A1 | 7/2017 | Zhao et al. | |
| 2017/0230173 A1 | 8/2017 | Choi | |
| 2017/0250796 A1 | 8/2017 | Samid | |
| 2017/0324554 A1 | 11/2017 | Tomlinson et al. | |
| 2017/0346627 A1 | 11/2017 | Alleaume | |
| 2017/0353302 A1 | 12/2017 | Fernandez et al. | |
| 2018/0034804 A1 | 2/2018 | Steiner | |
| 2018/0046766 A1 | 2/2018 | Deonarine et al. | |
| 2018/0146004 A1 | 5/2018 | Belfiore et al. | |
| 2018/0176015 A1 | 6/2018 | Wang | |
| 2018/0176091 A1 | 6/2018 | Yoon et al. | |
| 2018/0295114 A1 | 10/2018 | Abdalla et al. | |
| 2018/0316492 A1 | 11/2018 | Ramachandran et al. | |
| 2018/0316694 A1 | 11/2018 | Thakar et al. | |
| 2018/0337899 A1 | 11/2018 | Becker et al. | |
| 2018/0357934 A1 | 12/2018 | Smith et al. | |
| 2019/0014126 A1 | 1/2019 | Sherkin et al. | |
| 2019/0036821 A1 | 1/2019 | Levy et al. | |
| 2019/0166128 A1 | 5/2019 | Kurian et al. | |
| 2019/0233060 A1 | 8/2019 | Moffat et al. | |
| 2019/0295050 A1 | 9/2019 | Chalkias | |
| 2019/0305955 A1 | 10/2019 | Verma et al. | |
| 2019/0319804 A1 * | 10/2019 | Mathew | G09C 1/00 |
| 2019/0349392 A1 | 11/2019 | Wetterwald et al. | |
| 2020/0084030 A1 | 3/2020 | Nendell | |
| 2020/0084222 A1 | 3/2020 | William et al. | |
| 2020/0106606 A1 | 4/2020 | Pontaza et al. | |
| 2020/0184017 A1 * | 6/2020 | Batra | G06F 16/95 |
| 2020/0320080 A1 | 10/2020 | Almasan et al. | |
| 2020/0320340 A1 | 10/2020 | Wentz | |
| 2020/0320543 A1 | 10/2020 | Carter | |
| 2020/0322141 A1 * | 10/2020 | Kinjo | H04L 9/0852 |
| 2020/0328886 A1 | 10/2020 | Newton et al. | |
| 2020/0402073 A1 * | 12/2020 | Tang | H04L 63/04 |
| 2021/0034349 A1 | 2/2021 | Hatakeyama et al. | |
| 2021/0042158 A1 | 2/2021 | Proud et al. | |
| 2021/0273792 A1 * | 9/2021 | Coady | H04L 9/0819 |
| 2021/0306144 A1 * | 9/2021 | Chen | H04L 9/3066 |
| 2021/0377026 A1 * | 12/2021 | Renes | G06F 7/5324 |
| 2022/0158855 A1 | 5/2022 | Wentz | |
| 2022/0173915 A1 * | 6/2022 | Gray | H04L 9/3247 |
| 2022/0321332 A1 * | 10/2022 | Linton | H04L 9/3093 |

FOREIGN PATENT DOCUMENTS

| | | |
|---|---|---|
| CN | 103095461 A | 5/2013 |
| CN | 106803784 A | 6/2017 |

(56) References Cited

FOREIGN PATENT DOCUMENTS

| CN | 106921674 A | * | 7/2017 | |
| CN | 106921674 A | | 7/2017 | |
| CN | 107292168 A | | 10/2017 | |
| CN | 108092771 A | * | 5/2018 | ............ H04B 10/70 |
| CN | 108092771 A | | 5/2018 | |
| CN | 108111301 A | | 6/2018 | |
| CN | 109150835 A | | 1/2019 | |
| CN | 112235112 A | | 1/2021 | |
| CN | 112236112 A | | 1/2021 | |
| EP | 3373505 A1 | | 9/2018 | |
| WO | 2015/078533 A1 | | 6/2015 | |
| WO | 2018/031940 A1 | | 2/2018 | |
| WO | 2018/177905 A1 | | 10/2018 | |

OTHER PUBLICATIONS

Karakaya et al., "A Review on Latest Developments in Post-Quantum Based Secure Blockchain Systems," 2023 11th International Symposium on Digital Forensics and Security (ISDFS), Chattanooga, TN, USA, 2023, pp. 1-6, doi: 10.1109/ISDFS58141.2023.10131840. (Year: 2023).*

Zhou et al., "A Survey on Post-Quantum Cryptography for 5G/6G Communications," 2023 IEEE International Conference on Service Operations and Logistics, and Informatics (SOLI), Singapore, 2023, pp. 1-6, doi: 10.1109/SOLI60636.2023.10425346. (Year: 2023).*

Samanta et al., "Proposal for Quantum Ciphertext-Policy Attribute-Based Encryption," arXiv:2203.10888, Mar. 21, 2022. (Year: 2022).*

"Informative Report: Quantum Computing Risks to the Financial Services Industry," Accredited Standards Committe X9, Inc., ASC X9 IR Jan. 2019, 54 pages, (2019).

A. Vambol, V. Kharchenko, 0. Polii and N. Bardis, "McEliece and Niederreiter Cryptosystems Analysis in the Context of Post-Quantum Network Security," 2017 Fourth International Conference on Mathematics and Computers in Sciences and in Industry (MCSI), 2017, pp. 134-137, doi: 10.1109/MCSI.2017.31. (Year: 2017).

Alkim et al., "Post-quantum Key Exchange—A New Hope," USENIX, 25th USENIX Security Symposium, Aug. 10-12, 2016, (Austin, TX, US), pp. 327-343, (2016).

Andrushkevych et al., "The block symmetric ciphers in the post-quantum period", 2016 Third International Scientific-Practical Conference Problems of Infocommunications Science and Technology (PIC S&T), Kharkiv, Ukraine, Oct. 2016, pp. 43-46.

ASC, "Quantum Techniques in Cryptographic Message Syntax (CMS)", Accredited Standards Committee X9, Inc., ASC X9 TR 50-2019, Jan. 20, 2019, 42 pages.

Barker, "Recommendation for Key Management, Part 1: General", NIST Special Publication 800-57 Pt 1., Rev. 4, National Institute of Standards and Technology, 160 pages, (2016).

Cordova et al., "Comparative analysis on the performance of selected security algorithms in cloud computing," 2017 International Conference on Electrical and Computing Technologies and Applications (ICECTA), 2017, pp. 1-4.

De Feo et al., "Towards Quantum-Resistant Cryptosystems from Supersingular Elliptic Curve Isogenies," International Workshop on Post-Quantum Cryptography, Springer, Berlin, Heidelberg, 2011, 24 pages.

Erickson et al., "Quantum Information Systems: The State of Post-Quantum Cryptography as a Means to Combat Shor's Algorithm Run on a Scalable Quantum Computer," 15 pages, (2018).

Facon et al., "Detecting cache-timing vulnerabilities in post-quantum cryptography algorithms," 3rd International Verification and Security Workshop (IVSW), IEEE, p. 7-12, (2018).

Farik et al., "The Need for Quantum-Resistant Cryptography in Classical Computers", 2016 3rd Asia-Pacific World Congress on Computer Science and Engineering (APWC on CSE), 2016, pp. 98-105.

Faruk et al., "A Review of Quantum Cybersecurity: Threats, Risks and Opportunities", 2022 1st International Conference on AI in Cybersecurity (ICAIC), Victoria, TX, USA, 2022, pp. 1-8.

Feng et al., "Big Data Adaptive Encryption Technology for Remote Network Storage," 2020 IEEE 3rd International Conference of Safe Production and Informatization (IICSPI), 2020, pp. 709-712.

Gorbenko et al., "Examining a Possibility to Use and the Benefits of Post-Quantum Algorithms Dependent on the Conditions of their Application," Eastern-European Journal of Enterprise Technologies, ISSN 1729-3774: 21-32 (2017).

Grote et al., "A Review of Post-quantum Cryptography and Crypto-agility Strategies", 2019 International Interdisciplinary PhD Workshop (IIPhDW), 2019, pp. 115-120.

Kabanov et al., "Practical cryptographic strategies in the post-quantum era", arXiv:1703.04285v3, Mar. 9, 2018, 5 pages.

Kindberg, Marcus, Master's Thesis: A usability study of post-quantum algorithms, Jun. 13, 2017.

Kofahi et al., "Performance evaluation of three encryption/decryption algorithms", 2003 46th Midwest Symposium on Circuits and Systems, vol. 2, Cairo, Egypt, 2003, pp. 790-793.

Lauterbach et al., "Performance Analysis of Post-Quantum Algorithms," 2021 29th Telecommunications Forum (TELFOR), 2021, pp. 1-4, doi: 10.1109/TELFOR52709.2021.9653313. (Year: 2021).

Liu et al., "Securing Edge Devices in the Post-Quantum Internet of Things Using Lattice-Based Cryptography", IEEE Communications Magazine, vol. 56, No. 2, Feb. 2018, pp. 158-162.

Louridas et al., "Privacy-Enhancing Cryptography in Distributed Ledgers," DS-06-2017: Cybersecurity PPP: Cryptography, Priviledge, Jan. 2018, 27 pages.

Moody et al. "Cryptographic Standards in the Post-Quantum Era", in IEEE Security & Privacy, vol. 20, No. 6, Nov.-Dec. 2022, pp. 66-72.

Moody et al., "Securing Tomorrow's Information Through Post-Quantum Cryptography," ITL Bulletin, Information Technology Laboratory, 4 pages, (2018).

Nejatollahi H, Dutt N, Ray S, Regazzoni F, Banerjee I, Cammarota R. Post-quantum lattice-based cryptography implementations: A survey. ACM Computing Surveys (CSUR). Jan. 28, 2019; 51(6):M1. (Year: 2019).

Ott et al., Identifying research challenges in post quantum cryptography migration and cryptographic agility, Jan. 31, 2019.

Pugh et al., "Systematic Testing of Post-Quantum Cryptographic Implementations Using Metamorphic Testing", 2019 IEEE/ACM 4th International Workshop on Metamorphic Testing (MET), 2019, 7 pages.

Ribeiro et al., "'Why Should I Trust You?' Explaining the Predictions of Any Classifier," KOO, San Francisco, CA, USA, 10 pages, (2016).

Taha et al., "Implementation Attacks on Post-Quantum Cryptographic Schemes," IACR Cryptology ePrint Archive, 2015, 14 pages.

Zeydan et al., "Recent Advances in Post-Quantum Cryptography for Networks: A Survey", 2022 Seventh International Conference on Mobile and Secure Services (MobiSecServ), 2022, pp. 1-8.

Zhao et al., "Providing adaptive quality of security in quantum networks," 2015 11th International Conference on Heterogeneous Networking for Quality, Reliability, Security and Robustness (QSHINE), 2015, pp. 440-445.

* cited by examiner

1020

Set of PQC Performance Attributes 1022

| id | Alogrithm/Sig User | Variant Name | Operat | Iteratic | Total ti | Time (us) | pop. St | CPU cycles | pop. Stde | RAM Us | Run Group |
|---|---|---|---|---|---|---|---|---|---|---|---|
| 1547678762 | Dilithium_II_medium | SIG1_FUNC3 | keygen | 3221882 | 5 | 1.552 | 8.144 | 2411 | 12213 | 2.55 | Run_47678762 |
| 1547678762 | Dilithium_II_medium | SIG1_FUNC3 | encaps | 3467266 | 5 | 1.442 | 2.741 | 2242 | 4297 | 2.55 | Run_47678762 |
| 1547678762 | Dilithium_II_medium | SIG1_FUNC3 | decaps | 3493977 | 5 | 1.431 | 1.965 | 2226 | 3007 | 2.55 | Run_47678762 |
| 1547678777 | Dilithium_III_recommend | SIG1_FUNC3 | keygen | 3584018 | 5 | 1.395 | 2.734 | 2168 | 4298 | 2.55 | Run_47678777 |
| 1547678777 | Dilithium_III_recommend | SIG1_FUNC3 | encaps | 3315020 | 5 | 1.508 | 2.223 | 2342 | 3408 | 2.55 | Run_47678777 |
| 1547678777 | Dilithium_III_recommend | SIG1_FUNC3 | decaps | 3570576 | 5 | 1.4 | 3.721 | 2176 | 5907 | 2.55 | Run_47678777 |
| 1547678793 | Dilithium_IV_very_high | SIG1_FUNC3 | keygen | 3678008 | 5 | 1.359 | 3.891 | 2108 | 6191 | 2.55 | Run_47678793 |
| 1547678793 | Dilithium_IV_very_high | SIG1_FUNC3 | encaps | 3417050 | 5 | 1.463 | 2.238 | 2266 | 3442 | 2.55 | Run_47678793 |
| 1547678793 | Dilithium_IV_very_high | SIG1_FUNC3 | decaps | 3588007 | 5 | 1.394 | 7.35 | 2160 | 11788 | 2.55 | Run_47678793 |
| 1547678573 | Dilithium_128 | SIG1_FUNC3 | keygen | 4771904 | 5 | 1.048 | 3.281 | 1600 | 5202 | 2.55 | Run_47678573 |
| 1547678573 | Dilithium_128 | SIG1_FUNC3 | encaps | 5213571 | 5 | 0.959 | 7.345 | 1466 | 11785 | 2.55 | Run_47678573 |
| 1547678573 | Dilithium_128 | SIG1_FUNC3 | decaps | 5401589 | 5 | 0.926 | 1.539 | 1415 | 2356 | 2.55 | Run_47678573 |
| 1547678589 | Dilithium_160 | SIG1_FUNC3 | keygen | 5304577 | 5 | 0.943 | 3.134 | 1441 | 4982 | 2.55 | Run_47678589 |
| 1547678589 | Dilithium_160 | SIG1_FUNC3 | encaps | 5274408 | 5 | 0.948 | 6.065 | 1449 | 9713 | 2.55 | Run_47678589 |
| 1547678589 | Dilithium_160 | SIG1_FUNC3 | decaps | 5262516 | 5 | 0.95 | 1.913 | 1451 | 2962 | 2.55 | Run_47678589 |

Set of PQC Cryptographic Techniques 1024

FIG. 10C

SYSTEMS AND METHODS FOR POST-QUANTUM CRYPTOGRAPHY OPTIMIZATION

CROSS REFERENCE TO RELATED APPLICATIONS

The present application is a continuation application of U.S. patent application Ser. No. 17/819,017, filed Aug. 11, 2022, which is a continuation application of U.S. patent application Ser. No. 16/777,362, filed Jan. 30, 2020, both of which are hereby incorporated by reference in their entirety.

TECHNOLOGICAL FIELD

Example embodiments of the present disclosure relate generally to cryptography and, more particularly, to systems and methods for providing post-quantum cryptography (PQC).

BACKGROUND

Although still in its infancy, quantum computing and its boundless potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. This massive parallelism allows quantum computers to perform incredibly complex calculations at speeds unimaginable today and solve certain classes of problems that are beyond the capability of today's most powerful supercomputers.

Reflecting this broad potential impact, companies from a variety of market sectors are investing substantial resources to develop these promising quantum computing theories into real-world quantum computing capabilities. However, this heightened interest and investment has yet to produce an enduring and functional quantum computer outside of a laboratory environment.

Nonetheless, there is widespread agreement among experts that quantum computers will disrupt current security protocols that protect global financial markets and governmental institutions. For example, most common public-key cryptography schemes, such as the widely-used Rivest-Shamir-Adleman (RSA) and Diffie-Hellman (DH) schemes, rely on the inability of classical computers to complete certain types of complex mathematical calculations, such as integer factorization and discrete logarithm computation, respectively, within a reasonable amount of time. A quantum computer implementing Shor's algorithm potentially could complete these complex calculations in a relatively short time and thereby determine the private keys used for current public-key systems from the corresponding public keys. Accordingly, there is an urgent need for data owners and hosting services to begin migrating their data and upgrading their systems to use quantum-resistant algorithms before quantum computing capabilities are realized. However, the sheer volume of this data and complexity of these systems presents myriad challenges to any such migration plan.

BRIEF SUMMARY

Computing systems, computing apparatuses, computer-implemented methods, and computer program products are disclosed herein for improved post-quantum cryptography (PQC) for migrating classical information systems to quantum-resistant systems using one or more of the PQC cryptographic techniques described herein. In some embodiments, the PQC system provided herein solves the above problems by selecting an encryption technique for encrypting the data, a set of data attributes about the data that includes a set of data environment data attribute indicative of a set of data environments associated with the data, and PQC cryptographic performance information associated with a set of PQC cryptographic techniques.

In one example embodiment, a system is provided for post-quantum cryptography (PQC). The system may comprise communications circuitry configured to receive data; receive a set of data attributes about the data; and receive one or more sets of data environment threat data structures associated with one or more data environments in the one or more sets of data environments associated with the data. The set of data attributes comprises one or more sets of data environment data attributes that are each representative of a set of data environments associated with the data. The system may further comprise cryptographic technique selection circuitry configured to select one or more cryptographic techniques for encrypting the data for at least the one or more data environments based at least on the set of data attributes, the one or more sets of data environment threat data structures, and a cryptograph optimization machine learning model. The system may further comprise cryptograph optimization circuitry configured to train the cryptograph optimization machine learning model based on a set of cryptograph optimization training data. The set of cryptograph optimization training data comprises cryptographic performance information. The system may further comprise cryptographic circuitry configured to encrypt the data based on the one or more encryption techniques.

In one example embodiment, an apparatus is provided for post-quantum cryptography (PQC). The apparatus may comprise communications circuitry configured to receive data; receive a set of data attributes about the data; and receive one or more sets of data environment threat data structures associated with one or more data environments in the one or more sets of data environments associated with the data. The set of data attributes comprises one or more sets of data environment data attributes that are each representative of a set of data environments associated with the data. The apparatus may further comprise cryptographic technique selection circuitry configured to select one or more cryptographic techniques for encrypting the data for at least the one or more data environments based at least on the set of data attributes, the one or more sets of data environment threat data structures, and a cryptograph optimization machine learning model. The apparatus may further comprise cryptograph optimization circuitry configured to train the cryptograph optimization machine learning model based on a set of cryptograph optimization training data. The set of cryptograph optimization training data comprises cryptographic performance information. The apparatus may further comprise cryptographic circuitry configured to encrypt the data based on the one or more encryption techniques.

In one example embodiment, a method is provided for post-quantum cryptography (PQC). The method may comprise receiving data. The method may further comprise receiving a set of data attributes about the data. The set of data attributes comprises one or more sets of data environment data attributes that are each representative of a set of data environments associated with the data. The method may further comprise receiving one or more sets of data environment threat data structures associated with one or more data environments in the one or more sets of data environments associated with the data. The method may further comprise selecting one or more cryptographic techniques for encrypting the data for at least the one or more data environments based on the set of data attributes, the one or more sets of data environment threat data structures, and a cryptograph optimization machine learning model. The method may further comprise training the cryptograph optimization machine learning model based on a set of cryptograph optimization training data. The set of cryptograph optimization training data comprises cryptographic performance information. The method may further comprise encrypting the data based on the one or more encryption techniques.

In another example embodiment, a computer program product is provided for post-quantum cryptography (PQC), the computer program product comprising at least one non-transitory computer-readable storage medium storing program instructions that, when executed, cause a system to receive data. The program instructions, when executed, may further cause the system to receive a set of data attributes about the data, wherein the set of data attributes comprises one or more sets of data environment data attributes that are each representative of a set of data environments associated with the data. The program instructions, when executed, may further cause the system to receive one or more sets of data environment threat data structures associated with one or more data environments in the one or more sets of data environments associated with the data. The program instructions, when executed, may further cause the system to select one or more cryptographic techniques for encrypting the data for at least the one or more data environments based on the set of data attributes, the one or more sets of data environment threat data structures, and a cryptograph optimization machine learning model. The program instructions, when executed, may further cause the system to train the cryptograph optimization machine learning model based on a set of cryptograph optimization training data, wherein the set of cryptograph optimization training data comprises cryptographic performance information. The program instructions, when executed, may further cause the system to encrypt the data based on the one or more encryption techniques.

BRIEF DESCRIPTION OF THE FIGURES

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

FIGS. 10A, 10B, and 10C illustrate example PQC system architectures configured to perform various operations in accordance with some example embodiments described herein;

DETAILED DESCRIPTION

Figure 1:
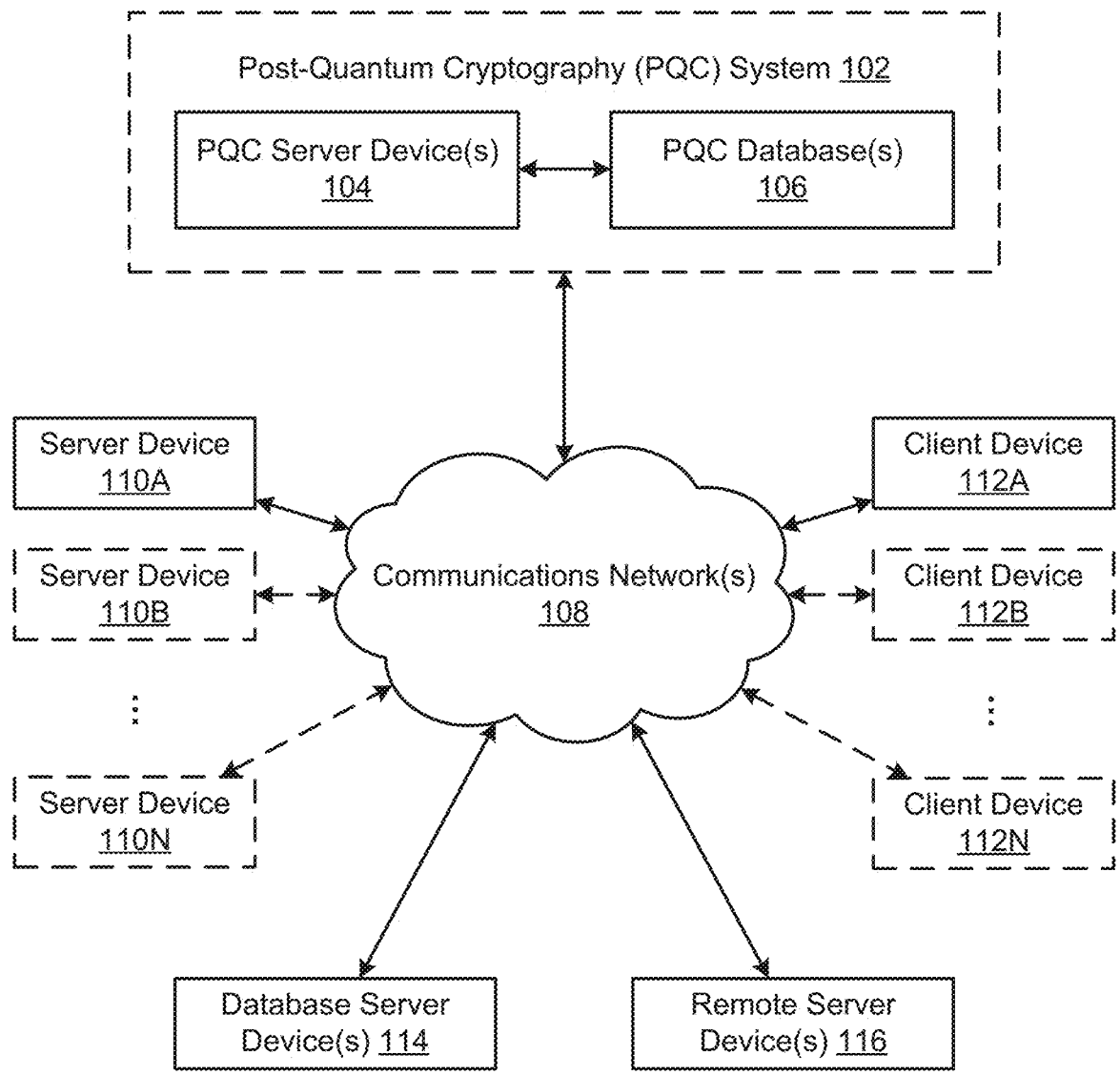
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for migrating classical information systems to quantum-resistant information systems using one or more of the PQC cryptographic techniques described herein. Traditionally, data owners and third-party hosting services use hybrid cryptosystems to safeguard the confidentiality, integrity, and authenticity of enormous volumes of protected data and complex IT systems. These hybrid cryptosystems typically use a combination of asymmetric cryptography (e.g., public key cryptography), such as the Rivest-Shamir-Adleman (RSA) cryptosystem, and symmetric cryptography (e.g., secret key cryptography), such as the Advanced Encryption Standard (AES). One example of a modern hybrid cryptosystem is the Transport Layer Security (TLS) protocol, which relies on asymmetric cryptography for authentication and key management to establish session keys, and symmetric cryptography for session encryption and integrity validation.

However, these cryptosystems are vulnerable to quantum algorithms implemented on quantum computers. For instance, asymmetric encryption, key exchange, and digital signature rely on mathematical problems such as the integer factorization problem (e.g., as used in RSA) and the discrete logarithm problem (e.g., as used in Digital Signature Algorithm (DSA), Elliptic Curve DSA (ECDSA), Diffie-Hellman (DH), and Elliptic Curve DH (ECDH)). It is widely believed that a large-scale fault tolerant quantum computer could effectively break modern public key cryptosystems by solving instances of the integer factorization problem and the discrete logarithm problem quickly enough that keys reverse engineered based on those solutions would still be valid.

In one illustrative example, a quantum computer implementing Shor's algorithm could determine the private keys used for current public-key systems in a relatively short time because Shor's algorithm provides a faster cryptanalysis method for solving integer factorization than a brute force method (e.g., guessing prime numbers). For instance, Shor's algorithm uses the quantum Fourier transform (QFT) instead of its slower classical counterpart, the fast Fourier transform (FFT). Further, Shor's algorithm can be modified to compute discrete logarithms, including discrete logarithms used for elliptic-curve cryptography (ECC).

In another illustrative example, a quantum computer implementing Grover's algorithm could effectively perform an exhaustive key search because Grover's algorithm provides quadratic speedup and thereby could brute-force attack an N-bit symmetric cryptographic key in only about $2^{(N/2)}$ iterations. In some instances, for symmetric cryptographic techniques that support a doubled key length (e.g., AES supports doubling a 128-bit key to 256 bits), doubling the key length of the symmetric cryptographic key may provide sufficient protection against Grover's algorithm because a brute-force attack on a 2N-bit symmetric cryptographic key would require about $2^N$ iterations. For example, a 256-bit symmetric cryptographic key (e.g., AES-256) may only provide 128 bits of security in a quantum computing environment. However, any migration plan that involves doubling the key length of the symmetric cryptographic key must also evaluate the impact of the doubled key length on the performance of related applications and the additional requirements of computational resources.

Although quantum computers capable of such feats are still believed to be several years away, the threat of a "harvest now and decrypt later attack" makes quantum computing an immediate real threat, even if the threat will not be actionable until a sufficiently robust quantum computer is developed in the future. The "harvest now and decrypt later attack" is a long-game attack where a bad actor scrapes, collects, or harvests (e.g., records and stores) encrypted data, such as data streaming through the Internet or cloud, by the way of breaches or passive interception and then hoard the encrypted data, waiting for the day when quantum computers can determine the cryptographic keys to the harvested data. This bad actor could be storing data to or from a specific website, server, email client, or other target of attack or, given sufficient motivation and resources, recording petabytes of data each hour from general internet traffic. Once quantum computers are capable of determining the cryptographic keys associated with the harvested encrypted data, the bad actor might use those cryptographic keys to decrypt the previously encrypted data. For instance, persistent data, such as mortgage information and financial records, encrypted or digitally signed with today's cryptographic algorithms will be at risk even if the necessary quantum computing technology is not available for seven to ten years or even later. Subsequently, with advancements in artificial intelligence and machine learning and the exponential increase in data processing compute power, a bad actor could attack a data vault to extract meaningful information from the decrypted petabytes of data.

These risks are amplified by the lengthy data retention requirements (e.g., security shelf-life) mandated by government agencies, such as the U.S. Federal Deposit Insurance Corporation (FDIC). Example data retention requirements for various classes of data records listed in the FDIC's Records Retention Schedule are shown below in Table 1.

TABLE 1

Example data retention requirements for various classes of data records listed in the FDIC's Records Retention Schedule.

| Record Class | Data Retention Requirement (also referred to as "security shelf-life") |
|---|---|
| Tax Information | 7 years |
| Mortgages | 30 Years |

TABLE 1-continued

Example data retention requirements for various classes of data records listed in the FDIC's Records Retention Schedule.

| Record Class | Data Retention Requirement (also referred to as "security shelf-life") |
| --- | --- |
| Auto Loans | 6 years |
| Equal Credit Opportunity Act | 25 months |
| Truth in Lending Act | 2 years |
| Bank Secrecy Act | 5 years |
| FDIC Activities | Permanent |
| Personnel Management (PER4100) | 56 years |
| Non-Judicial Matters (LAW1330) | Close of Matter + 10 years |
| Judicial Matters (LAW1400) | Entry of Criminal Restitution + 20 years |

Given that data is a highly valuable asset, especially in the financial industry, there is an urgent need for data owners and hosting services to initiate the process of protecting their valuable customer information and digital assets even before quantum computing capabilities are realized. This process primarily involves migrating data and systems to algorithms that are thought to be quantum-resistant. In an attempt to promulgate quantum-resistant algorithms, the National Institute of Standards and Technology (NIST), a federal agency within the U.S. Department of Commerce, has initiated the NIST Post-Quantum Cryptography Standardization Process to solicit, evaluate, and standardize one or more quantum-resistant public-key cryptographic algorithms. At present, there are many different candidate cryptographic algorithms believed to be quantum-resistant. However, because the standardization process is not yet complete, migration of classical systems to any one of NIST's candidate cryptographic algorithms could later compound the computational and resource burden on data owners and hosting services if NIST does not select that particular cryptographic algorithm as the standard or makes changes to the proposed cryptographic algorithms.

Although some quantum-resistant cryptographic algorithms are available today, those algorithms may not be the algorithm, or a variant of the algorithm, that eventually is approved as part of the NIST Post-Quantum Cryptography Standardization Process. Moreover, the adoption of these algorithms will, in some instances, be an overly complex and time-consuming process. First, this migration process is challenging due to the sheer volume of data consumed by these systems, as well as the general complexity of the systems. For example, financial services providers and their partners each may have data for millions of customers and trillions of transactions stored in various databases. In addition, these providers are processing millions of transactions on a daily basis and adding new customer data to their systems. Second, data is stored in more places than ever before and must be encrypted using different cryptographic keys depending upon whether the data is going to be protected while in transit, while at rest in-cloud, or while at rest on-premises. Governmental regulations, NIST recommendations, and industry standards and best practices will, in some instances, drive the cryptographic techniques that are used to encrypt the data. Third, many organizations use several types of encryption, hashing, and other cryptographic algorithms with varying security architecture depending on the needs of the data owner or hosting service.

Fourth, as shown in Table 1 above, there is the need to protect data for varying durations to manage legal and regulatory risk, sometimes as long as twenty to thirty years, and even in some cases for over fifty years. Fifth, the deployment of fundamental changes to infrastructure might take a decade or more, and there is very little tolerance for incurring risk while deploying changes. All of these considerations introduce additional levels of complexity, and thus data owners and hosting services must methodically migrate their cryptographic infrastructure to quantum-resistant cryptography. In addition, the cryptography transition is challenging because it is not restricted only to algorithms and key lengths. Rather, the cryptography transition is impacted by several other details of security infrastructure, such as interoperability, integration with existing systems and security architectures, scalability, compliance and regulatory requirements, maintenance, and backward compatibility requirements.

In contrast to conventional cryptographic systems, the present disclosure relates to a post-quantum cryptography (PQC) system that mitigates the vulnerability of traditional cryptographic algorithms by providing techniques for migrating enormous volumes of data and complex IT systems to PQC technologies and platforms that are not vulnerable to attack by a quantum computer. The term "PQC" refers to cryptosystems which are, or are considered to be, resistant to attacks that use a quantum computer for cryptanalysis. In some embodiments, PQC cryptographic techniques include PQC communications channel-based cryptographic techniques, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, other suitable techniques, and combinations thereof (e.g., combinations of PQC communications channel-based cryptographic techniques with hash-based, lattice-based, isogeny-based, code-based, multivariate-based, or zero-knowledge proof PQC cryptographic techniques).

Hash-based PQC cryptographic techniques (e.g., hash-based PQC cryptographic signatures) are suitable for one-time use, wherein a tuning parameter provides a trade-off between signature size and key generation, signing, and verification speed, and can be can be used with any secure hashing function. Hash-based PQC cryptographic techniques may be used to provide digital signatures, such as Leighton-Micali Signature (LMS), eXtended Merkle Signature Scheme (XMSS), and SPHINCS+.

Lattice-based PQC cryptographic techniques are based on the shortest vector problem, the leading replacement for prime factorization and discrete logarithm, and typically are less computationally resource intensive in relation to isogeny-based and other PQC cryptographic techniques. In some instances, lattice-based PQC cryptographic techniques may be used to provide digital signatures, such as Dilithium and qTESLA. In some instances, lattice-based PQC cryptographic techniques may be used to provide key exchange by key encapsulation, such as NewHope, Frodo Key-Encapsulation Mechanisms (FrodoKEM), Nth degree-Truncated polynomial Ring Units (NTRU) Prime, and Kyber. In some instances, lattice-based PQC cryptographic techniques may be used to provide key exchange by key agreement, such as NewHope Classic, Frodo Diffie-Hellman (FrodoDH), and Ring Learning With Errors Key EXchange (RLWE-KEX).

Isogeny-based PQC cryptographic techniques use very small keys and typically are more computationally resource intensive in relation to lattice-based and other PQC cryptographic techniques. In some instances, isogeny-based PQC cryptographic techniques may be used to provide key exchange by key encapsulation, such as Supersingular Isogeny Key Encapsulation (SIKE). In some instances, isogeny-based PQC cryptographic techniques may be used to provide key exchange by key agreement, such as Supersingular isogeny Diffie-Hellman (SIDH) key exchange.

Code-based PQC cryptographic techniques use very large key sizes yet are typically the fastest PQC cryptographic techniques at the comparable security level (e.g., extremely fast in encryption and reasonably fast in decryption). In some instances, code-based PQC cryptographic techniques may be used to provide key exchange by key encapsulation, such as Classic McEliece, McEliece Quasi-Cyclic Moderate Density Parity Check (QC-MDPC), and Bit Flipping Key Encapsulation (BIKE).

Multivariate-based PQC cryptographic techniques use small public keys and fast verification yet, in some instances, are less efficient than other PQC cryptographic techniques. Multivariate-based PQC cryptographic techniques may be used to provide digital signatures, such as Rainbow.

Zero-knowledge proof PQC cryptographic techniques use very small key pairs and derive their security entirely from the security of symmetric-key primitives and are believed to be quantum-secure. In some instances, zero-knowledge proof PQC cryptographic techniques may be used to provide digital signatures, such as Picnic.

In some embodiments, the PQC system may retrieve one or more of the hash-based PQC cryptographic techniques, lattice-based PQC cryptographic techniques, isogeny-based PQC cryptographic techniques, code-based PQC cryptographic techniques, multivariate-based PQC cryptographic techniques, and zero-knowledge proof PQC cryptographic techniques from a remote server or data storage device, such as the ISARA toolkit, the libOQS library, the libpqcrypto library, or a combination thereof.

PQC communications channel-based cryptographic techniques use PQC communications channels to secure transmission of sensitive or confidential message data, such as Society for Worldwide Interbank Financial Telecommunication (SWIFT) messages, International Organization for Standardization (ISO) 8583 messages, ISO 20022 messages, Internet of Things (IoT) data, Health Insurance Portability and Accountability Act (HIPAA) data (e.g., electronic medical records, protected health information), copyrighted content (e.g., electronic media, digital rights management (DRM)-protected data files), and other suitable messages. For example, the PQC system may be configured to implement a PQC communications protocol that transmits a first portion of an electronic communication (e.g., message overhead data such as protocol overhead, header data, metadata) to a client device over a first classical communications channel (e.g. non-PQC communications channel) and transmits a second portion of the electronic communication (e.g., message payload data) to the client device over a second classical communications channel (e.g., a PQC back channel such as a PQC out-of-band communications channel). In some embodiments, the first classical communications channel and the second classical communications channel may utilize different classical communications channels (e.g., different communications networks, communications lines, communications circuitry, or a combination thereof). In some embodiments, the first classical communications channel and the second classical communications channel may utilize the same classical communications circuitry (e.g., the same communications network, lines, hardware, infrastructure) but a different protocol, communications mechanism, network connector, or combination thereof. For example, the PQC system may implement the non-PQC communications channel as an in-band communications channel and the PQC communications channel as an out-of-band communications channel using the same communications infrastructure.

In one illustrative example, the electronic communication may be a SWIFT message, the first portion of an electronic communication may comprise SWIFT message overhead data, and the second portion of an electronic communication may comprise SWIFT message payload data. In another illustrative example, the first portion of the electronic communication may comprise a cryptographic data attribute indicative of a symmetric cryptographic technique, and the second portion of the electronic communication may comprise a symmetric cryptographic key, such as an AES symmetric cryptographic key. The PQC system may be configured to authenticate a session (e.g., perform a cryptographic handshake) with the client device over the non-PQC communications channel based on the symmetric cryptographic key that was transmitted to the client device, or a PQC add-on device coupled to the client device, over the PQC communications channel.

In yet another illustrative example, the first portion of the electronic communication may comprise a PQC indicator data structure that identifies the PQC communications channel and indicates that a second portion of the electronic communication is to be transmitted over a PQC communications channel. The PQC indicator data structure may comprise a link or pointer to the PQC communications channel, a header that identifies the PQC communications channel as being out-of-band, other identification and routing information, or a combination thereof. In some embodiments, the PQC indicator data structure may comprise a link to the second portion of the electronic communication. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a PQC flag value. In another example, the PQC indicator data structure may comprise a link to a PQC electronic agreement (e.g., a bilateral agreement between the PQC system and the client device to exchange confidential or sensitive data over a PQC communications channel) comprising the PQC indicator data structure.

In some embodiments, the PQC indicator data structure may comprise a link to a PQC shim configured to allow communication with the PQC system (e.g., via PQC callback circuitry comprised by the PQC system) over the PQC communications channel. For example, the PQC indicator data structure may further comprise a PQC shim automatic installation control signal indicative of an electronic instruction for the client device to automatically install the PQC shim based on the link. In another example, the PQC indicator data structure may further comprise a PQC shim manual installation control signal indicative of an electronic instruction for the client device to manually install the PQC shim based on the link. In another example, the first portion of the electronic communication may comprise a PQC smart contract comprising the PQC indicator data structure.

In some embodiments, the first portion of the electronic communication may comprise a PQC request data structure (e.g., a request for an acknowledgment or confirmation that the client device is configured to communicate over a PQC communications channel). The PQC system may be configured to receive, in response to transmission of the PQC request data structure, a PQC acknowledgement data structure (e.g., an acknowledgment or confirmation that the client device is configured to communicate over a PQC communications channel) from the client device over the non-PQC communications channel. In response to receipt of the PQC acknowledgement data structure, to transmit the second portion of the electronic communication to the client device over the PQC communications channel.

In some embodiments, PQC indicator data structure may further identify a quantum communications channel and indicate that a quantum cryptographic key is to be transmitted over the quantum communications channel. The PQC indicator data structure may comprise a link or pointer to the quantum communications channel, a header that identifies the quantum communications channel and comprises other identification and routing information. In some embodiments, the PQC indicator data structure may comprise a link to the quantum cryptographic key. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a quantum flag value. In another example, the PQC indicator data structure may comprise a link to a quantum electronic agreement (e.g., a bilateral agreement between the PQC system and the client device to exchange quantum information over the quantum communications channel) comprising the PQC indicator data structure.

In some embodiments, the first portion of the electronic communication may comprise a quantum request data structure (e.g., a request for an acknowledgment or confirmation that the client device is configured to communicate over a quantum communications channel). The PQC system may be configured to receive, in response to transmission of the quantum request data structure, a quantum acknowledgement data structure (e.g., an acknowledgment or confirmation that the client device is configured to communicate over a quantum communications channel) from the client device over the non-PQC communications channel. In response to receipt of the quantum acknowledgement data structure, the PQC system may be configured to transmit the quantum cryptographic key to the client device over the quantum communications channel. Subsequently, the PQC system may be configured to authenticate a session (e.g., perform a cryptographic handshake) with the client device over the non-PQC communications channel based on the quantum cryptographic key that was transmitted to the client device over the quantum communications channel.

It is to be understood that each PQC cryptographic technique may be implemented as a variant of a PQC cryptographic algorithm (e.g., based on NIST security level). For example, the libOQS implementation of Dilithium includes the variants Dilithium II (e.g., Dilithium_II_Medium), Dilithium III (e.g., Dilithium_III_Recommended), and Dilithium IV (e.g., Dilithium_IV_VeryHigh); and the ISARA Radiate Toolkit implementation of Dilithium includes the variants Dilithium 128 and Dilithium 160. Accordingly, the PQC cryptographic technique for the PQC cryptographic algorithm "Dilithium" may be Dilithium II, Dilithium III, Dilithium IV, Dilithium 128, or Dilithium 160. In yet another example, the ISARA Radiate Toolkit implementation of FrodoKEM includes the variants FrodoKEM-976-AES and FrodoKEM-976-CSHAKE. In yet another example, the ISARA Radiate Toolkit speed-optimized implementation of NewHope includes the variant Lattice-based Unique Key Exchange (LUKE).

In some embodiments, the present disclosure relates to a PQC system configured to provide PQC migration for classical systems (e.g., non-PQC systems) to utilize PQC cryptographic techniques and thereby mitigate vulnerabilities from quantum computers using Shor's algorithm, identification of techniques to reduce the attack surface of cryptographic operations, and solutions to other cascading opportunities and challenges identified herein that stem from the vulnerability of today's common public-key encryption techniques to quantum computing.

In some embodiments, the present disclosure relates to a PQC system configured to provide for, among other features disclosed herein: (i) selecting an encryption technique for encrypting the data based on a set of data attributes, a data environment threat data structure, the PQC cryptographic performance information, and a cryptograph optimization machine learning model; (ii) generating a set of data attributes about received data for subsequent use in determining a PQC cryptographic technique for encrypting the data (including, but not limited to, signing the data with a digital signature); (iii) generating a set of PQC encryption attributes for encrypting received data based on a set of data attributes about the data, a risk profile data structure indicative of a vulnerability of the data in a PQC data environment, PQC cryptographic performance information associated with a set of PQC cryptographic techniques, and the cryptograph optimization machine learning model; and (iv) monitoring an enveloped data structure comprising data and a data envelope that includes a set of data attributes about the data and a risk profile data structure indicative of a vulnerability of the data in a PQC data environment. In some embodiments, in response to identifying a change in the enveloped data structure, the PQC system provided herein may select another PQC encryption algorithm and/or generate a set of PQC encryption attributes for encrypting, or re-encrypting, the data based on the set of data attributes, the risk profile data structure, and PQC cryptographic performance information associated with a set of PQC cryptographic techniques. In some embodiments, the PQC system provided herein may utilize a hybrid PQC cryptographic technique (e.g., hybrid PQC cryptographic technique={PQC cryptographic technique, Non-PQC cryptographic technique}; a PQC cryptographic technique and non-PQC cryptographic technique coexisting in the data envelope).

In one example embodiment implementing a PQC communications channel-based cryptographic technique, the PQC system may transmit a first portion of an electronic communication (e.g., overhead data) to a client device over a non-PQC communications channel. The PQC system may further transmit a second portion of the electronic communication (e.g., payload data) to the client device over a PQC communications channel.

In another example embodiment implementing a PQC communications channel-based cryptographic technique, the PQC system may transmit a first portion of an electronic communication to a client device over a non-PQC communications channel. The PQC system may further transmit a second portion of the electronic communication to a PQC add-on device over a PQC communications channel, wherein the PQC add-on device is communicatively coupled to the client device. In some embodiments, the PQC add-on device may comprise a PQC peripheral device communicatively coupled (e.g., wireless, wired, electrically connected) to the client device. In some embodiments, the PQC add-on device may comprise, or be, a PQC application specific integrated circuit (ASIC) installed within a housing of the client device.

In yet another example embodiment implementing a PQC communications channel-based cryptographic technique, the PQC system may transmit a first portion of an electronic communication to a client device over a non-PQC communications channel. The PQC system may further transmit a quantum cryptographic key to the client device over a quantum communications channel. The PQC system may further authenticate a session with the client device over the non-PQC communications channel based on the quantum cryptographic key. In response to authentication of the session with the client device, the PQC system may transmit a second portion of the electronic communication to the client device over a PQC communications channel.

In some embodiments, the present disclosure relates to a PQC system configured to provide for receiving data and selecting an encryption technique for encrypting the data. In some embodiments, the PQC system may be further configured to provide for generating a data envelope based on the set of data attributes. In some embodiments, the PQC system may be further configured to provide for generating an enveloped data structure based on the data envelope and the data.

In some embodiments, the present disclosure relates to a PQC system configured to provide for receiving data and retrieving policy information associated with the data. In some embodiments, the PQC system may be further configured to provide for generating a set of policy attributes about the data based on the data and the policy information. In some embodiments, the PQC system may be further configured to provide for generating a risk profile data structure based on the set of policy attributes. The risk profile data structure may be indicative of a vulnerability of the data in a PQC data environment.

In some embodiments, the present disclosure relates to a PQC system configured to provide for receiving data and selecting an encryption technique for encrypting the data. In some embodiments, the PQC system may be further configured to provide for retrieving PQC cryptographic performance information associated with a set of PQC cryptographic techniques. The PQC cryptographic performance information may comprise a set of PQC cryptographic performance attributes for each PQC cryptographic technique in the set of PQC cryptographic techniques. In some embodiments, the PQC system may be further configured to provide for generating a set of PQC encryption attributes for encrypting the data based on the set of data attributes, the risk profile data structure, and the PQC cryptographic performance information. In some embodiments, the PQC system may be further configured to provide for encrypting the data based on the set of PQC encryption attributes.

In some embodiments, the PQC system may be further configured for generating a set of PQC encryption attributes for encrypting the data based on the set of data attributes, the risk profile data structure, and the PQC cryptographic performance information. In some embodiments, the PQC system may be further configured to provide for encrypting the data based on the set of PQC encryption attributes.

In some embodiments, the present disclosure relates to a PQC system configured to provide adaptive PQC by monitoring an enveloped data structure to identify a change in the enveloped data structure and, in response, determine whether to generate new PQC encryption attributes for re-encrypting or double encrypting data contained in the enveloped data structure. For example, the enveloped data structure may comprise a data envelope and data. The data envelope may comprise a set of data attributes about the data and a risk profile data structure indicative of a vulnerability of the data in a PQC data environment. The data may have been encrypted based on a first set of PQC encryption attributes. In some embodiments, the PQC system may be further configured to provide for generating an electronic indication of a change in the enveloped data structure. In some embodiments, the PQC system may be further configured to provide for, in response to generating the electronic indication of the change in the enveloped data structure, retrieving PQC cryptographic performance information associated with a set of PQC cryptographic techniques. The PQC cryptographic performance information may comprise a set of PQC cryptographic performance attributes for each PQC cryptographic technique in the set of PQC cryptographic techniques. In some embodiments, the PQC system may be further configured to provide for generating a second set of PQC encryption attributes for encrypting the data based on the set of data attributes, the risk profile data structure, the change in the enveloped data structure, and the PQC cryptographic performance information. In some embodiments, the PQC system may be further configured to provide for encrypting the data based on the second set of PQC encryption attributes.

In some embodiments, the present disclosure relates to a PQC system configured to provide PQC cryptographic techniques by, as an initial process, determining characteristics about received data. For example, the PQC system may be configured to receive encrypted data with variables, gather metadata about the data, and then determine characteristics about the data. In some embodiments, the characteristics about the data may include: (i) payload size (e.g., 30 page electronic mortgage document); (ii) complexity of the data based on metadata (e.g., retention size, format); (iii) compliance requirements; (iv) classification; (v) time not to exceed (NTE) or time to live (TTL); (vi) information value and longevity; (vii) data value and longevity; (viii) frequency; (ix) scalability; (x) domain of the data; (xi) how was the data encrypted (e.g., frequency analysis); any other suitable data; and any combination thereof. Subsequently, the PQC system may be configured to transmit the determined characteristics about the data for use as an input in selecting a cryptographic technique, key size, and mode of operation for re-encrypting the data based on allowable transaction time.

In some embodiments, the present disclosure relates to a PQC system configured to provide PQC cryptographic techniques by, as an intermediate process, identifying a risk profile about received data. For example, the PQC system may be configured to receive encrypted data with variables, gather policy data about the data (e.g., pulls compliance requirements), and then generate a risk profile about the data indicative of a level of risk of the data in a PQC environment. In some embodiments, the policy data about the data may include: (i) compliance requirements; (ii) policies; (iii) regulations; (iv) regulatory classifications; (v) industry; (vi) time to quantum computing threat; and (vii) dependencies on the encryption level; any other suitable data; and any combination thereof. In some embodiments, the risk profile data structure may include: (a) a vulnerability score; (b) an indication of where vulnerabilities lie; (c) an indication of why the vulnerability score is what it is; (d) an indication of whether the data is in compliance with the compliance requirements; (e) the percentage of compliance with the compliance requirements; any other suitable data; and any combination thereof. Subsequently, the PQC system may be configured to transmit the generated risk profile about the data for use as an input in selecting a cryptographic technique, key size, and mode of operation for re-encrypting the data based on allowable transaction time.

In some embodiments, the present disclosure relates to a PQC system comprising, or communicatively coupled to, a quantum computing (QC) detection system configured to provide for QC detection (e.g., the detection of a quantum computer and determination of its capabilities, such as its capability to compromise various cryptographic techniques) by, among other features disclosed herein, generating QC detection data (e.g., fictitious data), encrypting the QC detection data based on a cryptographic technique (e.g., a non-PQC cryptographic technique, or even a PQC cryptographic technique or a hybrid PQC cryptographic technique), and monitoring a set of data environments (e.g., internal data environments, external data environments) for electronic information related to the encrypted QC detection data. For example, the QC detection system may be configured to provide for generating a pair of asymmetric cryptographic keys comprising a public cryptographic key and a private cryptographic key, generating encrypted QC detection data based on the pair of asymmetric cryptographic keys, and destroying the private cryptographic key. In another example, the QC detection system may be configured to provide for generating encrypted QC detection data based on a PQC cryptographic technique that, in some instances, does not have public or private cryptographic keys. The QC detection system may use QC detection data encrypted based on the PQC cryptographic technique to detect new algorithms (e.g., other than Shor's algorithm or Grover's algorithm) that renders that PQC cryptographic technique breakable by a quantum computer or some yet-to-be-discovered technology.

In some embodiments, the QC detection system may be configured to provide for QC detection for use in migration to systems that utilize PQC cryptographic techniques that mitigate vulnerabilities from quantum computers using Shor's algorithm or Grover's algorithm, identification of techniques to reduce the attack surface of cryptographic operations, and solutions to other cascading opportunities and challenges identified herein that stem from the vulnerability of today's common public-key encryption techniques to quantum computing. In some embodiments, the present disclosure relates to a QC detection system configured to provide for QC detection using, among other features described herein: (i) a QC detection technique based on a digital signature (e.g., an RSA digital signature), wherein the QC detection system destroys the private cryptographic key but retains the public cryptographic key; (ii) a QC detection technique based on a pair of asymmetric cryptographic keys (e.g., an RSA key pair) generated based on a symmetric cryptographic key (e.g., an AES key), wherein the QC detection system destroys the private cryptographic key but retains the public cryptographic key; (iii) a QC detection technique based on a symmetric cryptographic key (e.g., an AES key) generated based on a pair of asymmetric cryptographic keys (e.g., a DH key pair), wherein the QC detection system destroys both of the asymmetric cryptographic keys; (iv) a QC detection technique based on multiple different cryptographic techniques (e.g., RSA, DH, ECDH, AES) having staggered key sizes (e.g., RSA-2048, RSA-3072, DH-2048, DH-3072, ECDH-256, ECDH-521, AES-128, AES-256); any other suitable QC detection technique; or any combination thereof.

In some embodiments, the QC detection system may be further configured to provide for monitoring a set of data environments for electronic information related to the encrypted QC detection data. The monitoring of the set of data environments may comprise internal monitoring of internal data environments (e.g., internal information systems, internal data networks, internal data storage devices), external monitoring of external data environments (e.g., content delivery networks (CDNs), cloud service platforms, social media platforms, dark websites), and hybrid monitoring of hybrid data environments (e.g., combinations of internal and external data networks).

In some embodiments, the QC detection system may be further configured to provide for monitoring the set of data environments in an electronically subtle and delicate way to preserve secrecy to mitigate or eliminate the risk that the monitoring will tip anyone off and render the fake data radioactive to QC hackers. In some embodiments, the PQC system may be further configured to provide for monitoring the set of data environments using data monitoring circuitry that, in some instances, is not vulnerable to an attack that sets off a false alarm. For example, the QC detection system may generate and monitor a database of QC detection data. However, hacking of that database could enable the QC detection data to be used without compromising the cryptographic technique (e.g., RSA) with which the QC detection data was encrypted. As a result, the PQC system might incorrectly assume that the cryptographic technique was compromised when in fact it was not. The QC detection system may solve this problem as shown in the following examples.

In one illustrative example embodiment, to detect the QC detection data without storing it anywhere, the QC detection system may encrypt the QC detection data using an asymmetric cryptographic technique, destroy the private cryptographic key, and then monitor for the subsequent use of the private cryptographic key. Because the PQC system destroyed the private cryptographic key, the private cryptographic key could only be used again by using QC to reverse engineer the private cryptographic key from the public cryptographic key, proving the existence of a QC threat capable of compromising the cryptographic technique. In another illustrative example embodiment, to detect the QC detection data without storing it anywhere, the QC detection system may encrypt the QC detection data using a symmetric cryptographic technique and mitigate the risk of an attack that sets off a false alarm through heightened security of the database of QC detection data.

In some embodiments, the QC detection system may be further configured to provide for detecting the electronic information related to the encrypted QC detection data and generating a QC detection alert control signal in response detecting the electronic information related to the encrypted QC detection data.

In some embodiments, the present disclosure relates to a PQC system configured to provide PQC cryptographic techniques by, as a near-final process, optimizing PQC cryptographic parameters (e.g., selecting an optimal PQC cryptographic technique, key size, and mode of operation) for re-encrypting received encrypted data. For example, the PQC system may be configured to receive encrypted data with variables, receive characteristics about the data, receive a risk profile about the data, gather performance metrics about available PQC cryptographic techniques, and then optimize the PQC cryptographic parameters (e.g., select an optimal PQC cryptographic technique, key size, and mode of operation; tune various parameters and characteristics of various implementations of PQC cryptographic techniques) for re-encrypting the data based on the characteristics about the data, the risk profile about the data, the performance metrics about the available PQC cryptographic techniques, and an allowable transaction time (e.g., NTE, TTL). The performance metrics may include: (i) central processing unit (CPU) utilization; (ii) memory utilization; (iii) latency; (iv) time for operation; (v) key size; (vi) crypto strength (e.g., NIST level); (vii) data size (e.g., sig, data block); (viii) PQC cryptographic technique footprint; any other suitable data; and any combination thereof. In some instances, the PQC system may be configured to optimize the PQC cryptographic parameters using artificial intelligence or machine learning techniques. For example, the PQC system may tune various parameters and characteristics of various implementations of PQC cryptographic techniques. Subsequently, the PQC system may be configured to re-encrypt the data based on the optimal PQC cryptographic parameters.

In some embodiments, the present disclosure relates to a PQC system configured to provide for adaptive PQC data encryption techniques. For example, the PQC system may be configured to dynamically upgrade and downgrade (e.g., throttle) a PQC cryptographic technique used to encrypt data. In some instances, the PQC system may be configured to dynamically optimize the PQC cryptographic parameters (e.g., dynamically select an optimal PQC cryptographic technique, key size, and mode of operation) to optimize for risk, performance, or information value and longevity, while satisfying temporal requirements (e.g., allowable transaction time, NTE, TTL). For example, during a first duration of time, the PQC system may be configured to dynamically optimize the PQC cryptographic parameters to optimize for risk; and during a second duration of time, the PQC system may be configured to dynamically optimize the PQC cryptographic parameters to optimize for performance; and during a third duration of time, the PQC system may be configured to dynamically optimize the PQC cryptographic parameters to optimize for information value and longevity. In another example, the PQC encryption strength may increase or decrease based on the sensitivity (e.g., confidentiality, value, vulnerability, data classification level) of the data. In some instances, the PQC system may be configured to provide nested PQC cryptographic techniques by, for example, utilizing multiple levels of encryption on a data envelope's data as the encryption techniques evolve.

In some embodiments, the PQC system may be configured to receive a QC detection alert control signal and, in response, dynamically upgrade the PQC cryptographic technique used to encrypt data based on the QC detection alert control signal. For example, if the QC detection alert control signal indicates that a particular cryptographic technique has been compromised by a quantum computer, the PQC system may be configured to provide for re-encrypting data using a PQC cryptographic technique having a cryptostrength that cannot be compromised by that particular quantum computer.

There are many advantages of these and other embodiments described herein, such as: facilitating migration to quantum-resistant information systems that utilize PQC cryptographic techniques that cannot be compromised by a quantum computer; detecting real world QC capabilities for use in facilitating adaptive migration to quantum-resistant information systems that utilize PQC cryptographic techniques that cannot be compromised by a realized quantum computer; facilitating faster, cheaper, and less computing resource and data intensive processes for providing identification of techniques to reduce the attack surface of cryptographic operations; and providing new ways to solve the cascading opportunities and challenges identified herein that stem from a sudden vulnerability to today's common public-key encryption techniques arising from the realization of quantum computing. Among other features, these and other embodiments described herein at least: reflect improvements in the functioning of computing systems or devices, such as PQC systems (including but not limited to PQC server devices and databases), server devices, client devices, and combinations thereof; reflect improvements to other technologies or technical fields as described herein (e.g., PQC, QC detection); and effect transformations or reductions of particular articles to different states or things, such as unencrypted data and data structures, encrypted data and data structures, electronic signals, quantum signals, other articles described herein, and combinations thereof.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "post-quantum cryptography (PQC)" refers to cryptosystems which are, or are considered to be, resistant to quantum attacks. In some instances, the term PQC refers to cryptography that may or will be secure even after the development of large-scale error tolerant quantum computing devices. The related term "PQC migration" refers to the migration of data encrypted using classical systems to be encrypted using quantum-resistant algorithms and includes, but is not limited to, the updating of system software stacks and security infrastructure. In some embodiments, PQC migration includes migration of classical systems to PQC systems or hybrid systems (e.g., a combination of classical and PQC). In some embodiments, PQC migration includes translations of networks. For example, today networks A, B, and C may only be able to utilize classic cryptography, but tomorrow network C may be able to utilize PQC so the PQC system may drop in a PQC gateway to translate back and forth such that eventually network B is PQC enabled, but network A may never become PQC enabled so the PQC system may determine that transactions to or from network A are a higher risk and implement the PQC cryptographic techniques described herein according to that higher risk.

The term "quantum computing (QC) detection data" refers to data configured to be used by the PQC system to detect the existence of quantum computing and, in some instances, the strength of that quantum computing. In some instances, the PQC system may comprise fictitious data, such as fictitious account data, a fictitious code-signing certificate, any other suitable data, or any combination thereof. For example, the QC detection data may comprise fictitious financial account data, a fictitious electronic mortgage document, a fictitious electronic deed, a fictitious electronic loan document (e.g., a fictitious auto loan document, a fictitious personal loan document), a fictitious electronic stock transfer agreement, fictitious identity information, fictitious medical data, fictitious credit card data, any other suitable data, or any combination thereof. The fictitious identity information may comprise, for example, a fictitious name, address, phone number, email address, social security number, driver license number, any other suitable information, or a combination thereof. The fictitious credit card data may comprise, for example, a fictitious credit card number, credit card issuer (e.g., financial institution), cardholder name, cardholder billing address, expiration date, CVV security code, credit card network (e.g., Visa, MasterCard, American Express), EMV chip data, magnetic stripe data, etc.), any other suitable information, or a combination thereof. In another example, the QC detection data may comprise a fictitious code-signing certificate, a fictitious email certificate, a fictitious legally binding electronic signature certificate that represents the digital identity of a signer (e.g., a digital identification (ID) certificate, such as an X.509 certificate), any other suitable information, or a combination thereof.

The term "data environment" refers to internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, remote recognized authoritative data sources, Internet of Things networks comprising distributed devices that can store data and predefined states such as edge networks, content delivery networks (CDNs), cloud service platforms, social media platforms, dark websites, any other suitable data environment, one or more devices associated with any of the above, one or more device identifiers associated with any of the above, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, one or more devices associated with any of the above, one or more device identifiers associated with any of the above, and/or any combination thereof.

The term "quantum basis" refers to sets of orthogonal quantum states, including, but not limited to, pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state |L> and the right circular photon polarization state |R>.

The term "quantum particle" refers to photons, atoms, electrons, molecules, ions, or other suitable particles or quasi-particles (e.g., composite fermions). The term "entangled quantum particle" refers to two or more photons, atoms, electrons, molecules, ions, or other suitable particles or quasi-particles entangled according to the principles of quantum entanglement.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state |1> and the spin down state |0>); the energy level of a single atom (e.g., a superconducting qubit); the Hall conductance of electron systems (e.g., qubits based on a quantum Hall effect, such as an integer quantum Hall effect, a fractional quantum Hall effect, or a quantum spin Hall effect); the vibration state of a single carbon nanotube or nanoparticle (e.g., a carbon qubit, a carbon nanotube or nanoparticle coupled to a spin qubit, a carbon nanotube or nanoparticle coupled to a superconducting qubit); the electronic state of an ion (e.g., a trapped ion); a transmission line shunted plasma oscillation qubit (e.g., a fixed-frequency transmon qubit, a frequency-tunable transmon qubit); a charge qubit (e.g., a superconducting charge qubit); a defect (e.g., a vacancy, a dopant, or a combination thereof, such as a nitrogen-vacancy center or a silicon-vacancy center) in a diamond structure (e.g., a diamond qubit); or any other suitable qubit. Qubits may exist in multiple states simultaneously and can be made of any suitable quantum particle, including entangled quantum particles. Qubits may exist in multiple states simultaneously and may be made of quantum particles such as photons, atoms, electrons, molecules, ions, or other suitable particles, such as quasi-particles. In some embodiments, qubits may be entangled according to the principles of quantum entanglement. For example, a pair of entangled qubits may comprise a first entangled qubit and a second entangled qubit, where measurement of the first entangled qubit causes the collapse of the second entangled qubit such that the first entangled qubit and the second entangled qubit are equal (e.g., both "0" or both "1") when measured using the same quantum basis.

The term "optical line" refers to an optical communications path. For example, an optical line may comprise an optical fiber, an optical waveguide, a fiberoptic cable, a non-polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining (PM) optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The term "on-chip encoder" and "on-chip decoder" is used herein to refer to any device that respectively encodes or decodes a qubit of information, or in time-bins of information, on a photon or an electron. In this regard, the qubit decoder may comprise an optoelectronic device as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. Each of the MZIs disclosed herein may comprise a combination of mirrors, beam splitters, photodetectors fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length. In some embodiments, a first optoelectronic device may include a particle source configured to generate single particles (e.g., photons or electrons) and transmit the generated particles through a double-slit structure to a first electron detector (e.g., "|1>") and a second electron detector (e.g., "|0>") as described herein.

The terms "security shelf-live," "migration time," and "collapse time" refer to the parameters shown below in Table 2:

TABLE 2

Example parameters that may be used by the PQC system described herein to generate quantum computing threat assessments and electronic recommendations associated therewith.

| Parameter | Description | Definition |
|---|---|---|
| x | Security shelf-life (e.g., data retention requirement) | Duration (e.g., in years) to keep the cryptographic keys secure (e.g., "How long do you need your cryptographic keys to remain secure?") |
| y | PQC migration time | Estimated duration (e.g., in years) to migrate existing infrastructure to a PQC system (e.g., "How long will it take to deploy a set of cryptography tools that are quantum-resistant?") |
| z | Collapse time (e.g., time to quantum computing threat) | Estimated duration (e.g., in years) to build a large-scale quantum computer (e.g., "How long will it be before a quantum computer, or some other method, compromises the currently deployed public-key cryptography tools?") |

The term "security shelf-life" includes, but is not limited to, data retention requirements. For example, in some instances the security shelf life x of a piece of data may be based on governmental risk and regulatory requirements, such as the FDIC's data retention requirements shown in Table 1.

The term "collapse time" includes, but is not limited to, time to quantum computing threat. The phrases "time to quantum computing threat" and "a time to a quantum computing threat" refer to an approximate time to a quantum computing threat. In some instances, the collapse time z may decrease when the PQC system identifies, or receives, technological advancements relating to quantum computing; increased vulnerabilities to cryptographic techniques (e.g., one or more non-PQC cryptographic techniques, PQC cryptographic techniques, or hybrid PQC cryptographic techniques); or a quantum computing (QC) detection alert control signal indicating that a particular cryptographic technique (e.g., a non-PQC cryptographic technique, a PQC cryptographic technique, a hybrid PQC cryptographic technique) has been compromised by quantum computing. In one illustrative, non-limiting example, the collapse time z may indicate an estimated 15% chance of compromising RSA-2048 by 2026 and an estimated 50% chance of compromising RSA-2048 by 2031.

The term "control signal" refers to an electronic alert, notification, flag, or control signal configured to instruct, or cause, the PQC system, or a QC detection system comprised by or in communication with the PQC system, to perform an automated process or function without user interactivity. For example, control signals as described herein may comprise QC detection alert control signals, leakage alert control signals, and tampering alert control signals. In some embodiments, a QC detection alert control signal may indicate, for example, that a particular cryptographic technique (e.g., a non-PQC cryptographic technique, a PQC cryptographic technique, a hybrid PQC cryptographic technique) used to encrypt or otherwise generate encrypted QC detection data has been compromised by quantum computing. In some embodiments, a leakage alert control signal may indicate, for example, the existence of a data leakage event associated with QC detection data stored in an internal data environment that was never transmitted outside of that internal data environment. In some embodiments, a tampering alert control signal may indicate, for example, the existence of a data tampering event associated with QC detection data, wherein the QC detection data has been altered but signed using the same digital signature. In some embodiments, the QC detection alert control signals, leakage alert control signals, tampering alert control signals, or a combination thereof may instruct, or cause, the PQC system to initiate automated analyses and processes to mitigate the quantum computing threat within a duration of time. In some instances, the PQC system may generate a control signal in accordance with the criteria discussed below with reference to Table 3.

The term "quantum computing (QC) detection data" refers to data configured to be used by the PQC system, or a QC detection system comprised by or in communication with the PQC system, to detect the existence and capabilities of quantum computing and, in some instances, the strength of that quantum computing. In some instances, the QC detection data may comprise fictitious data, such as fictitious account data, a fictitious code-signing certificate, any other suitable data, or any combination thereof. For example, the QC detection data may comprise fictitious financial account data, a fictitious electronic mortgage document, a fictitious electronic deed, a fictitious electronic loan document (e.g., a fictitious auto loan document, a fictitious personal loan document), a fictitious electronic stock transfer agreement, fictitious identity information, fictitious medical data, fictitious credit card data, any other suitable data, or any combination thereof. The fictitious identity information may comprise, for example, a fictitious name, address, phone number, email address, social security number, driver license number, any other suitable information, or a combination thereof. The fictitious credit card data may comprise, for example, a fictitious credit card number, credit card issuer (e.g., financial institution), cardholder name, cardholder billing address, expiration date, CVV security code, credit card network (e.g., Visa, MasterCard, American Express), EMV (originally Europay, Mastercard, and Visa) chip data, magnetic stripe data, etc.), any other suitable information, or a combination thereof. In another example, the QC detection data may comprise a fictitious code-signing certificate, a fictitious email certificate, a fictitious legally binding electronic signature certificate that represents the digital identity of a signer (e.g., a digital identification (ID) certificate, such as an X.509 certificate), any other suitable information, or a combination thereof.

The term "data environment" refers to internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, remote recognized authoritative data sources, Internet of Things networks comprising distributed devices that can store data and predefined states such as edge networks, content delivery networks (CDNs), dark websites, one or more devices associated with any of the above, one or more device identifiers associated with any of the above, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, one or more devices associated with any of the above, one or more device identifiers associated with any of the above, and/or any combination thereof.

The term "non-PQC cryptographic technique" refers to a cryptographic technique that is not quantum-resistant. Non-PQC cryptographic techniques may comprise, for example, RSA, DH, and other such non-PQC cryptographic algorithms. In some instances, a non-PQC cryptographic technique may be a variant of a non-PQC cryptographic algorithm. For example, a first non-PQC cryptographic technique may be RSA-2048, a second non-PQC cryptographic technique may be RSA-3072, and a third non-PQC cryptographic technique may be RSA-4096, each of which is a different variant of the same non-PQC cryptographic algorithm (e.g., RSA). In another example, a first non-PQC cryptographic technique may be AES-128, and a second non-PQC cryptographic technique may be DH-2048, each of which is a variant of a different non-PQC cryptographic algorithm (e.g., AES, DH). In yet another example, a first non-PQC cryptographic technique may encrypt overhead data based on RSA-2048 and transmit the encrypted data over a non-PQC communications channel (e.g., an in-band communications channel), and a second non-PQC cryptographic technique may transmit overhead data over a non-PQC communications channel as clear text, each of which is a different variant of a non-PQC communications channel-based cryptographic technique.

The term "PQC cryptographic technique" refers to a quantum-resistant cryptographic technique. Generally, the families of PQC cryptographic techniques include key management and signature. PQC cryptographic techniques may comprise, for example, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, PQC communications channel-based cryptographic techniques, and other suitable techniques. In some instances, a PQC cryptographic technique may be a variant of a PQC cryptographic algorithm. For example, a first PQC cryptographic technique may be Dilithium II, a second PQC cryptographic technique may be Dilithium II, and a third PQC cryptographic technique may be Dilithium 128, each of which is a different variant of the same PQC cryptographic algorithm (e.g., Dilithium). In another example, a first PQC cryptographic technique may be LUKE, and a second PQC cryptographic technique may be Dilithium II, each of which is a variant of a different PQC cryptographic algorithm (e.g., NewHope, Dilithium). In yet another example, a first PQC cryptographic technique may encrypt payload data based on Dilithium II and transmit the encrypted data over a PQC communications channel (e.g., a PQC back channel), and a second PQC cryptographic technique may generate a secret key that is used to encrypt payload data based on AES-256 and transmit the encrypted data over a PQC communications channel, each of which is a different variant of a PQC communications channel-based cryptographic technique.

The term "hybrid PQC cryptographic technique" refers to a cryptographic technique that comprises a non-PQC cryptographic technique and a PQC cryptographic technique. For example, a hybrid PQC cryptographic technique may comprise a PQC cryptographic technique and non-PQC cryptographic technique coexisting in a data envelope, as defined by the statement "hybrid PQC cryptographic technique={PQC cryptographic technique, Non-PQC cryptographic technique}." In some embodiments, a hybrid PQC cryptographic technique may comprise a hybrid PQC cryptographic mode, such as a signature-based hybrid PQC cryptographic mode consisting of a non-PQC cryptographic signature and a PQC cryptographic signature. In some embodiments, the hybrid PQC cryptographic mode is valid only if both the non-PQC cryptographic signature and the PQC cryptographic signature are valid. For example, the PQC system may (i) validate the non-PQC cryptographic signature according to the Federal Information Processing Standard (FIPS) publication 140 (e.g., 140-1, 140-2, 140-3); and (ii) validate the PQC cryptographic signature using multiple public-key algorithms for X.509 certificates, such as quantum-resistant X.509 Multiple Public Key Algorithm Certificates.

The term "quantum cryptographic technique" refers to a quantum particle-based cryptographic technique. Quantum cryptographic techniques may comprise, for example, quantum key distribution (QKD) techniques, quantum coin flipping protocols, quantum commitment protocols, quantum oblivious transfer protocols, and other suitable techniques. In some instances, a quantum cryptographic technique may be a variant of a quantum cryptographic algorithm. For example, a first quantum cryptographic technique may be a BB84-based QKD technique, a second quantum cryptographic technique may be an E91-based QKD technique, and a third quantum cryptographic technique may be a KMB09-based QKD technique, each of which is a different variant of the same quantum cryptographic algorithm (e.g., QKD).

The term "non-PQC communications channel" refers to a communications channel (e.g., a wired or wireless communications channel) over which non-quantum data and signals are exchanged using one or more non-PQC cryptographic techniques that do not themselves directly rely on quantum properties. For example, the PQC system described herein may implement a non-PQC communications channel by encrypting data based on a non-PQC cryptographic technique (e.g., RSA) and then transmitting the encrypted data over a non-PQC communications channel (e.g., an "in-band" communications channel) or, in some instances, by transmitting unencrypted, clear text data over the non-PQC communications channel. In some embodiments, a non-PQC communications channel may be a classical communications channel derived from a shared secret that is derived using a non-PQC cryptographic technique, such as a shared secret generated using DH.

The term "PQC communications channel" refers to a communications channel (e.g., a wired or wireless communications channel) over which non-quantum data and signals are exchanged using one or more PQC cryptographic techniques (e.g., for authentication, encryption, or both) that do not themselves directly rely on quantum properties. For example, the PQC system described herein may implement a PQC communications channel by encrypting data based on a PQC cryptographic technique (e.g., Dilithium II) and then transmitting the encrypted data over a classical back channel (e.g., an "out-of-band" communications channel). In some embodiments, a PQC communications channel may be based on an underlying Key Encapsulation Mechanism or Key Agreement Scheme. In some embodiments, a PQC communications channel may use a Key Encapsulation Mechanism (e.g., SIKE, NTRUPrime, Kyber) to encapsulate a shared secret and ensure its safe transmission between Alice and Bob. This shared secret subsequently will either (i) be used as a Symmetric Key (e.g., for Symmetric Key encryption) or (ii) be handed over to a Key Derivation Function to generate a shared encryption key. In some embodiments, a PQC communications channel may use a Key Agreement Scheme (e.g., SIDH, NewHopeDH) may allow both Alice and Bob to calculate the shared secret based on public parameters and public key that they exchange. Unlike Key Encapsulation Mechanisms, Key Agreement Schemes do not encapsulate the calculated shared secret with cipher text. Key Agreement Schemes may be extended to generate Ephemeral keys. In some instances, after the shared secret is calculated, the keys are destroyed to preserve perfect forward secrecy. In some embodiments, a PQC communications channel may be a classical communications channel derived from a shared secret that is derived using a Key Encapsulation Mechanism or a Key Agreement Scheme.

The term "quantum communications channel" refers to a quantum communications channel (e.g., an optical line, a quantum line) over which quantum data and particles, such as qubits, are exchanged using one or more quantum cryptographic techniques (e.g., QKD) that directly rely on quantum properties, such as quantum uncertainty, quantum entanglement, or both.

The term "control signal" refers to an electronic alert, notification, flag, or control signal configured to instruct, or cause, the PQC system to perform an automated process or function without user interactivity. For example, control signals as described herein may comprise QC detection alert control signals, leakage alert control signals, and tampering alert control signals. In some embodiments, a QC detection alert control signal may indicate, for example, that a particular cryptographic technique (e.g., a non-PQC cryptographic technique, a PQC cryptographic technique) used to encrypt or otherwise generate encrypted QC detection data has been broken by quantum computing. In some embodiments, a leakage alert control signal may indicate, for example, the existence of a data leakage event associated with QC detection data stored in an internal data environment that was never transmitted outside of that internal data environment. In some embodiments, a tampering alert control signal may indicate, for example, the existence of a data tampering event associated with QC detection data, wherein the QC detection data has been altered but signed using the same digital signature. In some embodiments, the QC detection alert control signals, leakage alert control signals, tampering alert control signals, or a combination thereof may instruct, or cause, the PQC system to initiate automated analyses and processes to mitigate the quantum computing threat within a duration of time.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more networked devices, such as one or more servers, remote servers, cloud-based servers (e.g., cloud utilities), or other network entities, and configured to communicate with one or more devices, such as one or more server devices, client devices, database server devices, remote server devices, other suitable devices, or a combination thereof.

In some instances, the method, system, apparatus, and computer program product of an example embodiment may be embodied by one or more quantum communications circuitries, such as one or more quantum particle encoders, quantum particle decoders, laser devices, quantum lines, quantum particle storage devices, other suitable quantum communications devices or components, or a combination thereof.

Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), point of sale (PoS) device, electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide PQC and monitoring (including, but not limited to, QC detection, data leakage detection, data tampering detection, and identification of changes in enveloped data structures). As illustrated, a PQC system 102 may be connected to one or more PQC server devices 104 in communication with one or more PQC databases 106. The PQC system 102 may be connected to one or more server devices 110A-110N, one or more client devices 112A-112N, one or more database server devices 114, and one or more remote server devices 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the PQC system 102 may be configured to provide PQC and monitor changes therein as described in further detail below.

The PQC system 102 may be embodied as one or more specialized circuitries, computers, or computing systems and may comprise one or more PQC server devices 104 and one or more PQC databases 106. The one or more PQC server devices 104 may be embodied as one or more servers, remote servers, cloud-based servers (e.g., cloud utilities), processors, any other suitable server devices, or any combination thereof. The one or more PQC server devices 104 may be configured to receive, process, generate, and transmit data, signals, and electronic information to facilitate the operations of the PQC system 102. The one or more PQC databases 106 may be embodied as one or more data storage devices, such as Network Attached Storage (NAS) devices or separate databases or servers. The one or more PQC databases 106 may be configured to store and provide access to data and information used by the PQC system 102 to facilitate the operations of the PQC system 102. For example, the one or more PQC databases 106 may store user account credentials for users of one or more server devices 110A-110N, one or more client devices 112A-112N, one or more database server devices 114, one or more remote server devices 116, or a combination thereof. In another example, the one or more PQC databases 106 may store data regarding device characteristics for the one or more server devices 110A-110N, one or more client devices 112A-112N, one or more database server devices 114, one or more remote server devices 116, or a combination thereof. In some embodiments, the one or more PQC server devices 104, the one or more PQC databases 106, or both may include or store various data and electronic information associated with one or more data, data attributes, data envelopes, enveloped data structures, policy information, policy attributes, risk profile data structures, cryptograph optimization machine learning model, QC detection data, QC detection techniques (including, but not limited to, detection of quantum computing capabilities; data leakage detection techniques; and data tampering detection techniques), QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, other machine learning techniques, graphical user interface (GUI) data, any other suitable data or electronic information, any links or pointers thereto, or combinations thereof. In some embodiments, the one or more PQC server devices 104, the one or more PQC databases 106, or both may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more server devices 110A-110N may be embodied by one or more computing devices. In some embodiments, the one or more server devices 110A-110N may be embodied as one or more servers, remote servers, cloud-based servers (e.g., cloud utilities), processors, or any other suitable devices, or any combination thereof. In some embodiments, the one or more server devices 110A-110N may receive, process, generate, and transmit data, signals, and electronic information to facilitate the operations of the PQC system 102. Information received by the PQC system 102 from one or more server devices 110A-110N may be provided in various forms and via various methods. In some embodiments, the one or more server devices 110A-110N may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, any other suitable data or electronic information, any links or pointers thereto, or combinations thereof. In some embodiments, the one or more server devices 110A-110N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more client devices 112A-112N may be embodied by one or more computing devices. Information received by the PQC system 102 from the one or more client devices 112A-112N may be provided in various forms and via various methods. For example, the one or more client devices 112A-112N may be smartphones, laptop computers, netbooks, tablet computers, wearable devices, desktop computers, ATMs, PoS devices, electronic workstations, or the like, and the information may be provided through various modes of data transmission provided by these client devices. In some embodiments, the one or more client devices 112A-112N may include or store various data and electronic information associated with one or more users. For example, the one or more client devices 112A-112N may include or store user information (including, but not limited to, user profile information), any other suitable data, or any combination thereof. In some embodiments, the one or more client devices 112A-112N may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, any other suitable data or electronic information, any links or pointers thereto, or combinations thereof. In some embodiments, the one or more client devices 112A-112N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In embodiments where a client device 112 is a mobile device, such as a smartphone or tablet, the mobile device may execute an "app" (e.g., a thin-client application) to interact with the PQC system 102, one or more server devices 110A-110N, one or more database server devices 114, one or more remote server devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, remote server devices). Communication with hardware and software modules executing outside of the app is typically provided via APIs provided by the mobile device operating system.

The one or more database server devices 114 may be embodied by one or more computing devices, server devices, servers, data storage devices, databases, or a combination thereof. In some embodiments, the one or more database server devices 114 may be embodied as one or more data storage devices, such as one or more NAS devices, or as one or more separate databases or database servers. In some embodiments, the one or more database server devices 114 may be embodied as one or more servers, remote servers, cloud-based servers (e.g., cloud utilities), processors, or any other suitable devices, or any combination thereof. In some embodiments, the one or more database server devices 114 may receive, process, generate, and transmit data, signals, and electronic information to facilitate the operations of the PQC system 102. Information received by the PQC system 102 from one or more database server devices 114 may be provided in various forms and via various methods. It will be understood, however, that in some embodiments, the one or more database server devices 114 need not themselves be databases or database servers but may be peripheral devices communicatively coupled to databases or database servers.

In some embodiments, the one or more database server devices 114 may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, any other suitable data or electronic information, any links or pointers thereto, or combinations thereof. In some embodiments, the one or more database server devices 114 may include or store exogenous data. The exogenous data may comprise, for example, public sentiment data structures (e.g., a widespread data breach at a third-party system, such as a merchant; a stock market crash; a geopolitical event), news articles, FDIC data, NIST data, company intranet data, technological advancements, scientific publications, financial data (e.g., stock market data, commodity market data, money market data), legal data (e.g., lawsuit data, regulatory data), any other suitable exogenous data, or any combination thereof. In some embodiments, the one or more database server devices 114 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more remote server devices 116 may be embodied by one or more computing devices, server devices, servers, data storage devices, databases, or a combination thereof. In some embodiments, the one or more remote server devices 116 may be embodied as one or more data storage devices, such as one or more NAS devices, or as one or more separate databases or database servers. In some embodiments, the one or more remote server devices 116 may be embodied as one or more servers, remote servers, cloud-based servers (e.g., cloud utilities), processors, or any other suitable devices, or any combination thereof. In some embodiments, the one or more remote server devices 116 may receive, process, generate, and transmit data, signals, and electronic information to facilitate the operations of the PQC system 102. Information received by the PQC system 102 from one or more remote server devices 116 may be provided in various forms and via various methods. It will be understood, however, that in some embodiments, the one or more remote server devices 116 need not themselves be servers but may be peripheral devices communicatively coupled to servers.

In some embodiments, the one or more remote server devices 116 may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, exogenous data, any other suitable data or electronic information, any links or pointers thereto, or combinations thereof. In some embodiments, the one or more remote server devices 116 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In some embodiments, the one or more server devices 110A-110N, the one or more client devices 112A-112N, the one or more database server devices 114, the one or more remote server devices 116, or any combination thereof may interact with the PQC system 102 over one or more communications networks 108. As yet another example, the one or more server devices 110A-110N, the one or more client devices 112A-112N, the one or more database server devices 114, the one or more remote server devices 116, or a combination thereof may include various hardware or firmware designed to interface with the PQC system 102. For example, an example server device 110A may be a session authentication server modified to communicate with the PQC system 102, and another example server device 110B may be a purpose-built session authentication server offered for the primary purpose of communicating with the PQC system 102. As another example, an example client device 112A may be a user's smartphone and may have an application stored thereon facilitating communication with the PQC system 102, whereas another example client device 112B may be a purpose-built device offered for the primary purpose of communicating with the PQC system 102.

In some embodiments, the one or more server devices 110A-110N, the one or more client devices 112A-112N, the one or more database server devices 114, the one or more remote server devices 116, or any combination thereof may interact with the PQC system 102 over one or more PQC communications channels. The PQC communications channel may be, for example, a communications channel over which data is transmitted and received using a PQC cryptographic technique, such as a PQC back channel (e.g., a PQC out-of-band communications channel). In some embodiments, the PQC system 102 may upgrade the application software in a server device 110, client device 112, database server device 114, or remote server device 116 so that the upgraded application software is configured to recognize a PQC communications channel and allow communication with the PQC system 102 over the PQC communications channel. In some embodiments, where a server device 110, client device 112, database server device 114, or remote server device 116 is a non-PQC device (e.g., a computing device that is not configured to interact with, or capable of interacting with, the PQC system 102 over a PQC communications channel), that non-PQC device may interact with the PQC system 102 over a PQC communications channel using a PQC shim or PQC add-on device configured to allow communication with the PQC system 102 over the PQC communications channel. In one example, the PQC system 102 may determine that a server device 110, client device 112, database server device 114, or remote server device 116 is a non-PQC device and transmit a PQC shim to that non-PQC device for installation (e.g., automatic installation, manual installation) in the protocol stack of that device. The PQC shim may be embodied as, for example, computer program instructions (e.g., software, firmware). In another example where the server device 110, client device 112, database server device 114, or remote server device 116 is a non-PQC device, a PQC add-on device may be communicatively coupled to the non-PQC device. The PQC add-on device may be embodied as, for example, a PQC peripheral device communicatively coupled (e.g., via a wired communications path, wireless communications path, or both) to the non-PQC device. Additionally, or alternatively, the PQC add-on device may be embodied as, for example, a PQC application specific integrated circuit (ASIC) installed within a housing of the non-PQC device, or any other suitable device or circuitry. In some embodiments, the PQC shim may comprise a set of routines with network capability and a PQC endpoint.

As a foundation for some embodiments, the PQC system 102 may provide for receiving data and generating a set of data attributes about the data. In some embodiments, the PQC system 102 may provide for receiving, directly or indirectly via communications network 108, the data from one or more of the one or more client devices 112A-112N, the one or more server devices 110A-110N, the one or more database server devices 114, any other suitable device, or any combination thereof. In some embodiments, the PQC system 102 may further provide for generating a data envelope based on the set of data attributes. In some embodiments, the PQC system 102 may further provide for generating an enveloped data structure based on the data envelope and the data.

In some embodiments, the PQC system 102 may provide for retrieving policy information associated with the data. In some embodiments, the PQC system 102 may provide for retrieving, directly or indirectly via communications network 108, the policy information from one or more of the one or more client devices 112A-112N, the one or more server devices 110A-110N, the one or more database server devices 114, the one or more remote server devices 116, any other suitable device, or any combination thereof. In some embodiments, the PQC system 102 may further provide for generating a set of policy attributes about the data based on the data and the policy information. In some embodiments, the PQC system 102 may further provide for generating a risk profile data structure based on the set of policy attributes. The risk profile data structure may be indicative of a vulnerability of the data in a PQC data environment.

In some embodiments, the PQC system 102 may provide for retrieving PQC cryptographic performance information associated with a set of PQC cryptographic techniques. In some embodiments, the PQC system 102 may provide for retrieving, directly or indirectly via communications network 108, the policy information from one or more of the one or more PQC server devices 104, the one or more PQC databases 106, the one or more database server devices 114, the one or more remote server devices 116, any other suitable device, or any combination thereof. In some embodiments, the PQC system 102 may provide for generating a PQC cryptographic technique for encrypting the data based on the set of PQC encryption attributes, and encrypt the data using the generated PQC cryptographic technique.

In some embodiments, the PQC cryptographic performance information may comprise a set of PQC cryptographic performance attributes for each PQC cryptographic technique in the set of PQC cryptographic techniques. In some embodiments, the PQC system 102 may further provide for generating a set of PQC encryption attributes for encrypting the data based on the set of data attributes, the risk profile data structure, and the PQC cryptographic performance information. In some embodiments, the PQC cryptographic performance information comprises information indicative of the algorithm and implementation scale for each PQC cryptographic technique in the set of PQC cryptographic techniques; the efficiency, performance, and deterministic operation of each PQC cryptographic technique in the set of PQC cryptographic techniques; the confidence score (e.g., based on cryptanalysis) for each PQC cryptographic technique in the set of PQC cryptographic techniques; the usability and interoperability of each PQC cryptographic technique in the set of PQC cryptographic techniques; any other suitable data or electronic information; or any combination thereof.

In some embodiments, the PQC system 102 may provide for generating the PQC cryptographic performance information. In some embodiments, the PQC system 102 may provide for storing the PQC cryptographic performance information in a PQC cryptographic performance information storage device. The PQC cryptographic performance information storage device may be, for example, one or more of the one or more PQC databases 106, the PQC server devices 104, the one or more client devices 112, the one or more server devices 110, the one or more database server devices 114, the one or more remote server devices 116, or a combination thereof.

In some embodiments, the PQC system 102 may further provide for encrypting the data based on the set of PQC encryption attributes. In some embodiments, the PQC system 102 may provide for storing the encrypted data in a data storage device. The data storage device may be, for example, one or more of the one or more database server devices 114, the one or more PQC databases 106, the one or more client devices 112, the one or more server devices 110, or a combination thereof.

In some embodiments, the PQC system 102 may provide adaptive PQC by monitoring an enveloped data structure to identify a change in the enveloped data structure and, in response, determine whether to generate new PQC encryption attributes for re-encrypting or double encrypting data contained in the enveloped data structure. For example, the enveloped data structure may comprise a data envelope and data. The data envelope may comprise a set of data attributes about the data and a risk profile data structure indicative of a vulnerability of the data in a PQC data environment. The data may have been encrypted based on a first set of PQC encryption attributes. In some embodiments, the PQC system 102 may further provide for generating an electronic indication of a change in the enveloped data structure. In some embodiments, the PQC system 102 may further provide for, in response to generating the electronic indication of the change in the enveloped data structure, retrieving PQC cryptographic performance information associated with a set of PQC cryptographic techniques. The PQC cryptographic performance information may comprise a set of PQC cryptographic performance attributes for each PQC cryptographic technique in the set of PQC cryptographic techniques. In some embodiments, the PQC system 102 may further provide for generating a second set of PQC encryption attributes for encrypting the data based on the set of data attributes, the risk profile data structure, the change in the enveloped data structure, and the PQC cryptographic performance information.

In some embodiments, the PQC system 102 may further provide for re-encrypting or double encrypting the data based on the second set of PQC encryption attributes. In some embodiments, the PQC system 102 may provide for storing the re-encrypted or double encrypted data in a data storage device. The data storage device may be, for example, one or more of the one or more database server devices 114, the one or more PQC databases 106, the one or more client devices 112, the one or more server devices 110, or a combination thereof.

In some embodiments, the PQC system may communicate with one or more of the one or more client devices 112A-112N, the one or more server devices 110A-110N, the one or more database server devices 114, the one or more remote server devices 116, any other suitable device, or any combination thereof using a PQC communications channel-based cryptographic technique.

In one example embodiment implementing a PQC communications channel-based cryptographic technique, the PQC system 102 may transmit a first portion of an electronic communication (e.g., overhead data) over a non-PQC communications channel (e.g., a communications channel through one or more communications networks 108) to one or more of the one or more client devices 112A-112N, the one or more server devices 110A-110N, the one or more database server devices 114, the one or more remote server devices 116, any other suitable device, or any combination thereof. The PQC system 102 may further transmit a second portion of the electronic communication (e.g., payload data) over a PQC communications channel (e.g., a back channel or out-of-band communications channel through one or more communications networks 108) to the one or more of the one or more client devices 112A-112N, the one or more server devices 110A-110N, the one or more database server devices 114, the one or more remote server devices 116, any other suitable device, or any combination thereof.

In another example embodiment implementing a PQC communications channel-based cryptographic technique, the PQC system 102 may transmit a first portion of an electronic communication over a non-PQC communications channel to one or more of the one or more client devices 112A-112N, the one or more server devices 110A-110N, the one or more database server devices 114, the one or more remote server devices 116, any other suitable device, or any combination thereof. The PQC system 102 may further transmit a second portion of the electronic communication over a PQC communications channel to one or more PQC add-on devices, wherein each of the one or more PQC add-on devices is communicatively coupled to a respective client device 112, server device 110, database server device 114, remote server device 116, any other suitable device, or any combination thereof.

In yet another example embodiment implementing a PQC communications channel-based cryptographic technique, the PQC system may transmit a first portion of an electronic communication over a non-PQC communications channel and transmit a quantum cryptographic key to a client device over a quantum communications channel. The PQC system may further authenticate a session with the client device over the non-PQC communications channel based on the quantum cryptographic key. In response to authentication of the session with the client device, the PQC system may transmit a second portion of the electronic communication to the client device over a PQC communications channel.

In some embodiments, the PQC system 102 may provide for generating QC detection data and encrypting the QC detection data based on a cryptographic technique. In one example, the PQC system 102 may provide for generating a pair of asymmetric cryptographic keys comprising a public cryptographic key and a private cryptographic key, encrypting the QC detection data based on the pair of asymmetric cryptographic keys, and destroying the private cryptographic key. In some embodiments, the PQC system 102 may further provide for monitoring a set of data environments for electronic information related to the encrypted QC detection data. For example, the PQC system 102 may provide for monitoring internal and external data environments implemented by one or more of the one or more client devices 112A-112N, the one or more server devices 110A-110N, the one or more database server devices 114, any other suitable device, or any combination thereof. In some embodiments, the PQC system 102 may be further configured to generate a QC detection alert control signal in response to detection of the electronic information related to the encrypted QC detection data. In some embodiments, the PQC system 102 may be further configured to generate a leakage alert control signal, a tampering alert control signal, any other suitable control signal, or any combination thereof.

In some embodiments, the PQC system 102, or a PQC system comprised by or in communication with the PQC system 102, may provide for detecting the realization of a quantum computer based on various QC detection techniques. For example, the PQC system 102 may provide for a digital signature-based QC detection technique configured to detect a fraudulent document signed using a destroyed RSA private key. In another example, the PQC system 102 may provide for an encryption-based QC detection technique configured to detect disclosed information encrypted using a random AES key encrypted using a destroyed RSA private key (e.g., protecting cleartext against disclosure for verification). In another example, the PQC system 102 may provide for a code-sign based QC detection technique configured to detect code-sign malware using a destroyed RSA private key. In another example, the PQC system 102 may provide for a certificate-based QC detection technique configured to detect a fraudulent certificate signed by an issuer certificate authority using a destroyed RSA private key (e.g., using a fictitious email certificate or legal sign certificate as a honeypot). In another example, the PQC system 102 may provide for a tamper seal-based QC detection technique configured to detect a fraudulent PDF with an embedded digital signed object.

In some embodiments, the PQC system 102 may further provide for receiving a QC detection alert control signal, a leakage alert control signal, or a tampering alert control signal and, in response, generating an electronic indication of a change in the enveloped data structure based on the QC detection alert control signal, the leakage alert control signal, or the tampering alert control signal. In some embodiments, the PQC system 102 may further provide for, in response to generating the electronic indication of the change in the enveloped data structure, retrieving PQC cryptographic performance information associated with a set of PQC cryptographic techniques. The PQC cryptographic performance information may comprise a set of PQC cryptographic performance attributes for each PQC cryptographic technique in the set of PQC cryptographic techniques. In some embodiments, the PQC system 102 may further provide for generating a second set of encryption attributes (e.g., PQC encryption attributes) for encrypting the data based on the set of data attributes, the risk profile data structure, the change in the enveloped data structure, and the PQC cryptographic performance information.

In some embodiments, the PQC system 102 may further provide for generating a portfolio view (e.g., GUI) of existing business applications for modeling what the impact of applying a specific PQC cryptographic technique would be across an entire portfolio. In one illustrative example, if the PQC system 102 determines that it must use PQC cryptographic technique Z to generate a symmetric key to encrypt data, the PQC system 102 may be further configured to generate portfolio GUI data and transmit that portfolio GUI data to a client device 112 to show users which applications would be suitable for implementing PQC cryptographic technique Z (e.g., the additional encryption overhead would not exceed application transaction time limits), which applications would be borderline, and which applications would be "in the red" and would exceed transaction time limits.

Example Implementing Apparatuses

The PQC system 102 described with reference to FIG. 1 may be embodied by one or more computing systems, such as apparatus 200 shown in FIG. 2A, apparatus 280 shown in FIG. 2B, and apparatus 290 shown in FIG. 2C. In some embodiments, apparatus 200 shown in FIG. 2A may represent an example PQC system 102, a PQC server device 104, a PQC database, or a combination thereof. In some embodiments, apparatus 280 shown in FIG. 2B may represent an example server device 110, client device 112, database server device 114, remote server device 116, any other suitable device, or a combination thereof. In some embodiments, apparatus 290 shown in FIG. 2B may represent an example PQC add-on device configured to be communicatively coupled to a server device 110, client device 112, database server device 114, remote server device 116, any other suitable device, or a combination thereof.

Figure 2A:
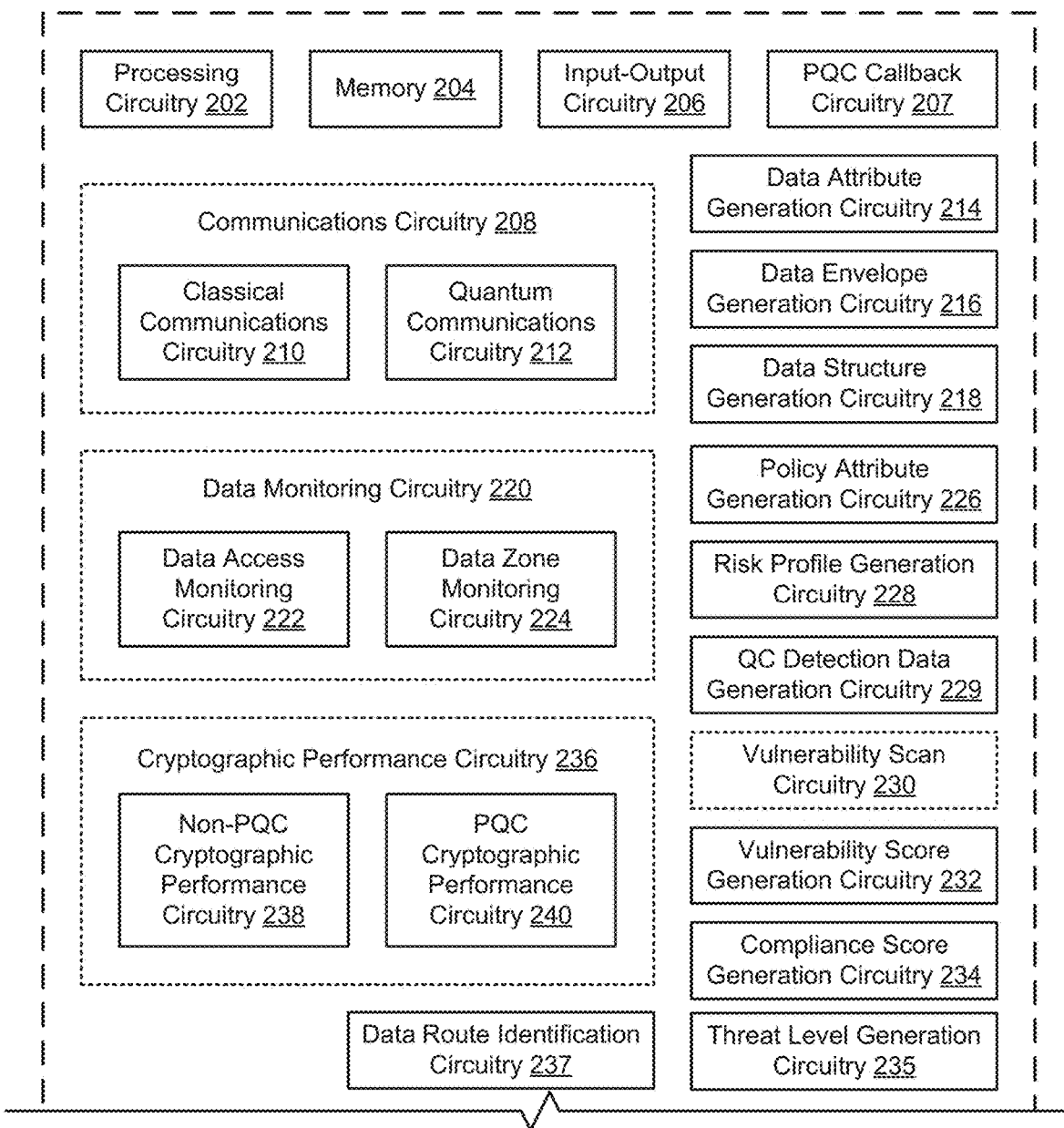
FIGS. 2A, 2B, and 2C illustrate schematic block diagrams of example circuitries that may perform various operations in accordance with some example embodiments described herein.
Figure 2A:
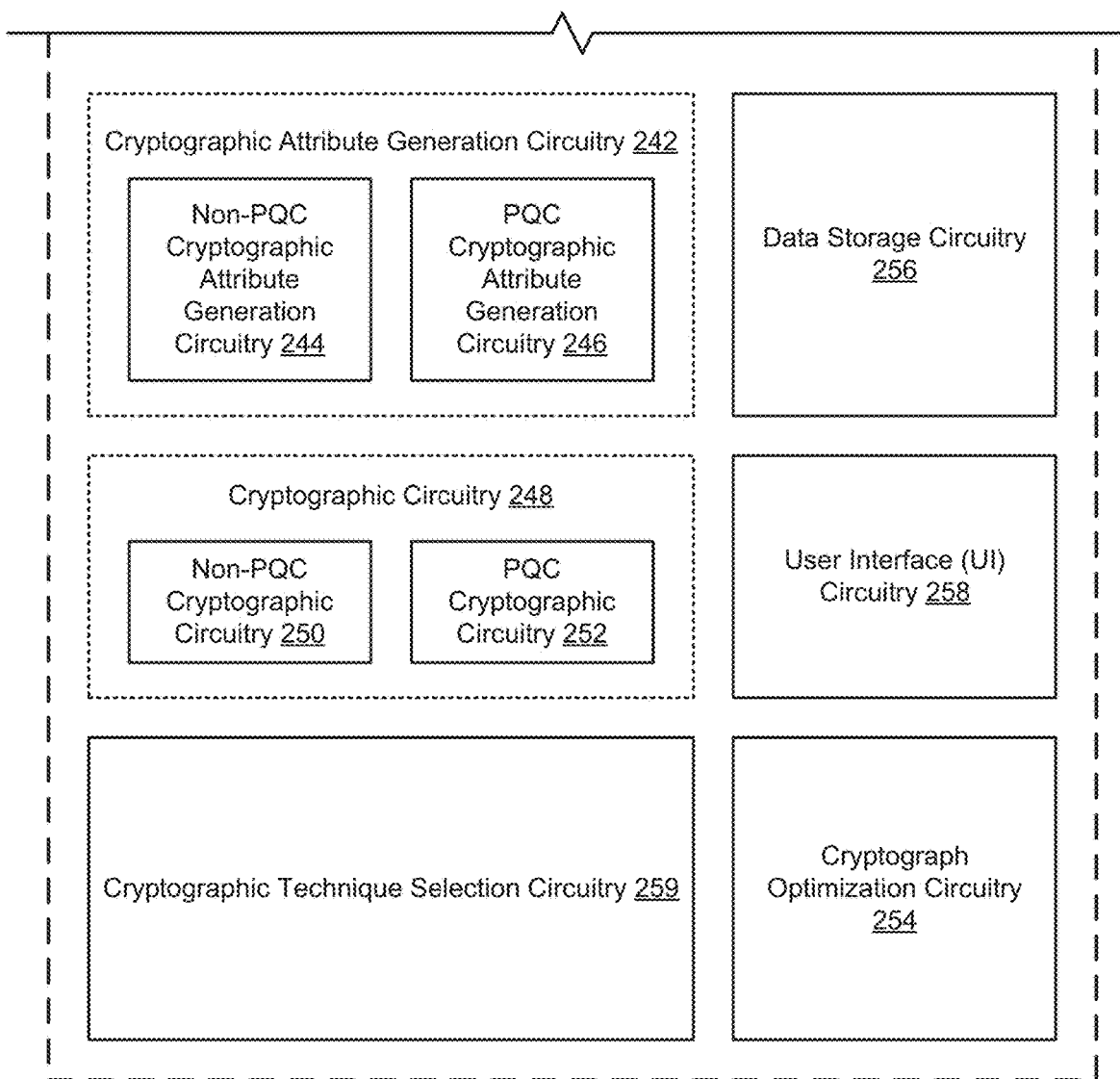

As illustrated in FIG. 2A, the apparatus 200 may include one or more of processing circuitry 202, memory 204, input-output circuitry 206, PQC callback circuitry 207, communications circuitry 208 (including, but not limited to, classical communications circuitry 210 and quantum communications circuitry 212), data attribute generation circuitry 214, data envelope generation circuitry 216, data structure generation circuitry 218, data monitoring circuitry 220 (including, but not limited to, data access monitoring circuitry 222 and data zone monitoring circuitry 224), policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236 (including, but not limited to, non-PQC cryptographic performance circuitry 238 and PQC cryptographic performance circuitry 240), data route identification circuitry 237, cryptographic attribute generation circuitry 242 (including, but not limited to, non-PQC cryptographic attribute generation circuitry 244 and PQC cryptographic attribute generation circuitry 246), cryptographic circuitry 248 (including, but not limited to, non-PQC cryptographic circuitry 250 and PQC cryptographic circuitry 252), cryptograph optimization circuitry 254, data storage circuitry 256, user interface (UI) circuitry 258, any other suitable circuitry, or any combination thereof. The apparatus 200 may be configured to execute the operations described above with respect to FIG. 1 and below with respect to FIGS. 3-16.

In some embodiments, the processing circuitry 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. For example, the memory may be an electronic storage device (e.g., a computer readable storage medium). The memory 204 may be configured to store information, data, data structures, content, control signals, applications, instructions, or the like, for enabling the apparatus to carry out various functions in accordance with example embodiments of the present disclosure. In some instances, the memory 204 may be configured to store data, data structures, data elements, and electronic information associated with one or more data (e.g., unencrypted data, encrypted data, decrypted data, re-encrypted data, double encrypted data, data access control information, bitstreams of data, QC detection data, links or pointers thereto), data attributes, data envelopes, enveloped data structures, policy information, policy attributes, risk profile data structures, cryptograph optimization machine learning model, cryptograph optimization training data, QC detection techniques, (including, but not limited to, detection of quantum computing capabilities; data leakage detection techniques; and data tampering detection techniques), control signals (e.g., QC detection alert control signals), non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, any other suitable data or electronic information, or combinations thereof. It will be understood that the memory 204 may be configured to store any data, data structures, electronic information, requests, control signals, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally, or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processor. Alternatively, or additionally, the processing circuitry 202 may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionalities and operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by user interface circuitry included in the apparatus 200) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202, the input-output circuitry 206 (which may utilize the processing circuitry 202), or both may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may be configured to generate (e.g., by UI circuitry 258) user interface data (e.g., data attribute GUI data, risk profile GUI data, cryptograph optimization GUI data, data monitoring GUI data) for display by one or more other devices with which one or more users directly interact and transmit the generated user interface data to one or more of those devices.

In some embodiments, the apparatus 200 may include PQC callback circuitry 207 that includes hardware components designed or configured to provide for communication with: the PQC cryptographic circuitry (e.g., PQC cryptographic circuitry 252 shown in FIG. 2B) of a client device (e.g., apparatus 280 shown in FIG. 2B, wherein the apparatus 280 does not include the PQC shim circuitry 260); a PQC shim (e.g., PQC shim circuitry 260 shown in FIG. 2B) installed in a network layer of a client device (e.g., apparatus 280 shown in FIG. 2B, wherein the apparatus 280 includes the PQC shim circuitry 260, and wherein the PQC shim circuitry 260 comprises the PQC cryptographic circuitry 252); a PQC add-on device (e.g., the apparatus 290 shown in FIG. 2C) communicatively coupled to a client device (e.g., apparatus 280 shown in FIG. 2B, wherein the apparatus 280 does not include the PQC cryptographic circuitry 252 or the PQC shim circuitry 260); any other suitable circuitry or device; or any combination thereof. For example, PQC callback circuitry 207 may be configured to provide PQC communications channel-based cryptographic techniques, such as the transmission and receipt of sensitive portions (e.g., payloads) of electronic communications to a PQC shim or a PQC add-on device over one or more PQC communications channels.

In some embodiments, the PQC callback circuitry 207 may be configured to establish a non-PQC communications channel based on one or more non-PQC cryptographic algorithms (e.g., as provided by non-PQC cryptographic circuitry 250). In some embodiments, the PQC callback circuitry 207 may be configured to establish a PQC communications channel based on one or more PQC cryptographic algorithms (e.g., as provided by PQC cryptographic circuitry 252). In some embodiments, the PQC callback circuitry 207 may be configured to establish a hybrid PQC communications channel based on one or more hybrid PQC cryptographic algorithms (e.g., as provided by cryptographic circuitry 248, such as provided by a combination of non-PQC cryptographic circuitry 250 and PQC cryptographic circuitry 252).

In one illustrative example, the PQC callback circuitry 207 may be configured to establish a PQC communications channel using a PQC cryptographic algorithm. The cryptographic circuitry 248 may be further configured to generate a secret key (e.g., an AES symmetric cryptographic key). Thereafter, the PQC callback circuitry 207 may transmit the secret key to a remote device (e.g., apparatus 280, apparatus 290) over the PQC communications channel for use in the subsequent exchange of encrypted communications.

In some embodiments, the PQC callback circuitry 207 may be configured to generate (e.g., dynamically generate) the PQC communications channel based on a set of data attributes about the electronic communication, a risk profile data structure indicative of a vulnerability of the electronic communication in a PQC data environment, and PQC cryptographic performance information associated with a set of PQC cryptographic techniques, wherein the PQC cryptographic performance information comprises a set of PQC cryptographic performance attributes for each PQC cryptographic technique in the set of PQC cryptographic techniques. In some embodiments, the PQC callback circuitry 207 may be configured to generate the PQC communications channel based on a machine learning technique, such as a machine learning technique provided or performed by the cryptograph optimization circuitry 254.

The communications circuitry 208 may be any device or circuitry embodied in either hardware or a combination of hardware and software that is configured to receive and/or transmit classical data, quantum information, or both from or to a network and/or any other device, circuitry, or module in communication with the apparatus 200. In this regard, the communications circuitry 208 may include, for example, classical communications circuitry 210 and quantum communications circuitry 212.

The classical communications circuitry 210 may be any device or circuitry embodied in either hardware or a combination of hardware and software that is configured to receive and/or transmit data from or to a network and/or any other device, circuitry, or module in communication with the apparatus 200. In this regard, the classical communications circuitry 210 may include, for example, a network interface for enabling communications with a wired or wireless communications network. For example, the classical communications circuitry 210 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum communications circuitry 212 may be any device or circuitry embodied in either hardware or a combination of hardware and software that is configured to receive and/or transmit quantum particles, such as photons, electrons, or both from or to any other device, circuitry, or module in communication with the apparatus 200. In this regard, the quantum communications circuitry 212 may include, for example, optical components such as an optical communications interface for enabling optical communications over a quantum line. In some embodiments, the quantum communications circuitry 212 may include encoding circuitry (e.g. an on-chip encoder) to generate a set of entangled quantum particles (e.g., qubits, qutrits, qudits) and decoding circuitry (e.g., an on-chip decoder) to receive (e.g., directly or indirectly, such as via switching circuitry), store, and measure a set of entangled quantum particles. In some embodiments, the quantum communications circuitry 212 may further include quantum basis determination circuitry configured to determine the quantum bases, or sets of quantum bases, for encoding and decoding of a given set of quantum particles. In some embodiments, the quantum communications circuitry 212 may include or be communicatively coupled to one or more quantum storage devices configured to store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, and combinations thereof.

In some embodiments, the first portion of the electronic communication may comprise a PQC indicator data structure that identifies the PQC communications channel and indicates that the second portion of the electronic communication is to be transmitted over the PQC communications channel. In some embodiments, the PQC indicator data structure may comprise a link to a PQC shim configured to allow communication with the PQC callback circuitry 207 over the PQC communications channel. For example, the PQC indicator data structure may comprise a PQC shim automatic installation control signal indicative of an electronic instruction for the client device (e.g., apparatus 280 shown in FIG. 2B) to automatically install the PQC shim based on the link. In another example, the PQC indicator data structure may comprise a PQC shim manual installation control signal indicative of an electronic instruction for the client device to manually install the PQC shim based on the link. In still another example, the first portion of the electronic communication may comprise a PQC smart contract comprising the PQC indicator data structure. Once installed on the client device, the PQC shim may be implemented as PQC shim circuitry 260 shown in FIG. 2B.

In some embodiments, the communications circuitry 208 may be configured to receive, retrieve, or obtain data. In some embodiments, the data may comprise data access control information, a link or pointer to the data (e.g., a link to a credit card number), a bitstream, a binary large object (BLOB), any other suitable data, or any combination thereof. In some embodiments, the data may have been encrypted based on a set of encryption attributes, such as a set of non-PQC encryption attributes, a set of PQC encryption attributes, or both (e.g., double encryption where the data has been encrypted based on a set of non-PQC encryption attributes and then double encrypted based on a set of PQC encryption attributes). In some embodiments, the communications circuitry 208 may be configured to receive, retrieve, or obtain the data from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain a set of data attributes about the data. In some embodiments, the communications circuitry 208 may be configured to receive, retrieve, or obtain the set of data attributes from another circuitry, such as processing circuitry 202, data attribute generation circuitry 214, any other suitable circuitry, or a combination thereof. In some embodiments, the communications circuitry 208 may be configured to receive, retrieve, or obtain the set of data attributes from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the set of data attributes, the communications circuitry 208 may be configured to receive, retrieve, or obtain the set of data attributes by extracting the set of data attributes from the data envelope.

In some embodiments, the communications circuitry 208 may be configured to receive, retrieve, or obtain policy information associated with the data. In some embodiments, the communications circuitry 208 may be configured to receive, retrieve, or obtain the policy information from another circuitry, such as processing circuitry 202, policy attribute generation circuitry 226, any other suitable circuitry, or a combination thereof. In some embodiments, the communications circuitry 208 may be configured to receive, retrieve, or obtain the policy information from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain a set of data environment threat data structures associated with one or more data environments in a set of data environments associated with the data. In some embodiments, the communications circuitry 208 may be configured to receive, retrieve, or obtain the set of data environment threat data structures from another circuitry, such as processing circuitry 202, risk profile generation circuitry 228, any other suitable circuitry, or a combination thereof. In some embodiments, the communications circuitry 208 may be configured to receive, retrieve, or obtain the set of data environment threat data structures from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the risk profile data structure, the communications circuitry 208 may be configured to receive, retrieve, or obtain the set of data environment threat data structures by extracting and processing risk profile data structure from the data envelope.

In some embodiments, the communications circuitry 208 may be configured to receive, retrieve, or obtain a risk profile data structure indicative of a vulnerability of the data in a PQC data environment. In some embodiments, the communications circuitry 208 may be configured to receive, retrieve, or obtain the risk profile data structure from another circuitry, such as processing circuitry 202, risk profile generation circuitry 228, any other suitable circuitry, or a combination thereof. In some embodiments, the communications circuitry 208 may be configured to receive, retrieve, or obtain the risk profile data structure from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the risk profile data structure, the communications circuitry 208 may be configured to receive, retrieve, or obtain the risk profile data structure by extracting the risk profile data structure from the data envelope.

In some embodiments, the communications circuitry 208 may be configured to receive, retrieve, or obtain PQC cryptographic performance information associated with a set of PQC cryptographic techniques. In some embodiments, the communications circuitry 208 may be configured to receive, retrieve, or obtain the PQC cryptographic performance information from another circuitry, such as processing circuitry 202, PQC cryptographic performance circuitry 240, any other suitable circuitry, or a combination thereof. In some embodiments, the communications circuitry 208 may be configured to receive, retrieve, or obtain the PQC cryptographic performance information from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

The data attribute generation circuitry 214 includes hardware components designed or configured to request, receive, process, generate, and transmit data, data structures, control signals, and electronic information for use in PQC, non-PQC, or hybrid cryptographic techniques. In some embodiments, the data attribute generation circuitry 214 may be configured to generate a set of data attributes about data, such as the data received by the communications circuitry 208, based on the data. In some embodiments, the data attribute generation circuitry 214 may be configured to generate the set of data attributes about the data based on the data itself, overhead data (e.g., protocol overhead, header, metadata) associated with the data, any other suitable data or electronic information, or any combination thereof. In some embodiments, the data attribute generation circuitry 214 may be configured to generate the set of data attributes about the data based on a machine learning technique, such as a machine learning technique provided or performed by the cryptograph optimization circuitry 254.

In some embodiments, the data attribute generation circuitry 214 set of data attributes about the data may comprise a set of data environment data attributes that is representative of a set of data environments associated with the data. In some embodiments, the set of data environments associated with the data are data environments that the data are expected to be transmitted through in the process of transmission. In some embodiments, the set of data environments are one or more of internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, remote recognized authoritative data sources, Internet of Things networks comprising distributed devices that can store data and pre-defined states such as edge networks, content delivery networks (CDNs), cloud service platforms, social media platforms, dark websites, one or more devices associated with any of the above, one or more device identifiers associated with any of the above, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, one or more devices associated with any of the above, one or more device identifiers associated with any of the above, and/or any combination thereof. In some embodiments, the one or more data environments may be identified based on one or more of: one or more device identifiers, one or more network identifiers, one or more geographic locations associated with one or more devices associated with the one or more data environments, or any other identifier that may be determined, generated, or identified by the apparatus 200 or another apparatus.

In some embodiments, the data attribute generation circuitry 214 may generate a set of data attributes about the data that comprises more than one set of data environment data attributes that are each representative of a set of data environments associated with the data. In some embodiments, each set of data environments associated with the data are data environments that the data are expected to be transmitted through in the process of transmission in one possible path. In some embodiments, the data attribute generation circuitry 214 may receive the data environment data attributes from the data route identification circuitry 237.

In some embodiments, the set of data attributes about the data may comprise a data lineage data attribute indicative of a data lineage of the data. For example, the data attribute generation circuitry 214 may be configured to generate a data lineage data attribute indicative of a data lineage of the data, wherein the set of data attributes comprises the data lineage data attribute.

In some embodiments, the set of data attributes about the data may comprise a cryptographic data attribute indicative of a cryptographic technique used to encrypt the data. In some instances, the data attribute generation circuitry 214 may be configured to generate, without user interactivity, the cryptographic data attribute based on an automated analysis of a bitstream of the data. For example, the data may comprise a bitstream, and the data attribute generation circuitry 214 may be configured to generate, based on an automated analysis of the bitstream and without user interactivity, a cryptographic data attribute indicative of a cryptographic technique used to encrypt the data, wherein the set of data attributes comprises the cryptographic data attribute.

In some embodiments, the set of data attributes about the data may comprise a cryptographic spawn log indicative of a set of cryptographic techniques used to encrypt the data. For example, the data attribute generation circuitry 214 may be configured to generate a cryptographic spawn log comprising a set of timestamps and information indicative of sets of PQC encryption attributes used to encrypt the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data attribute generation circuitry 214 may be configured to generate a cryptographic spawn log comprising a set of encryption identification numbers and information indicative of sets of PQC encryption attributes used to encrypt the data over an amount of encryptions (e.g., all encryptions; the last five encryptions, or any other suitable amount of encryptions), wherein each encryption identification number in the set of encryption identification numbers corresponds to a set of PQC encryption attributes used to encrypt the data at the time associated with the encryption identification number. In some embodiments, the data attribute generation circuitry 214 may be configured to generate a cryptographic spawn log comprising a timestamp and information indicative of the set of PQC encryption attributes used to encrypt the data. In some embodiments, the data attribute generation circuitry 214 may be configured to generate an updated cryptographic spawn log comprising a second timestamp and information indicative of a second set of PQC encryption attributes used to encrypt the data.

In some embodiments, the set of data attributes about the data may comprise a data access log indicative of a set of data activity monitoring information (e.g., database activity monitoring information, access credentials, user identification information, machine identification information) associated with electronic access to the data. For example, the data attribute generation circuitry 214 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In some embodiments, the set of data attributes about the data may comprise a determination that the data has been accessed. For example, the data attribute generation circuitry 214 may be configured to receive the determination that the data has been accessed from the data access monitoring circuitry 222.

In some embodiments, the set of data attributes about the data may comprise a data zone data attribute indicative of a data zone associated with the data. For example, the data attribute generation circuitry 214 may be configured to generate a data zone data attribute indicative of a data zone associated with the data, wherein the set of data attributes comprises the data zone data attribute. In some embodiments, the set of data attributes about the data may comprise a determination that the data has transitioned from a first data zone to a second data zone. For example, the data attribute generation circuitry 214 may be configured to receive the determination that the data has transitioned from a first data zone to a second data zone from the data zone monitoring circuitry 224.

The data envelope generation circuitry 216 includes hardware components designed or configured to request, receive, process, generate, and transmit data, data structures, control signals, and electronic information for use in PQC, non-PQC, or hybrid cryptographic techniques. In some embodiments, the data envelope generation circuitry 216 may be configured to generate a data envelope based on the set of data attributes. In some embodiments, the data envelope generation circuitry 216 may be configured to generate the data envelope based on the set of data attributes. In some embodiments, the data envelope may comprise the set of data attributes. In some embodiments, the data envelope generation circuitry 216 may be configured to generate the data envelope based on the set of data attributes, a risk profile data structure, any other suitable data, or any combination thereof. In some embodiments, the data envelope may comprise the set of data attributes, a risk profile data structure, any other suitable data, or any combination thereof. In some embodiments, each piece of data may have a data envelope, wherein the data envelope comprises one or more attributes about the data. In some embodiments, the data and its envelope may be referred to as a "data BLOB." In some instances, the data envelope will keep track of computing devices that accessed the data, such as computing devices that took an encrypted snapshot of the data and when that encrypted snapshot was taken.

The data structure generation circuitry 218 includes hardware components designed or configured to request, receive, process, generate, and transmit data, data structures, control signals, and electronic information for use in PQC, non-PQC, or hybrid cryptographic techniques. In some embodiments, the data structure generation circuitry 218 may be configured to generate an enveloped data structure based on the data envelope and the data. In some embodiments, the enveloped data structure comprises the data envelope and the data. In some embodiments, the enveloped data structure comprises the data envelope (e.g., set of data attributes, risk profile data structure, any other suitable data, or any combination thereof) and the data (e.g., data access control information, link or pointer to the data, bitstream, BLOB, any other suitable data, or any combination thereof). For example, the enveloped data structure may comprise the data enveloped by the data envelope.

The data monitoring circuitry 220 includes hardware components designed or configured to request, receive, process, generate, and transmit data, data structures, control signals, and electronic information for use in PQC, non-PQC, or hybrid cryptographic techniques. In some embodiments, the data monitoring circuitry 220 may be configured to monitor data, enveloped data structures, any other suitable data or electronic information, or any combination thereof. In this regard, the data monitoring circuitry 220 may include, for example, data access monitoring circuitry 222 and data zone monitoring circuitry 224.

In some embodiments, the data monitoring circuitry 220 may be configured to monitor an enveloped data structure and identify changes in the enveloped data structure. In some embodiments, the enveloped data structure may comprise a data envelope and data. In some embodiments, the data envelope may comprise a set of data attributes about the data and a risk profile data structure indicative of a vulnerability of the data in a PQC data environment. In some embodiments, the data has been encrypted based on a set of non-PQC encryption attributes or a set of PQC encryption attributes. For example, the data monitoring circuitry 220 may be configured to generate an electronic indication of the change in the enveloped data structure, such as a control signal, metadata, or flag indicative of the change. In some embodiments, the data monitoring circuitry 220 may be configured to automatically monitor the enveloped data structure in real-time and without user interactivity; automatically identify the change in the enveloped data structure in real-time and without user interactivity; and generate the electronic indication of the change in the enveloped data structure in real-time and without user interactivity.

In some embodiments, the change in the enveloped data structure may be a change in the risk profile data structure, such as a change in a value of the data, a change in a longevity of the data, a change in a cryptostrength of the data, a change in a result of a vulnerability scan of the data, a change in a vulnerability score value (e.g., any value associated with a vulnerability score data structure comprising a vulnerability score range comprising a minimum vulnerability score value, a maximum vulnerability score value, a median vulnerability score value, a mean vulnerability score value, a first quartile vulnerability score value, a third quartile vulnerability score value, an interquartile vulnerability score range between the first quartile vulnerability score value and the third quartile vulnerability score value, any other suitable value, metric, or range, or any combination thereof) indicative of a percentage of vulnerability of the data in the PQC data environment, a change in a compliance score value indicative of a percentage of compliance of the data to a set of compliance requirements, a change in an approximate time to a quantum computing threat (e.g., changes in collapse time, changes in vulnerabilities to existing algorithms, receipt of a QC detection alert control signal), a change in exogenous data associated with the data, wherein the exogenous data comprises a public sentiment data structure (e.g., a widespread data breach at a third-party system, such as a merchant; a stock market crash; a geopolitical event), a change in any other suitable data, data structure, or data element, or any combination thereof. In some embodiments, the change in the enveloped data structure may be a determination that the data has been accessed and by whom (e.g., user, entity, location). In some embodiments, the change in the enveloped data structure may be a determination that the data has transitioned to a different data zone (e.g., from a first data zone to a second data zone).

In some embodiments, the data monitoring circuitry 220 may be configured to monitor a set of data environments for electronic information related to the encrypted QC detection data. For example, the data monitoring circuitry 220 may be configured to monitor a set of internal data environments (e.g., internal information systems, internal data networks, internal data storage devices) and, in some instances, flag uses of the QC detection data, the private cryptographic key used to encrypt the QC detection data, or any other suitable data that made its way into the internal data environment. In another example, the data monitoring circuitry 220 may be configured to monitor a set of external data environments (e.g., content delivery networks (CDNs), cloud service platforms, social media platforms, dark websites) and, in some instances, flag uses of the unencrypted QC detection data or any other suitable data that made its way into the external data environment.

In some embodiments, the data monitoring circuitry 220 may be further configured to generate a QC detection alert control signal in response to detection of the electronic information related to the encrypted QC detection data. For example, the data monitoring circuitry 220 may be further configured to generate a QC detection alert control signal when the detected electronic information related to the encrypted QC detection data comprises decrypted QC detection data that is the same as the QC detection data. In some embodiments, the QC detection alert control signal may indicate, for example, that the cryptographic technique used to encrypt the QC detection data has been compromised by quantum computing. In some embodiments, the QC detection alert control signal may be configured to instruct, or cause, the cryptographic circuitry 248 to encrypt or re-encrypt data (e.g., enveloped data structures stored in one or more internal or third-party data storage devices) using a PQC cryptographic technique having a cryptostrength that cannot be compromised by that particular quantum computer. In some embodiments, the QC detection alert control signal may be configured to instruct, or cause, the UI circuitry 258 to generate QC detection alert GUI data (e.g., an electronic notification, e-mail, pop-up display, audible alarm) and transmit the generated QC detection alert GUI data to the input-output circuitry 206, and the input-output circuitry 206 may be configured to receive the QC detection alert GUI data and display the received QC detection alert GUI data on one or more display screens.

In some embodiments, wherein the cryptographic circuitry 248 is configured to not transmit the encrypted QC detection data, the data monitoring circuitry 220 may be configured to generate a leakage alert control signal in response to detection of the electronic information related to the encrypted QC detection data. In some embodiments, the leakage alert control signal may indicate, for example, that the QC detection data was leaked from an internal data environment, when the QC detection data was leaked from the internal data environment, the computing device/entity that leaked the QC detection data from the internal data environment (e.g., based on the data lineage of the QC detection data), how the QC detection data was leaked from the internal data environment, any other suitable information, or any combination thereof. In some embodiments, the leakage alert control signal may be configured to instruct, or cause, the communications circuitry 208 to disallow any data to be transmitted out of the internal data environment associated with the leaked QC detection data. In some embodiments, the leakage alert control signal may be configured to instruct, or cause, the UI circuitry 258 to generate leakage alert GUI data (e.g., an electronic notification, e-mail, pop-up display, audible alarm) and transmit the generated leakage alert GUI data to the input-output circuitry 206, and the input-output circuitry 206 may be configured to receive the leakage alert GUI data and display the received leakage alert GUI data on one or more display screens.

In some embodiments, when the detected electronic information related to the encrypted QC detection data comprises a detected digital signature, the data monitoring circuitry 220 may be further configured to verify the detected digital signature based on the public cryptographic key. In some embodiments, the data monitoring circuitry 220 may be further configured to generate a tampering alert control signal when the detected electronic information related to the encrypted QC detection data further comprises detected payload data that has been digitally signed based on the detected digital signature, the detected digital signature is the same as the QC detection digital signature, and the detected payload data is different from the QC detection data.

In some embodiments, the tampering alert control signal may indicate, for example, that the QC detection data has been altered but signed using the same digital signature. For example, the encrypted QC detection data may comprise QC detection data that has been digitally signed based on a digital signature (e.g., RSA, such as RSA-PSS; DSA and its elliptic curve variant ECDSA), and the electronic information related to the encrypted QC detection data may comprise payload data that has been digitally signed based on the digital signature. In some instances, the payload data may be different from the QC detection data, such as a different fraudulent document digitally signed by the same digital signature. In some instances, a subset of the payload data may be the same as a subset of the QC detection data, such as an altered document digitally signed by the same digital signature. For example, the QC detection data may comprise a fictitious stock transfer agreement comprising a first stock transfer attribute indicative of a first amount of transferred shares (e.g., 10 transferred shares), the detected payload data may comprise a detected stock transfer agreement comprising a second stock transfer attribute indicative of a second amount of transferred shares (e.g., 10,000 transferred shares) different from the first amount of transferred shares, and the tampering alert control signal may comprise an indication that the fictitious stock transfer agreement has been tampered with. In other examples, the detected payload data may comprise different buyer or seller information on a digitally signed fictitious electronic mortgage; different owner information on a digitally signed fictitious financial account; different payee or payment amount on a digitally signed fictitious financial transaction (e.g., a fictitious wire transfer, mobile deposit, or electronic check); or any other suitable information.

In some embodiments, the tampering alert control signal may be configured to instruct, or cause, the UI circuitry 258 to generate tampering alert GUI data (e.g., an electronic notification, e-mail, pop-up display, audible alarm) and transmit the generated tampering alert GUI data to the input-output circuitry 206, and the input-output circuitry 206 may be configured to receive the tampering alert GUI data and display the received tampering alert GUI data on one or more display screens.

In some embodiments, the data monitoring circuitry 220 includes hardware components designed or configured to request, receive, process, generate, and transmit data, data structures, control signals, and electronic information for use in QC detection. In some embodiments, the data monitoring circuitry 220 may be configured to monitor QC detection data, other data, enveloped data structures, any other suitable data or electronic information, or any combination thereof.

In some embodiments, the data monitoring circuitry 220 may be configured to monitor a set of data environments for electronic information related to the encrypted QC detection data. For example, the data monitoring circuitry 220 may be configured to monitor a set of internal data environments (e.g., internal information systems, internal data networks, internal data storage devices) and, in some instances, flag uses of the QC detection data, the private cryptographic key used to encrypt the QC detection data, or any other suitable data that made its way into the internal data environment. In another example, the data monitoring circuitry 220 may be configured to monitor a set of external data environments (e.g., content delivery networks (CDNs), cloud service platforms, social media platforms, dark websites) and, in some instances, flag uses of the unencrypted QC detection data or any other suitable data that made its way into the external data environment.

In some embodiments, the data monitoring circuitry 220 may be configured to generate alerts and notifications, such as QC detection alert control signals, leakage alert control signals, and tampering alert control signals. In some embodiments, the data monitoring circuitry 220 may be configured to generate a QC detection alert control signal in response to detection of the electronic information related to the encrypted QC detection data. For example, the data monitoring circuitry 220 may be configured to generate a QC detection alert control signal when the detected electronic information related to the encrypted QC detection data comprises decrypted QC detection data that is the same as the QC detection data. In some embodiments, the QC detection alert control signal may indicate, for example, that the cryptographic technique used to encrypt the QC detection data has been compromised by quantum computing. In some embodiments, the QC detection alert control signal may be configured to instruct, or cause, the cryptographic circuitry 248 to encrypt or re-encrypt data (e.g., enveloped data structures stored in one or more internal or third-party data storage devices) using a PQC cryptographic technique having a cryptostrength that cannot be compromised by that particular quantum computer. In some embodiments, the QC detection alert control signal may be configured to instruct, or cause, the UI circuitry 258 to generate QC detection alert GUI data (e.g., an electronic notification, e-mail, pop-up display, audible alarm) and transmit the generated QC detection alert GUI data to the input-output circuitry 206, and the input-output circuitry 206 may be configured to receive the QC detection alert GUI data and display the received QC detection alert GUI data on one or more display screens.

In some embodiments, wherein the risk profile generation circuitry 228 is configured to not transmit the encrypted QC detection data, the data monitoring circuitry 220 may be configured to generate a leakage alert control signal in response to detection of the electronic information related to the encrypted QC detection data. In some embodiments, the leakage alert control signal may indicate, for example, that the QC detection data was leaked from an internal data environment, when the QC detection data was leaked from the internal data environment, the computing device/entity leaked the QC detection data from the internal data environment (e.g., based on the data lineage of the QC detection data), how the QC detection data was leaked from the internal data environment, any other suitable information, or any combination thereof. In some embodiments, the leakage alert control signal may be configured to instruct, or cause, the communications circuitry 208 to disallow any data to be transmitted out of the internal data environment associated with the leaked QC detection data. In some embodiments, the leakage alert control signal may be configured to instruct, or cause, the UI circuitry 258 to generate leakage alert GUI data (e.g., an electronic notification, e-mail, pop-up display, audible alarm) and transmit the generated leakage alert GUI data to the input-output circuitry 206, and the input-output circuitry 206 may be configured to receive the leakage alert GUI data and display the received leakage alert GUI data on one or more display screens.

In some embodiments, when the detected electronic information related to the encrypted QC detection data comprises a detected digital signature, the data monitoring circuitry 220 may be configured to verify the detected digital signature based on the public cryptographic key. In some embodiments, the data monitoring circuitry 220 may be configured to generate a tampering alert control signal when the detected electronic information related to the encrypted QC detection data further comprises detected payload data that has been digitally signed based on the detected digital signature, the detected digital signature is the same as the QC detection digital signature, and the detected payload data is different from the QC detection data.

In some embodiments, the tampering alert control signal may indicate, for example, that the QC detection data has been altered but signed using the same digital signature. For example, the encrypted QC detection data may comprise QC detection data that has been digitally signed based on a digital signature (e.g., RSA, such as RSA-PSS; DSA and its elliptic curve variant ECDSA), and the electronic information related to the encrypted QC detection data may comprise payload data that has been digitally signed based on the digital signature. In some instances, the payload data may be different from the QC detection data, such as a different fraudulent document digitally signed by the same digital signature. In some instances, a subset of the payload data may be the same as a subset of the QC detection data, such as an altered document digitally signed by the same digital signature. For example, the QC detection data may comprise a fictitious stock transfer agreement comprising a first stock transfer attribute indicative of a first amount of transferred shares (e.g., 10 transferred shares), the detected payload data may comprise a detected stock transfer agreement comprising a second stock transfer attribute indicative of a second amount of transferred shares (e.g., 10,000 transferred shares) different from the first amount of transferred shares, and the tampering alert control signal may comprise an indication that the fictitious stock transfer agreement has been tampered with. In other examples, the detected payload data may comprise different buyer or seller information on a digitally signed fictitious electronic mortgage; different owner information on a digitally signed fictitious financial account; different payee or payment amount on a digitally signed fictitious financial transaction (e.g., a fictitious wire transfer, mobile deposit, or electronic check); or any other suitable information.

In some embodiments, the tampering alert control signal may be configured to instruct, or cause, the UI circuitry 258 to generate tampering alert GUI data (e.g., an electronic notification, e-mail, pop-up display, audible alarm) and transmit the generated tampering alert GUI data to the input-output circuitry 206, and the input-output circuitry 206 may be configured to receive the tampering alert GUI data and display the received tampering alert GUI data on one or more display screens.

In some embodiments, the QC detection data generation circuitry 229 includes hardware components designed or configured to request, receive, process, generate, and transmit data, data structures, control signals, and electronic information for use in QC detection. In some embodiments, the QC detection data generation circuitry 229 may be configured to generate a pair of asymmetric cryptographic keys comprising a public cryptographic key and a private cryptographic key. In some embodiments, the pair of asymmetric cryptographic keys may comprise a pair of RSA asymmetric cryptographic keys comprising an RSA public cryptographic key and an RSA private cryptographic key. In some embodiments, the pair of asymmetric cryptographic keys may comprise a pair of DH asymmetric cryptographic keys comprising a DH public cryptographic key and a DH private cryptographic key. In some embodiments, the QC detection data generation circuitry 229 may be configured to generate encrypted QC detection data based on the pair of asymmetric cryptographic keys. In some embodiments, the risk profile generation circuitry 228 may be configured to destroy the private cryptographic key. In other embodiments, the QC detection data generation circuitry 229 may be configured to destroy both the private cryptographic key and the public cryptographic key.

In some embodiments, the QC detection data generation circuitry 229 may be configured to generate the encrypted QC detection data based on a digital signature-based QC detection technique configured to allow for detection, by the data monitoring circuitry 220, of QC detection data (e.g., a fictitious electronic document) digitally signed using a destroyed RSA private key. In some embodiments, the QC detection data generation circuitry 229 may be configured to generate the encrypted QC detection data based on an encryption-based QC detection technique configured to allow for detection, by the data monitoring circuitry 220, of QC detection data (e.g., disclosed QC detection data that has been transmitted to a remote device) encrypted using a random AES key encrypted using a destroyed RSA private key. In some embodiments, the QC detection data generation circuitry 229 may be configured to generate the encrypted QC detection data based on a code-sign based QC detection technique configured to allow for detection, by the data monitoring circuitry 220, of malware code-signed using a destroyed RSA private key. In some embodiments, the QC detection data generation circuitry 229 may be configured to generate the encrypted QC detection data based on a certificate-based QC detection technique configured to allow for detection, by the data monitoring circuitry 220, of QC detection data (e.g., a fictitious email certificate or legal sign certificate) signed by an issuer certificate authority using a destroyed RSA private key. In some embodiments, the QC detection data generation circuitry 229 may be configured to generate the encrypted QC detection data based on a tamper seal-based QC detection technique configured to allow for detection, by the data monitoring circuitry 220, of QC detection data (e.g., a fraudulent PDF document) with an embedded digital signed object.

The data access monitoring circuitry 222 includes hardware components designed or configured to request, receive, process, generate, and transmit data, data structures, control signals, and electronic information for use in PQC, non-PQC, or hybrid cryptographic techniques. In some embodiments, the data access monitoring circuitry 222 may be configured to monitor the access of data, enveloped data structures, any other suitable data or electronic information, or any combination thereof. For example, the data access monitoring circuitry 222 may be configured to determine that the data has been accessed, generate a determination that the data has been accessed, and transmit the determination that the data has been accessed to any suitable circuitry, such as the data attribute generation circuitry 214.

In some embodiments, the data access monitoring circuitry 222 may be configured to generate a data access log indicative of a set of data activity monitoring information (e.g., database activity monitoring information, access credentials, user identification information, machine identification information) associated with electronic access to the data. For example, the data access monitoring circuitry 222 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data access monitoring circuitry 222 may be configured to generate the set of data activity monitoring information and transmit the set of data activity monitoring information to the data attribute generation circuitry 214, which may be configured to receive the set of data activity monitoring information and generate a data access log based on the set of data activity monitoring information.

In some embodiments, the communications circuitry 208 may be configured to receive the data at a first time, the set of data attributes may be a first set of data attributes, the data envelope may be a first data envelope, the enveloped data structure may be a first enveloped data structure, and the data access monitoring circuitry 222 may be configured to determine that the data has been accessed at a second time later than the first time. In some embodiments, the data access monitoring circuitry 222 may be configured to generate an electronic indication, control signal, metadata, or flag indicating that the data has been accessed at the second time. In response to the determination (e.g., the electronic indication, control signal, metadata, or flag generated by the data access monitoring circuitry 222) that the data has been accessed at the second time, the data attribute generation circuitry 214 may be configured to generate a second set of data attributes about the data based on the data and the determination that the data has been accessed at the second time, the data envelope generation circuitry 216 may be configured to generate a second data envelope based on the second set of data attributes, and the data structure generation circuitry 218 may be configured to generate a second enveloped data structure based on the second data envelope and the data. For example, the first set of data attributes may comprise a first data lineage data attribute indicative of a first data lineage of the data, the second set of data attributes may comprise a second data lineage data attribute indicative of a second data lineage of the data, and the first data lineage data attribute may be different from the second data lineage data attribute.

The data zone monitoring circuitry 224 includes hardware components designed or configured to request, receive, process, generate, and transmit data, data structures, control signals, and electronic information for use in PQC, non-PQC, or hybrid cryptographic techniques. In some embodiments, the data zone monitoring circuitry 224 may be configured to monitor the data zone associated with data, enveloped data structures, any other suitable data or electronic information, or any combination thereof. For example, the data zone monitoring circuitry 224 may be configured to determine that the data has transitioned from a first data zone to a second data zone, generate a determination that the data has transitioned from the first data zone to the second data zone, and transmit the determination that the data has transitioned from the first data zone to the second data zone to any suitable circuitry, such as the data attribute generation circuitry 214.

In some embodiments, the communications circuitry 208 may be configured to receive the data at a first time, the set of data attributes may be a first set of data attributes comprising a first data zone data attribute indicative of a first data zone associated with the data, the data envelope may be a first data envelope, the enveloped data structure may be a first enveloped data structure, and the data zone monitoring circuitry 224 may be configured to determine that the data has transitioned from the first data zone to a second data zone at a second time later than the first time. In some embodiments, the data zone monitoring circuitry 224 may be configured to generate an electronic indication, control signal, metadata, or flag indicating that the data has transitioned from the first data zone to the second data zone at the second time. In response to the determination (e.g., the electronic indication, control signal, metadata, or flag generated by the data zone monitoring circuitry 224) that the data has transitioned from the first data zone to the second data zone at the second time, the data attribute generation circuitry 214 may be configured to generate a second set of data attributes about the data based on the data and the determination that the data has transitioned from the first data zone to the second data zone at the second time. The second set of data attributes may comprise a second data zone data attribute indicative of the second data zone associated with the data, and the second data zone data attribute may be different from the first data zone data attribute. The data envelope generation circuitry 216 may be configured to generate a second data envelope based on the second set of data attributes. The data structure generation circuitry 218 may be configured to generate a second enveloped data structure based on the second data envelope and the data.

In some embodiments, a first enveloped data structure may comprise data and a first data envelope comprising a set of data attributes. The data envelope generation circuitry 216 may be configured to generate a second data envelope comprising the set of data attributes and the risk profile data structure generated by the risk profile generation circuitry 228. The data structure generation circuitry 218 may be configured to generate a second enveloped data structure comprising the second data envelope and the data.

The policy attribute generation circuitry 226 includes hardware components designed or configured to request, receive, process, generate, and transmit data, data structures, control signals, and electronic information for use in PQC, non-PQC, or hybrid cryptographic techniques. In some embodiments, the policy attribute generation circuitry 226 may be configured to receive, retrieve, or obtain policy information associated with the data. In some embodiments, the policy attribute generation circuitry 226 may be configured to retrieve the policy information from a data storage device, such as memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the policy information may comprise a set of technological advancements, such as advancements in materials science related to quantum computing (e.g., room temperature superconductors), advancements in quantum computing capabilities (e.g., the number of qubits in a scalable quantum computing architecture, advancements related to Rose's law), any other suitable data, or any combination thereof. In some embodiments, the policy attribute generation circuitry 226 may be configured to decrease the collapse time z described above with reference to Table 2 in accordance with the amount and significance of technological advancements, and thereby decrease the approximate time to quantum computing threat.

In some embodiments, the policy information may comprise data retention policy information, such as data retention requirements (e.g., also referred to as "security shelf-life") for various classes of data records listed in the FDIC's Records Retention Schedule discussed above with reference to Table 1. In some embodiments, the policy information may comprise compliance information indicative of a set of compliance requirements for the data.

In some embodiments, the policy attribute generation circuitry 226 may be configured to generate a set of policy attributes about the data based on the data and the policy information. In some embodiments, the policy attribute generation circuitry 226 may be configured to receive a data envelope comprising a set of data attributes about the data and generate the set of policy attributes about the data further based on a set of data attributes about the data. In some embodiments, the policy attribute generation circuitry 226 may be configured to receive, retrieve, or obtain the set of data attributes from another circuitry, such as processing circuitry 202, data attribute generation circuitry 214, any other suitable circuitry, or any combination thereof. In some embodiments, the policy attribute generation circuitry 226 may be configured to extract, directly or indirectly, the set of policy attributes from an enveloped data structure, such as from a data envelope included in the enveloped data structure. In some embodiments, the policy attribute generation circuitry 226 may be configured to generate the set of policy attributes about the data based on a machine learning technique, such as a machine learning technique provided or performed by the cryptograph optimization circuitry 254.

In some embodiments, the set of policy attributes may comprise a temporal PQC threat policy attribute indicative of an approximate time to a quantum computing threat (e.g., collapse time). In some embodiments, the policy attribute generation circuitry 226 may be configured to generate the temporal PQC threat policy attribute based on a set of technological advancements included in the policy information. For example, the policy attribute generation circuitry 226 may be configured to decrease the collapse time z described above with reference to Table 2 in accordance with the amount and significance of the technological advancements. In some embodiments, the policy attribute generation circuitry 226 may be configured to generate the temporal PQC threat policy attribute based on the receipt of a QC detection alert control signal, a leakage alert control signal, a tampering alert control signal, any other suitable signal or data, or any combination thereof.

In some embodiments, the policy attribute generation circuitry 226 may be configured to generate the temporal PQC threat policy attribute based on a quantum computing threat assessment data structure. The quantum computing threat assessment data structure may comprise, for example, a quantum computing threat assessment risk level and an electronic recommendation based on the quantum computing threat assessment risk level. In some embodiments, the policy attribute generation circuitry 226 may be configured to generate the quantum computing threat assessment data structure based on security shelf-life, PQC migration time, collapse time, any other suitable parameter, or any combination thereof. For example, the policy attribute generation circuitry 226 may be configured to generate a quantum computing threat assessment data structure in accordance with the quantum computing threat assessment inequalities shown below in Table 3:

TABLE 3

Example quantum computing threat assessment inequalities that may be used by the PQC system described herein to generate quantum computing threat assessment risk levels and electronic recommendations associated therewith.

| Quantum Computing Threat Assessment Inequality | Quantum Computing Threat Assessment Risk Level | Electronic Recommendation based on Quantum Computing Threat Assessment |
|---|---|---|
| $(x + y) < z$ | Risk Level I: Low Risk | Generate electronic notification indicative of quantum computing threat assessment risk level I and transmit to client device. |
| $(x + y) = z$ | Risk Level II: Medium Risk | Generate electronic notification indicative of quantum computing threat assessment risk level II and transmit to client device. |
| $(x + y) > z$ | Risk Level III: High Risk | Initiate automated analysis and processes to mitigate the quantum computing threat because data protected by quantum vulnerable algorithms at the |

TABLE 3-continued

Example quantum computing threat assessment inequalities that may be
used by the PQC system described herein to generate quantum computing threat
assessment risk levels and electronic recommendations associated therewith.

| Quantum Computing Threat Assessment Inequality | Quantum Computing Threat Assessment Risk Level | Electronic Recommendation based on Quantum Computing Threat Assessment |
|---|---|---|
| | | end of the next y years may be compromised by attacks using quantum computers in less than x years from that time; generate electronic notification indicative of quantum computing threat assessment risk level III and transmit to client device. |
| x > z or y > z | Risk Level IV: Immediate Remediation | Generate control signal configured to instruct information security system to perform immediate remediation, such as disconnecting network connections, generate electronic notification indicative of quantum computing threat assessment risk level IV and transmit to client device. | where x is the security shelf-life (e.g., data retention requirement); where y is the PQC migration time; and where z is the collapse time (e.g., time to quantum computing threat). For example, if the security shelf-life x is five years and the migration time y is seven years, while the collapse time z is nine years, the policy attribute generation circuitry 226 may determine that the parameters x, y, and z satisfy the quantum computing threat assessment inequality (x+y)>z and generate a quantum computing threat assessment risk level "Risk Level III: High Risk" indicating that the cryptographic keys (e.g., secret keys) will be compromised for a duration of three years. The policy attribute generation circuitry 226 may be further configured to generate an electronic recommendation based on the quantum computing threat assessment risk level "Risk Level III: High Risk," wherein the electronic recommendation comprises an alert, notification, or control signal configured to instruct the PQC system to initiate automated analysis and planning to mitigate the quantum computing threat now, since data protected by quantum vulnerable tools at the end of the next seven years may be compromised by quantum attacks in less than five years from that time.

In some embodiments, the set of policy attributes may comprise a value of the data. In some embodiments, the set of policy attributes may comprise a longevity of the data. For example, the policy attribute generation circuitry 226 may be configured to generate the longevity of the data based on data retention policy information included in the policy information. In some embodiments, the set of policy attributes may comprise a cryptostrength of the data. In some embodiments, the set of policy attributes may comprise a set of vulnerability scan results. For example, the policy attribute generation circuitry 226 may receive the set of vulnerability scan results from the vulnerability scan circuitry 230.

The risk profile generation circuitry 228 includes hardware components designed or configured to request, receive, process, generate, and transmit data, data structures, control signals, and electronic information for use in PQC, non-PQC, or hybrid cryptographic techniques. In some embodiments, the risk profile generation circuitry 228 may be configured to generate a risk profile data structure indicative of a vulnerability of the data in a PQC data environment. In some embodiments, the risk profile data structure may comprise one or more threat levels for one or more data zones that the data is anticipated to be transmitted through.

In some embodiments, the one or more threat levels are representative of threats in the data zones, such as whether networks associated with the data zones are currently under attack. In some embodiments, the risk profile generation circuitry 228 may be configured to generate the risk profile data structure based on the set of policy attributes. In some embodiments, the risk profile data structure may comprise a plurality of risk profile data elements indicative of a vulnerability of the data in a PQC data environment. In some embodiments, the risk profile data structure may comprise a vulnerability score data structure (e.g., a vulnerability score data structure received from the vulnerability score generation circuitry 232), a vulnerability score explanation data structure (e.g., a vulnerability score explanation data structure received from the vulnerability score generation circuitry 232), a compliance score data structure (e.g., a compliance score data structure received from the compliance score generation circuitry 234), a compliance score explanation data structure (e.g., a compliance score explanation data structure received from the compliance score generation circuitry 234), any other suitable data, or any combination thereof.

The vulnerability scan circuitry 230 includes hardware components designed or configured to request, receive, process, generate, and transmit data, data structures, control signals, and electronic information for use in PQC, non-PQC, or hybrid cryptographic techniques. In some embodiments, the vulnerability scan circuitry 230 may comprise, or be communicatively coupled to, one or more hardware scanners (e.g., scanner appliances), software scanners (e.g., virtual scanners), cloud-based scanners (e.g., cloud agents, Internet scanners, cloud connectors), passive scanners, out-of-band sensors, container sensors, APIs, any other suitable components, or any combinations thereof.

In some embodiments, the vulnerability scan circuitry 230 may be configured to provide vulnerability identification, vulnerability assessment, vulnerability management, application scanning, any other suitable functionality, and any combination thereof. In some embodiments, the vulnerability scan circuitry 230 may be configured to locate, identify, assess, prioritize, and mitigate vulnerabilities. These vulnerabilities include, but are not limited to, SQL injection, cross-site scripting (XSS), cross-site request forgery (CSRF), and uniform resource locator (URL) redirection.

In some embodiments, the vulnerability scan circuitry 230 may be configured to perform a vulnerability scan of the data; and generate a set of vulnerability scan results, wherein the set of policy attributes comprises the set of vulnerability scan results. For example, the vulnerability scan circuitry 230 may be configured to perform a vulnerability scan of the data and generate the set of vulnerability scan results based on the performance of the vulnerability scan. In some embodiments, the vulnerability scan circuitry 230 may be configured to: transmit, to a third-party circuitry or service provider, a request to perform a vulnerability scan of the data; receive a set of vulnerability scan results from the third-party circuitry or service provider; and generate the set of vulnerability scan results based on the set of vulnerability scan results.

The vulnerability score generation circuitry 232 includes hardware components designed or configured to request, receive, process, generate, and transmit data, data structures, control signals, and electronic information for use in PQC, non-PQC, or hybrid cryptographic techniques. In some embodiments, the vulnerability score generation circuitry 232 may be configured to generate a vulnerability score data structure based on the set of policy attributes, wherein the risk profile data structure comprises the vulnerability score data structure.

In some embodiments, the vulnerability score data structure may comprise a vulnerability score value indicative of a percentage of vulnerability of the data in the PQC data environment. In some embodiments, the vulnerability score generation circuitry 232 may be configured to generate a normalized vulnerability score value based on a normalization of the vulnerability score value to a common scale (e.g., 0.0 to 1.0; 0.00 to 100.00; 0.0% to 100.0%).

In some embodiments, the vulnerability score data structure may comprise a vulnerability score range comprising a minimum vulnerability score value, a maximum vulnerability score value, a median vulnerability score value, a mean vulnerability score value, a first quartile vulnerability score value, a third quartile vulnerability score value, an interquartile vulnerability score range between the first quartile vulnerability score value and the third quartile vulnerability score value, any other suitable value, metric, or range, or any combination thereof. In some embodiments, the vulnerability score generation circuitry 232 may be configured to generate a normalized vulnerability score range based on a normalization of the vulnerability score range to a common scale.

In some embodiments, the vulnerability score generation circuitry 232 may be configured to generate a vulnerability score explanation data structure indicative of an explanation of the vulnerability score data structure, wherein the risk profile data structure comprises the vulnerability score explanation data structure. In some embodiments, the vulnerability score explanation data structure may be a local interpretable model-agnostic explanations (LIME) data structure indicative of one or more identified vulnerabilities, where those vulnerabilities were located (e.g., at the time of identification), how and why those vulnerabilities were identified, how and why those vulnerabilities were assessed, how and why those vulnerabilities where prioritized, and how and why those vulnerabilities were mitigated.

The compliance score generation circuitry 234 includes hardware components designed or configured to request, receive, process, generate, and transmit data, data structures, control signals, and electronic information for use in PQC, non-PQC, or hybrid cryptographic techniques. In some embodiments, the compliance score generation circuitry 234 may be configured to generate a compliance score data structure. For example, the compliance score generation circuitry 234 may be configured to receive (e.g., from policy attribute generation circuitry 226 or any other suitable device or circuitry) policy information comprising compliance information indicative of a set of compliance requirements for the data. The compliance score generation circuitry 234 may be configured to generate a compliance score explanation data structure based on the vulnerability score data structure and the compliance information, wherein the risk profile data structure comprises the compliance score data structure.

In some embodiments, the compliance score data structure comprises a compliance score value indicative of a percentage of compliance of the data to the set of compliance requirements. In some embodiments, the compliance score generation circuitry 234 may be configured to generate a normalized compliance score value based on a normalization of the compliance score value to a common scale (e.g., 0.0 to 1.0; 0.00 to 100.00; 0.0% to 100.0%). In some embodiments, the normalized compliance score value may be different from the normalized vulnerability score value.

In some embodiments, the compliance score data structure may comprise a compliance score range comprising a minimum compliance score value, a maximum compliance score value, a median compliance score value, a mean compliance score value, a first quartile compliance score value, a third quartile compliance score value, an interquartile compliance score range between the first quartile compliance score value and the third quartile compliance score value, any other suitable value, metric, or range, or any combination thereof. In some embodiments, the compliance score generation circuitry 234 may be configured to generate a normalized compliance score range based on a normalization of the compliance score range to a common scale. In some embodiments, the normalized compliance score range may be different from the normalized vulnerability score range.

In some embodiments, the compliance score generation circuitry 234 may be configured to generate a compliance score explanation data structure indicative of an explanation of the compliance score data structure, wherein the risk profile data structure comprises the compliance score explanation data structure. In some embodiments, the compliance score explanation data structure may be a LIME data structure indicative of one or more identified compliance attributes, where those compliance attributes were located (e.g., at the time of identification), how and why those compliance attributes were identified, how and why those compliance attributes were assessed, how and why those compliance attributes where prioritized, and how and why those compliance attributes were mitigated.

The threat level generation circuitry 235 includes hardware components designed or configured to request, receive, process, generate, and transmit data, data structures, control signals, and electronic information related to one or more data environments. In some embodiments, the threat level generation circuitry 235 may be configured to retrieve data environment threat data structures associated with one or more data environments. In some embodiments, the threat level generation circuitry 235 may be configured to generate the data environment threat data structures associated with data environments.

In some embodiments, the data environment threat data structures may comprise a threat level score range comprising a minimum threat level score value, a maximum threat level score value, a median threat level score value, a mean threat level score value, a first quartile threat level score value, a third quartile threat level score value, an interquartile threat level score range between the first quartile threat level score value and the third quartile threat level score value, any other suitable value, metric, or range, or any combination thereof. In some embodiments, the threat level generation circuitry 235 may be configured to generate a normalized threat level score range based on a normalization of the threat level score range to a common scale. In some embodiments, the data environment threat data structures may further include one or more pre-selected cryptographic techniques that are pre-determined to be appropriate for each data environment associated with the data environment threat data structures based on the threat level score. In some alternative embodiments, the one or more data environment threat data structures do not include the one or more pre-selected cryptographic techniques.

The cryptographic performance circuitry 236 includes hardware components designed or configured to request, receive, process, generate, and transmit data, data structures, control signals, and electronic information for use in PQC, non-PQC, or hybrid cryptographic techniques. In some embodiments, the cryptographic performance circuitry 236 may be configured to retrieve cryptographic performance information associated with a set of non-PQC cryptographic techniques, a set of PQC cryptographic techniques, or both. In this regard, the cryptographic performance circuitry 236 may include, for example, non-PQC cryptographic performance circuitry 238 and PQC cryptographic performance circuitry 240.

The data route identification circuitry 237 includes hardware components designed or configured to request, receive, process, generate, and transmit data, data structures, control signals, and electronic information related to one or more sets of data environment data attributes that are each representative of a set of data environments associated with the data. In some embodiments, each set of data environments associated with the data are data environments that the data are expected to be transmitted through in the process of transmission in one possible path. In some embodiments, data route identification circuitry 237 may generate more than one sets of data environment data attribute because more than one possible path is identified. In some embodiment, the one or more sets of data environment data attributes may be generated based on a machine learning technique.

In some embodiments, the cryptographic performance circuitry 236 may be implemented as InfoPQC circuitry (e.g., as described with reference to example PQC system architecture 1000 shown in FIG. 10A, example InfoPQC system architecture 1010 shown in FIG. 10B, or a combination thereof). In some embodiments, the cryptographic performance circuitry 236 may be configured to generate non-PQC cryptographic performance information, PQC cryptographic performance information (e.g., example PQC cryptographic performance information 1020 shown in FIG. 10C), and hybrid PQC cryptographic performance information comprising a combination of non-PQC and PQC cryptographic performance information.

The non-PQC cryptographic performance circuitry 238 includes hardware components designed or configured to request, receive, process, generate, and transmit data, data structures, control signals, and electronic information for use in PQC, non-PQC, or hybrid cryptographic techniques. In some embodiments, the non-PQC cryptographic performance circuitry 238 may be configured to generate and retrieve non-PQC cryptographic performance information associated with a set of non-PQC cryptographic techniques. In some embodiments, the non-PQC cryptographic performance circuitry 238 may be configured to retrieve the non-PQC cryptographic performance information from one or more of the one or more PQC server devices 104, the one or more PQC databases 106, any other suitable device, or any combination thereof. In some embodiments, the non-PQC cryptographic performance circuitry 238 may be configured to generate the non-PQC cryptographic performance information based on a machine learning technique, such as a machine learning technique provided or performed by the cryptograph optimization circuitry 254.

In some embodiments, the non-PQC cryptographic performance information may comprise a set of non-PQC cryptographic performance attributes for each non-PQC cryptographic technique (e.g., each variant of each non-PQC cryptographic algorithm) in the set of non-PQC cryptographic techniques. In some embodiments, each non-PQC cryptographic technique in the set of non-PQC cryptographic techniques may be a variant of a non-PQC cryptographic algorithm. In some embodiments, the set of non-PQC cryptographic performance attributes may comprise key space, key length, and runtime resource requirements (e.g., memory, time) for varied data block sizes (e.g., 100 kilobytes, 10 megabytes, 1 gigabyte). In some embodiments, the set of non-PQC cryptographic performance attributes may comprise key sizes (e.g., public, private, or both), time taken, key generation, encryption, decryption, signature generation, signature verification, length, ciphertext, signature, cost, computational efficiency, memory requirements, how configurable the non-PQC cryptographic technique is, whether the parameters of the non-PQC cryptographic technique are tunable, how the non-PQC cryptographic technique fits in with standard protocols, whether the non-PQC cryptographic technique resistant to misuse, and then the simplicity of managing the non-PQC cryptographic technique.

In some embodiments, the set of non-PQC cryptographic performance attributes may comprise a CPU utilization for each non-PQC cryptographic technique in the set of non-PQC cryptographic techniques. In some embodiments, the set of non-PQC cryptographic performance attributes may comprise a memory utilization for each non-PQC cryptographic technique in the set of non-PQC cryptographic techniques. In some embodiments, the set of non-PQC cryptographic performance attributes may comprise an encryption time (e.g., a determined processing time needed to encrypt a unit of data, such as seconds per megabyte of data) for each non-PQC cryptographic technique in the set of non-PQC cryptographic techniques. In some embodiments, the set of non-PQC cryptographic performance attributes may comprise a decryption time (e.g., a determined processing time needed to decrypt a unit of encrypted data, such as seconds per megabyte of data) for each non-PQC cryptographic technique in the set of non-PQC cryptographic techniques. In some embodiments, the set of non-PQC cryptographic performance attributes may comprise a verification time (e.g., a determined processing time needed to verify a unit of encrypted data, such as seconds per megabyte of data) for each non-PQC cryptographic technique in the set of non-PQC cryptographic techniques. In some embodiments, the set of non-PQC cryptographic performance attributes may comprise a key length (e.g., key size) for each non-PQC cryptographic technique in the set of non-PQC cryptographic techniques. In some embodiments, the set of non-PQC cryptographic performance attributes may comprise a payload size for each non-PQC cryptographic technique in the set of non-PQC cryptographic techniques. In some embodiments, the set of non-PQC cryptographic performance attributes may comprise a payload longevity for each non-PQC cryptographic technique in the set of non-PQC cryptographic techniques. In some embodiments, the set of non-PQC cryptographic performance attributes may comprise a payload sensitivity level for each non-PQC cryptographic technique in the set of non-PQC cryptographic techniques. In some embodiments, the payload sensitivity level may be a sensitivity level pre-defined for a payload that represents an information classification. In some embodiments, the set of non-PQC cryptographic performance attributes may comprise a payload security classification for each non-PQC cryptographic technique in the set of non-PQC cryptographic techniques. In some embodiments, the payload security classification may represent one or more pre-defined information classification for the payload. In some embodiments, the set of non-PQC cryptographic performance attributes may comprise a set of policy attributes for each non-PQC cryptographic technique in the set of non-PQC cryptographic techniques. In some embodiments, the set of non-PQC cryptographic performance attributes may comprise an information classification for each non-PQC cryptographic technique in the set of non-PQC cryptographic techniques. In some embodiments, the set of non-PQC cryptographic performance attributes may comprise a mode of operation for each non-PQC cryptographic technique in the set of non-PQC cryptographic techniques.

The PQC cryptographic performance circuitry 240 includes hardware components designed or configured to request, receive, process, generate, and transmit data, data structures, control signals, and electronic information for use in PQC, non-PQC, or hybrid cryptographic techniques. In some embodiments, the PQC cryptographic performance circuitry 240 may be configured to generate and retrieve PQC cryptographic performance information associated with a set of PQC cryptographic techniques. In some embodiments, the PQC cryptographic performance circuitry 240 may be configured to retrieve the PQC cryptographic performance information from one or more of the one or more PQC server devices 104, the one or more PQC databases 106, any other suitable device, or any combination thereof.

In some embodiments, the PQC cryptographic performance circuitry 240 may be configured to generate the PQC cryptographic performance information. For example, the PQC cryptographic performance circuitry 240 may be configured to generate information indicative of the algorithm and implementation scale for each PQC cryptographic technique in the set of PQC cryptographic techniques. In another example, the PQC cryptographic performance circuitry 240 may be configured to generate electronic information indicative of the efficiency, performance, and deterministic operation of each PQC cryptographic technique in the set of PQC cryptographic techniques. In another example, the PQC cryptographic performance circuitry 240 may be configured to perform a cryptanalysis for each PQC cryptographic technique in the set of PQC cryptographic techniques and generate, based on the cryptanalysis, a confidence data structure comprising a confidence score for each PQC cryptographic technique in the set of PQC cryptographic techniques. In yet another example, the PQC cryptographic performance circuitry 240 may be configured to generate electronic information indicative of the usability and interoperability of each PQC cryptographic technique in the set of PQC cryptographic techniques. In some embodiments, the PQC cryptographic performance circuitry 240 may be configured to generate the PQC cryptographic performance information by capturing performance metrics reflecting the performance of the various PQC cryptographic technique implementations. In some embodiments, the PQC cryptographic performance circuitry 240 may be configured to generate the PQC cryptographic performance information based on a machine learning technique, such as a machine learning technique provided or performed by the cryptograph optimization circuitry 254. The PQC cryptographic performance circuitry 240 may use the PQC cryptographic performance information and the various data components thereof to improve machine understanding of how these PQC cryptographic techniques may can be used the PQC system 102. In some instances, the PQC cryptographic performance circuitry 240 may use the captured performance metrics to evaluate other implementations of these or other PQC cryptographic techniques.

In some embodiments, the PQC cryptographic performance information may comprise a set of PQC cryptographic performance attributes for each PQC cryptographic technique (e.g., each variant of each PQC cryptographic algorithm) in the set of PQC cryptographic techniques. In some embodiments, each PQC cryptographic technique in the set of PQC cryptographic techniques may be a variant of a PQC cryptographic algorithm. In some embodiments, the set of PQC cryptographic performance attributes may comprise key space, key length, and runtime resource requirements (e.g., memory, time) for varied data block sizes (e.g., 100 kilobytes, 10 megabytes, 1 gigabyte). In some embodiments, the set of PQC cryptographic performance attributes may comprise key sizes (e.g., public, private, or both), time taken, key generation, encryption, decryption, signature generation, signature verification, length, ciphertext, signature, cost, computational efficiency, memory requirements, how configurable the PQC cryptographic technique is, whether the parameters of the PQC cryptographic technique are tunable, how the PQC cryptographic technique fits in with standard protocols, whether the PQC cryptographic technique resistant to misuse, and then the simplicity of managing the PQC cryptographic technique.

In some embodiments, the set of PQC cryptographic performance attributes may comprise a CPU utilization for each PQC cryptographic technique in the set of PQC cryptographic techniques. In some embodiments, the set of PQC cryptographic performance attributes may comprise a memory utilization for each PQC cryptographic technique in the set of PQC cryptographic techniques. In some embodiments, the set of PQC cryptographic performance attributes may comprise an encryption time (e.g., a determined processing time needed to encrypt a unit of data, such as seconds per megabyte of data) for each PQC cryptographic technique in the set of PQC cryptographic techniques. In some embodiments, the set of PQC cryptographic performance attributes may comprise a decryption time (e.g., a determined processing time needed to decrypt a unit of encrypted data, such as seconds per megabyte of data) for each PQC cryptographic technique in the set of PQC cryptographic techniques. In some embodiments, the set of PQC cryptographic performance attributes may comprise a verification time (e.g., a determined processing time needed to verify a unit of encrypted data, such as seconds per megabyte of data) for each PQC cryptographic technique in the set of PQC cryptographic techniques. In some embodiments, the set of PQC cryptographic performance attributes may comprise a key length (e.g., key size) for each PQC cryptographic technique in the set of PQC cryptographic techniques. In some embodiments, the set of PQC cryptographic performance attributes may comprise a payload size for each PQC cryptographic technique in the set of PQC cryptographic techniques. In some embodiments, the set of PQC cryptographic performance attributes may comprise a payload longevity for each PQC cryptographic technique in the set of PQC cryptographic techniques. In some embodiments, the set of PQC cryptographic performance attributes may comprise a set of policy attributes for each PQC cryptographic technique in the set of PQC cryptographic techniques. In some embodiments, the set of PQC cryptographic performance attributes may comprise an information classification for each PQC cryptographic technique in the set of PQC cryptographic techniques. In some embodiments, the set of PQC cryptographic performance attributes may comprise a mode of operation for each PQC cryptographic technique in the set of PQC cryptographic techniques.

The cryptographic attribute generation circuitry 242 includes hardware components designed or configured to request, receive, process, generate, and transmit data, data structures, control signals, and electronic information for use in PQC, non-PQC, or hybrid cryptographic techniques. In some embodiments, the cryptographic attribute generation circuitry 242 may be configured to generate a set of non-PQC encryption attributes for encrypting the data, a set of PQC encryption attributes for encrypting the data, or both. In this regard, the cryptographic attribute generation circuitry 242 may include, for example, non-PQC cryptographic attribute generation circuitry 244 and PQC cryptographic attribute generation circuitry 246.

The non-PQC cryptographic attribute generation circuitry 244 includes hardware components designed or configured to request, receive, process, generate, and transmit data, data structures, control signals, and electronic information for use in PQC, non-PQC, or hybrid cryptographic techniques. In some embodiments, the non-PQC cryptographic attribute generation circuitry 244 may be configured to generate a set of non-PQC encryption attributes for encrypting the data. In some embodiments, the non-PQC cryptographic attribute generation circuitry 244 may be configured to generate the set of non-PQC encryption attributes based on the set of data attributes, the risk profile data structure, and the non-PQC cryptographic performance information. In some embodiments, the non-PQC cryptographic attribute generation circuitry 244 may be configured to receive, retrieve, or obtain the set of data attributes from another circuitry, such as processing circuitry 202, data attribute generation circuitry 214, any other suitable circuitry, or any combination thereof. In some embodiments, the non-PQC cryptographic attribute generation circuitry 244 may be configured to extract, directly or indirectly, the set of policy attributes from an enveloped data structure, such as from a data envelope included in the enveloped data structure. In some embodiments, the non-PQC cryptographic attribute generation circuitry 244 may be configured to receive, retrieve, or obtain the risk profile data structure from another circuitry, such as processing circuitry 202, risk profile generation circuitry 228, any other suitable circuitry, or any combination thereof. In some embodiments, the non-PQC cryptographic attribute generation circuitry 244 may be configured to extract, directly or indirectly, the risk profile data structure from an enveloped data structure, such as from a data envelope included in the enveloped data structure. In some embodiments, the non-PQC cryptographic attribute generation circuitry 244 may be configured to generate the set of non-PQC encryption attributes based on a machine learning technique, such as a machine learning technique provided or performed by the cryptograph optimization circuitry 254.

The PQC cryptographic attribute generation circuitry 246 includes hardware components designed or configured to request, receive, process, generate, and transmit data, data structures, control signals, and electronic information for use in PQC, non-PQC, or hybrid cryptographic techniques. In some embodiments, the PQC cryptographic attribute generation circuitry 246 may be configured to generate a set of PQC encryption attributes for encrypting the data. In some embodiments, the PQC cryptographic attribute generation circuitry 246 may be configured to generate the set of PQC encryption attributes based on the set of data attributes, the risk profile data structure, and the PQC cryptographic performance information. In some embodiments, the PQC cryptographic attribute generation circuitry 246 may be configured to receive, retrieve, or obtain the set of data attributes from another circuitry, such as processing circuitry 202, data attribute generation circuitry 214, any other suitable circuitry, or any combination thereof. In some embodiments, the PQC cryptographic attribute generation circuitry 246 may be configured to extract, directly or indirectly, the set of policy attributes from an enveloped data structure, such as from a data envelope included in the enveloped data structure. In some embodiments, the PQC cryptographic attribute generation circuitry 246 may be configured to receive, retrieve, or obtain the risk profile data structure from another circuitry, such as processing circuitry 202, risk profile generation circuitry 228, any other suitable circuitry, or any combination thereof. In some embodiments, the PQC cryptographic attribute generation circuitry 246 may be configured to extract, directly or indirectly, the risk profile data structure from an enveloped data structure, such as from a data envelope included in the enveloped data structure. In some embodiments, the PQC cryptographic attribute generation circuitry 246 may be configured to generate the set of PQC encryption attributes based on a machine learning technique, such as a machine learning technique provided or performed by the cryptograph optimization circuitry 254.

In some embodiments, the PQC cryptographic attribute generation circuitry 246 may be configured to generate an allowable transaction time for encryption of the data. In some embodiments, the PQC cryptographic attribute generation circuitry 246 may be configured to generate the set of PQC encryption attributes further based on the allowable transaction time.

In some embodiments, the PQC cryptographic attribute generation circuitry 246 may be configured to generate the PQC cryptographic performance information. In some embodiments, the PQC cryptographic performance information may comprise a set of PQC cryptographic performance attributes for each PQC cryptographic technique in the set of PQC cryptographic techniques. In some instances, a PQC cryptographic technique in the set of PQC cryptographic techniques may be a variant of a PQC cryptographic algorithm. In some instances, a PQC cryptographic technique in the set of PQC cryptographic techniques may be a variant of a PQC communications channel cryptographic technique. In some instances, a PQC cryptographic technique in the set of PQC cryptographic techniques may be a combination of a first variant of a PQC cryptographic algorithm and a second variant of a PQC communications channel cryptographic technique.

In some embodiments, the PQC cryptographic attribute generation circuitry 246 may be configured to generate a set of PQC cryptographic performance attribute weightage values based on the set of data attributes, the risk profile data structure, and the PQC cryptographic performance information. The set of PQC cryptographic performance attribute weightage values may comprise a PQC cryptographic performance attribute weightage value $w_i$ for each cryptographic performance attribute in the set of PQC cryptographic performance attributes for a particular PQC cryptographic technique, where i is an integer ranging from 1 to N, and where N is an integer that is greater than or equal to 1. In some embodiments, each PQC cryptographic performance attribute weightage value $w_i$ in the set of PQC cryptographic performance attribute weightage values may correspond to a respective PQC cryptographic performance attribute in the set of PQC cryptographic performance attributes. For example, the set of PQC cryptographic performance attributes may comprise N PQC cryptographic performance attributes, and the set of PQC cryptographic performance attribute weightage values may comprise N PQC cryptographic performance attribute weightage values, where each PQC cryptographic performance attribute weightage value $w_i$ in the set of N PQC cryptographic performance attributes corresponds to a respective cryptographic performance attribute in the set of N PQC cryptographic performance attributes for the particular PQC cryptographic technique.

In some embodiments, the PQC cryptographic attribute generation circuitry 246 may be configured to generate a set of PQC cryptographic performance attribute scores for each PQC cryptographic performance attribute in the set of PQC cryptographic performance attributes and each PQC cryptographic technique in the set of PQC cryptographic techniques based on the set of data attributes, the risk profile data structure, and the PQC cryptographic performance information. The set of PQC cryptographic performance attribute scores may comprise a PQC cryptographic performance attribute score $s_{i,j,k}$ for each cryptographic performance attribute in the set of PQC cryptographic performance attributes for a particular PQC cryptographic technique, where i refers to the i-th PQC cryptographic performance attribute in the set of PQC cryptographic performance attributes, where i is an integer ranging from 1 to N, and where N is an integer that is greater than or equal to 1; where j refers to the j-th variant of a PQC cryptographic algorithm in the set of PQC cryptographic techniques, where j is an integer ranging from 1 to M, and where M is an integer that is greater than or equal to 1; and where k refers to the k-th PQC cryptographic algorithm in the set of PQC cryptographic techniques, where k is an integer ranging from 1 to P, and where P is an integer that is greater than or equal to 1.

In some embodiments, the PQC cryptographic attribute generation circuitry 246 may be configured to generate a set of weighted PQC cryptographic performance attribute scores based on the set of PQC cryptographic performance attribute scores and the set of PQC cryptographic performance attribute weightage values. In some embodiments, the PQC cryptographic attribute generation circuitry 246 may be configured to generate the set of weighted PQC cryptographic performance attribute scores according to equation 1 below:

$$S_{i,j,k} = w_i \times s_{i,j,k} \tag{1}$$

where $w_i$ is the PQC cryptographic performance attribute weightage value for each cryptographic performance attribute in the set of PQC cryptographic performance attributes; $s_{i,j,k}$ is the PQC cryptographic performance attribute score for each cryptographic performance attribute; and $S_{i,j,k}$ is the weighted PQC cryptographic performance attribute score, where i refers to the i-th PQC cryptographic performance attribute in the set of PQC cryptographic performance attributes, where i is an integer ranging from 1 to N, and where N is an integer that is greater than or equal to 1; where j refers to the j-th variant of a PQC cryptographic algorithm in the set of PQC cryptographic techniques, where j is an integer ranging from 1 to M, and where M is an integer that is greater than or equal to 1; and where k refers to the k-th PQC cryptographic algorithm in the set of PQC cryptographic techniques, where k is an integer ranging from 1 to P, and where P is an integer that is greater than or equal to 1.

In some embodiments, the PQC cryptographic attribute generation circuitry 246 may be configured to generate a set of PQC cryptographic technique scores based on the set of weighted PQC cryptographic performance attribute scores. In some embodiments, each PQC cryptographic technique score in the set of PQC cryptographic technique scores may correspond to a respective PQC cryptographic technique in the set of PQC cryptographic techniques. In some embodiments, the PQC cryptographic attribute generation circuitry 246 may be configured to generate set of PQC cryptographic technique scores according to equation 2 below:

$$T_{j,k} = \sum_{i=1}^{N} S_{i,j,k} \tag{2}$$

where $T_{j,k}$ is the PQC cryptographic technique score for each PQC cryptographic technique (e.g., each variant of each PQC cryptographic algorithm); and $S_{i,j,k}$ is the weighted PQC cryptographic performance attribute score, where i refers to the i-th PQC cryptographic performance attribute in the set of PQC cryptographic performance attributes, where i is an integer ranging from 1 to N, and where N is an integer that is greater than or equal to 1; where j refers to the j-th variant of a PQC cryptographic algorithm in the set of PQC cryptographic techniques, where j is an integer ranging from 1 to M, and where M is an integer that is greater than or equal to 1; and where k refers to the k-th PQC cryptographic algorithm in the set of PQC cryptographic techniques, where k is an integer ranging from 1 to P, and where P is an integer that is greater than or equal to 1.

In some embodiments, the set of PQC cryptographic technique scores may comprise a PQC cryptographic technique score range comprising a minimum PQC cryptographic technique score, a maximum PQC cryptographic technique score, a median PQC cryptographic technique score, a mean PQC cryptographic technique score, a first quartile PQC cryptographic technique score, a third quartile PQC cryptographic technique score, an interquartile PQC cryptographic technique score range between the first quartile PQC cryptographic technique score and the third quartile PQC cryptographic technique score, any other suitable value, metric, or range, or any combination thereof.

In some embodiments, the PQC cryptographic attribute generation circuitry 246 may be configured to generate the set of PQC encryption attributes for encrypting the data based on the set of PQC cryptographic technique scores. For example, the set of PQC cryptographic technique scores may comprise a maximum PQC cryptographic technique score, and the PQC cryptographic attribute generation circuitry 246 may be configured to generate the set of PQC encryption attributes for encrypting the data based on an optimal PQC cryptographic technique that corresponds to the maximum PQC cryptographic technique score. In another example, the set of PQC cryptographic technique scores may comprise subset of high PQC cryptographic technique scores (e.g., the top three PQC cryptographic technique scores), and the PQC cryptographic attribute generation circuitry 246 may be configured to generate the set of PQC encryption attributes for encrypting the data based on an optimal PQC cryptographic technique that corresponds to a PQC cryptographic technique score in the subset of high PQC cryptographic technique scores having the highest cryptostrength. In another example, the set of PQC cryptographic technique scores may comprise a median PQC cryptographic technique score, the set of PQC cryptographic technique scores may comprise a subset of PQC cryptographic technique scores above the median PQC cryptographic technique score, and the PQC cryptographic attribute generation circuitry 246 may be configured to generate the set of PQC encryption attributes for encrypting the data based on an optima; PQC cryptographic technique that corresponds to a PQC cryptographic technique score in the subset of PQC cryptographic technique scores above the median PQC cryptographic technique score having the lowest transaction time. In yet another example, the set of PQC cryptographic technique scores may comprise a third quartile subset of PQC cryptographic technique scores, and the PQC cryptographic attribute generation circuitry 246 may be configured to generate the set of PQC encryption attributes for encrypting the data based on an optimal PQC cryptographic technique that corresponds to a PQC cryptographic technique score in the third quartile subset of PQC cryptographic technique scores above the median PQC cryptographic technique score having the lowest CPU utilization, the lowest memory utilization, the lowest latency, the lowest time for operation, or a combination thereof.

The cryptographic circuitry 248 includes hardware components designed or configured to request, receive, process, generate, and transmit data, data structures, control signals, and electronic information for use in PQC, non-PQC, or hybrid cryptographic techniques. In some embodiments, the cryptographic circuitry 248 may be configured to encrypt data based on a set of PQC encryption attributes, a set of non-PQC encryption attributes, or both. In this regard, the cryptographic circuitry 248 may include, for example, non-PQC cryptographic circuitry 250 and PQC cryptographic circuitry 252. In some embodiments, where the first portion of the electronic communication comprises a cryptographic data attribute indicative of a symmetric cryptographic technique and the second portion of the electronic communication comprises a symmetric cryptographic key, such as an AES symmetric cryptographic key, the cryptographic circuitry 248 may be configured to authenticate a session (e.g., perform a cryptographic handshake) with the client device over the non-PQC communications channel based on the symmetric cryptographic key that was transmitted to the client device over the PQC communications channel. In some embodiments, the cryptographic circuitry 248 may be configured to encrypt QC detection data based on a set of encryption attributes such as a set of PQC encryption attributes, a set of non-PQC encryption attributes, or combination of both.

In some embodiments, the cryptographic circuitry 248 may be configured to authenticate a session (e.g., perform a cryptographic handshake) with the client device over the non-PQC communications channel based on the quantum cryptographic key that was transmitted to the client device over the quantum communications channel. In some embodiments, the cryptographic circuitry 248 may be configured to encrypt the second portion of the electronic communication based on the quantum cryptographic key before transmission to the client device over the PQC communications channel.

The non-PQC cryptographic circuitry 250 includes hardware components designed or configured to request, receive, process, generate, and transmit data, data structures, control signals, and electronic information for use in PQC, non-PQC, or hybrid cryptographic techniques. In some embodiments, the non-PQC cryptographic circuitry 250 may be configured to encrypt the data based on the set of non-PQC encryption attributes.

The PQC cryptographic circuitry 252 includes hardware components designed or configured to request, receive, process, generate, and transmit data, data structures, control signals, and electronic information for use in PQC, non-PQC, or hybrid cryptographic techniques. In some embodiments, the PQC cryptographic circuitry 252 may be configured to encrypt the data based on the set of PQC encryption attributes.

In some embodiments, the data may have been encrypted using a non-PQC cryptographic technique, and the PQC cryptographic attribute generation circuitry 246 may be configured to determine a PQC cryptographic technique based on a set of data attributes, a risk profile data structure, PQC cryptographic performance information associated with a set of PQC cryptographic techniques, or a combination thereof. The PQC cryptographic circuitry 252 may be configured to encrypt the data using the PQC cryptographic technique.

In some embodiments, the data may have been encrypted using a first PQC cryptographic technique, and the PQC cryptographic attribute generation circuitry 246 may be configured to determine a PQC cryptographic technique based on a set of data attributes, a risk profile data structure, PQC cryptographic performance information associated with a set of PQC cryptographic techniques, or a combination thereof. The PQC cryptographic circuitry 252 may be configured to encrypt the data using the second PQC cryptographic technique.

In some embodiments, the communications circuitry 208 may be configured to receive the data at a first time, the set of data attributes may be a first set of data attributes comprising a first cryptographic data attribute indicative of a first cryptographic technique used to encrypt the data, the data envelope may be a first data envelope, the enveloped data structure may be a first enveloped data structure, and the PQC cryptographic circuitry 252 may be configured to encrypt the data using a second cryptographic technique at a second time later than the first time. In response to an encryption of the data using the second cryptographic technique at the second time, the data attribute generation circuitry 214 may be configured to generate a second set of data attributes about the data based on the data and the encryption of the data using the second cryptographic technique at the second time. The second set of data attributes may comprise a second cryptographic data attribute indicative of the second cryptographic technique used to encrypt the data at the second time, and the second cryptographic data attribute may be different from the first cryptographic data attribute. The data envelope generation circuitry 216 may be configured to generate a second data envelope based on the second set of data attributes. The data structure generation circuitry may be configured to generate a second enveloped data structure based on the second data envelope and the data. In one example, the first cryptographic technique may be a non-PQC cryptographic technique, and the second cryptographic technique may be a PQC cryptographic technique. In another example, the first cryptographic technique may be a first PQC cryptographic technique, and the second cryptographic technique may be a second PQC cryptographic technique different from the first PQC cryptographic technique (including, but not limited to, a different variant of the same PQC cryptographic algorithm).

In some embodiments, the cryptographic circuitry 248 may be configured to encrypt data using various recommended cryptographic techniques selected by the cryptographic technique selection circuitry 259, such as non-PQC cryptographic techniques, PQC cryptographic techniques, and hybrid PQC cryptographic techniques (e.g., hybrid PQC cryptographic technique={PQC cryptographic technique, Non-PQC cryptographic technique}). For example, the recommended cryptographic technique may comprise a hybrid PQC cryptographic mode, such as a signature-based hybrid PQC cryptographic mode consisting of a non-PQC cryptographic signature and a PQC cryptographic signature, where the hybrid PQC cryptographic mode is valid only if both the non-PQC cryptographic signature and the PQC cryptographic signature are valid (e.g., the PQC system may perform validation of the non-PQC cryptographic signature according to FIPS 140-3; the PQC system may perform validation of the PQC cryptographic signature using multiple public-key algorithms for X.509 certificates, such as quantum-resistant X.509 Multiple Public Key Algorithm Certificates).

The cryptograph optimization circuitry 254 includes hardware components designed or configured to request, receive, process, generate, and transmit data, data structures, control signals, and electronic information for use in PQC, non-PQC, or hybrid cryptographic techniques. In some embodiments, the cryptograph optimization circuitry 254 may be configured to provide machine learning techniques, any other suitable functionality, or any combination thereof. For example, the cryptograph optimization circuitry 254 may be configured to provide a machine learning technique, machine learning functionality, or both to the data attribute generation circuitry 214, data envelope generation circuitry 216, data structure generation circuitry 218, data monitoring circuitry 220, policy attribute generation circuitry 226, risk profile generation circuitry 228, cryptographic performance circuitry 236, cryptographic attribute generation circuitry 242, cryptographic technique selection circuitry 259, any other circuitry, or any combination thereof. In some embodiments, the cryptograph optimization circuitry 254 may be configured to determine the machine learning technique from among a set of machine learning techniques. In some embodiments, the cryptograph optimization circuitry 254 may be configured to determine (e.g., predict) which cryptographic technique (e.g., non-PQC cryptographic technique, PQC cryptographic technique, or hybrid PQC cryptographic technique) to use for data encryption based on test data, production data, data environments identified that would be associated with transmission of data, and any of the parameters described herein.

In some embodiments, the cryptograph optimization circuitry 254 may be configured to provide a machine learning technique, machine learning functionality, or both to the cryptographic technique selection circuitry 259 for selection of a recommended PQC cryptographic technique. In some embodiments, the cryptograph optimization circuitry 254 may be configured to provide a machine learning technique, machine learning functionality, or both to the data attribute generation circuitry 214 for use in generation of the set of data attributes about the data. In some embodiments, the cryptograph optimization circuitry 254 may be configured to provide a machine learning technique, machine learning functionality, or both to the policy attribute generation circuitry 226 for use in generation of the set of policy attributes about the data. In some embodiments, the cryptograph optimization circuitry 254 may be configured to provide a machine learning technique, machine learning functionality, or both to the PQC cryptographic performance circuitry 240 for use in generation of the PQC cryptographic performance information. In some embodiments, the cryptograph optimization circuitry 254 may be configured to provide a machine learning technique, machine learning functionality, or both to the PQC cryptographic attribute generation circuitry 246 for use in generation of the set of PQC encryption attributes. In some embodiments, the cryptograph optimization circuitry 254 may be configured to provide a machine learning technique, machine learning functionality, or both to risk profile generation circuitry 228 and/or QC detection data generation circuitry 229 for use in generation of the QC detection data.

In some embodiments, the cryptograph optimization circuitry 254 may be configured to receive cryptograph optimization training data including one or more of PQC cryptographic performance information, one or more sets of data attributes associated with one or more sets of historical data encrypted using one or more of the set of PQC cryptographic techniques and transmitted after being encrypted that may include (among others) a set of data zones associated with the set of historical data and a set of risk profile data structures associated with the set of historical data, a set of network compromise history data associated with the set of data zones, a set of recipient attributes that represent information associated with a recipient of a previous transmission (such as a client device described in conjunction with FIGS. 3A-3D) associated with the set of historical data, a set of payload attributes associated with the set of historical data that was transmitted to the client device, a set of policy attributes associated with the set of historical data, any other suitable data, any form of combination and/or labeled version thereof. In some embodiments, the cryptograph optimization circuitry 254 may be configured to generate a set of synthetic data based on the training data. In some embodiments, the cryptograph optimization circuitry 254 may be configured to receive a set of labels associated with the synthetic data or the training data.

In some embodiments, the cryptographic technique selection circuitry 259 may be configured to select a PQC encryption algorithm (or select to not use a PQC encryption algorithm, such as select non-PQC cryptographic techniques) for encrypting data (e.g., data to be transmitted) based on sets of data attributes, risk profile data structure, the PQC performance information, and a cryptograph optimization machine learning model. In some embodiments, cryptographic technique selection circuitry may also select the cryptographic technique to be used with the PQC encryption algorithm such as non-PQC cryptographic techniques, PQC cryptographic techniques, and hybrid PQC cryptographic techniques (e.g., hybrid PQC cryptographic technique={PQC cryptographic technique, Non-PQC cryptographic technique}).

The data storage circuitry 256 includes hardware components designed or configured to request, receive, process, generate, store, and transmit data, data structures, control signals, and electronic information for use in PQC, non-PQC, or hybrid cryptographic techniques. In some embodiments, the data storage circuitry 256 may be configured to store data (e.g., unencrypted data, encrypted data, decrypted data, re-encrypted data, double encrypted data, data access control information, bitstreams of data, links or pointers thereto), data attributes, data envelopes, enveloped data structures, policy information, policy attributes, risk profile data structures, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, any other suitable data or electronic information, or combinations thereof in a data storage device, a database management system, any other suitable storage device or system, or any combination thereof.

For example, the data storage circuitry 256 may be configured to store an enveloped data structure in a data storage device, a database management system, or a combination thereof. In some embodiments, the data storage circuitry 256 may be configured to store the data, data structures, control signals, and electronic information in the data storage device, the database management system, or both in real-time and without user interactivity.

In some embodiments, the data storage device may comprise, or be implemented as, memory 204, one or more of the one or more PQC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, the database management system may comprise, or be implemented as, a database management system (DBMS), such as a relational DMBS (RDBMS) data warehouse, a first non-relational DBMS (e.g., Hadoop distributed file system (HDFS), Hbase), a second non-relational DBMS (e.g., content management systems), a data visualization device, a data mart (e.g., online analytical processing (OLAP) cube), a real-time analytical RDBMS, any other suitable device or circuitry, or a combination thereof. In some embodiments, the data storage device, the database management system, or both may comprise, or be implemented as, one or more decentralized storage devices, such as a cloud storage device or system.

The UI circuitry 258 includes hardware components designed or configured to generate graphical user interface (GUI) data configured to be displayed by a display device. For instance, the UI circuitry 258 may include hardware components designed or configured to generate GUI data based on any embodiment or combination of embodiments described with reference to FIGS. 1-16. In some embodiments, the UI circuitry 258 may be configured to generate GUI data and transmit the generated GUI data to the input-output circuitry 206, and the input-output circuitry 206 may be configured to receive the GUI data and display the received GUI data on one or more display screens. In some embodiments, the UI circuitry 258 may include hardware components designed or configured to generate the GUI data based on one or more portions of the data; data attributes; data envelopes; enveloped data structures; policy information; policy attributes; risk profile data structures; non-PQC cryptographic techniques; non-PQC cryptographic performance information; non-PQC encryption attributes; PQC cryptographic performance information; PQC cryptographic techniques; PQC encryption attributes; symmetric cryptographic keys; asymmetric cryptographic keys; quantum particles; quantum cryptographic keys; quantum one-time pads; any other suitable data, data structures, electronic information, or quantum information; any links or pointers thereto; and any combinations thereof. The GUI data may comprise, for example, data attribute GUI data generated based on the set of data attributes; risk profile GUI data generated based on the risk profile data structure; Cryptograph optimization GUI data generated based on the PQC cryptographic performance information (including, but not limited to, the set of PQC cryptographic performance attributes), the set of PQC encryption attributes, or both; and data monitoring GUI data generated based on the monitoring of enveloped data structures, electronic indications of changes in the monitored enveloped data structures, any other suitable data, or any combination thereof.

In some embodiments, the UI circuitry 258 may be configured to generate a data attribute GUI based on the set of data attributes. In some embodiments, the UI circuitry 258 may be configured to generate a risk profile GUI data based on the risk profile data structure. In some embodiments, the UI circuitry 258 may be configured to generate a Cryptograph optimization GUI based on the PQC cryptographic performance information (including, but not limited to, the set of PQC cryptographic performance attributes), the set of PQC encryption attributes, or both. In some embodiments, the UI circuitry 258 may be configured to generate a data monitoring GUI based on the monitoring of enveloped data structures, electronic indications of changes in the monitored enveloped data structures, any other suitable data, or any combination thereof. In some embodiments, the communications circuitry 208 may be configured to transmit the data attribute GUI, risk profile GUI, cryptograph optimization GUI, data monitoring GUI, or a combination thereof to a client device for display by the client device.

It should also be appreciated that, in some embodiments, each of the data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, and cryptographic technique selection circuitry 259 may include a separate processor, specially configured field programmable gate array (FPGA), ASIC, or cloud utility to perform the above functions.

Figure 2B:
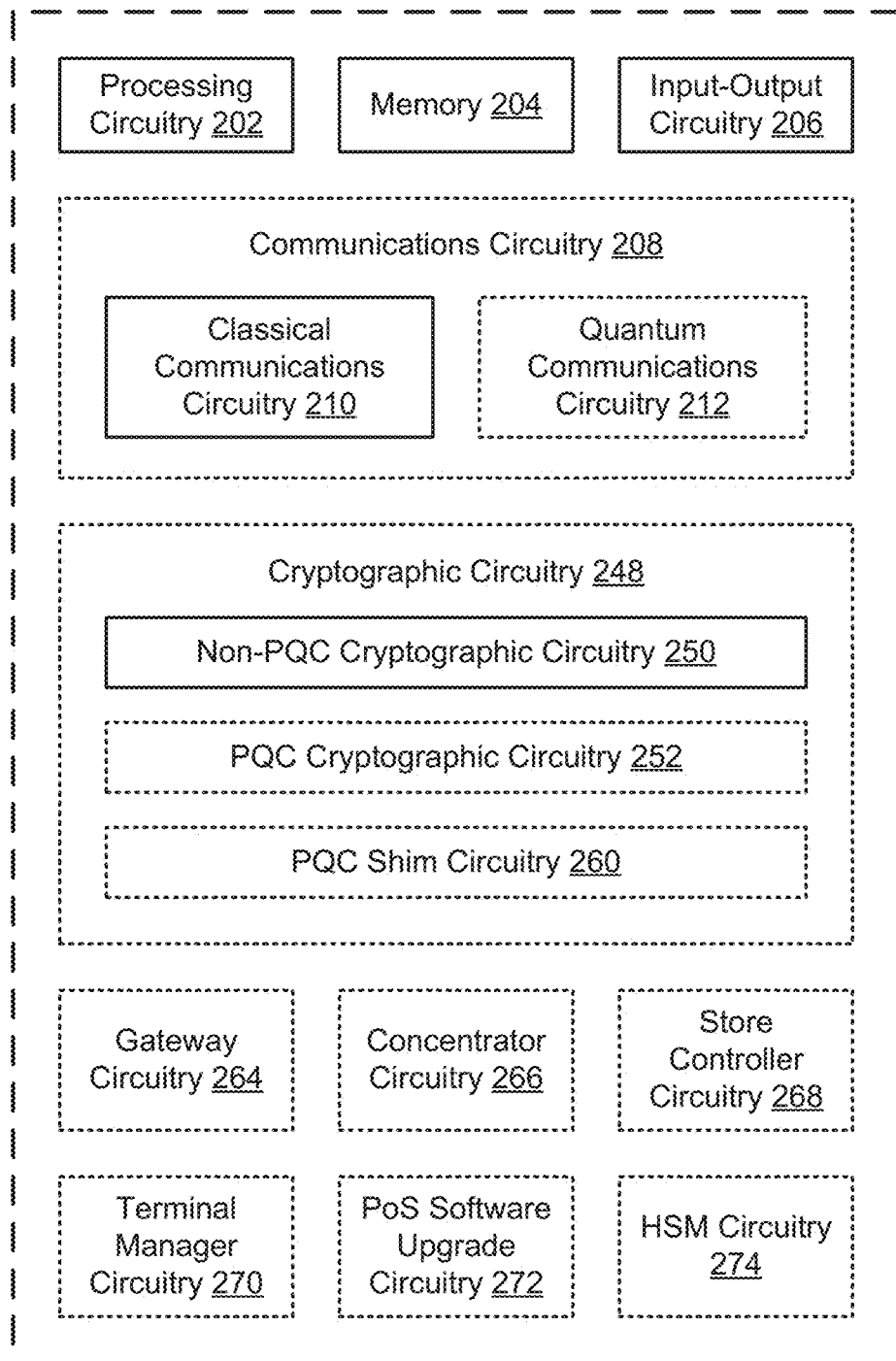

In some embodiments, the hardware components described above with reference to data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, and cryptographic technique selection circuitry 259 may, for instance, utilize PQC callback circuitry 207, communications circuitry 208, or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, the PQC callback circuitry of another apparatus (e.g., the PQC callback circuitry 207 of a separate apparatus implementing one or more portions of apparatus 200 shown in FIG. 2A), the PQC shim circuitry of another apparatus (e.g., the PQC shim circuitry 260 of a separate apparatus implementing one or more portions of apparatus 280 shown in FIG. 2B), the communications circuitry of another apparatus (e.g., the communications circuitry 208 of a separate apparatus implementing one or more portions of apparatus 200, 280, or 290), each other, or any other suitable circuitry or device.

In some embodiments, one or more of the data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, and cryptographic technique selection circuitry 259 may be hosted locally by the apparatus 200.

In some embodiments, one or more of the data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, and cryptographic technique selection circuitry 259 may be hosted remotely (e.g., by one or more cloud servers) and thus need not physically reside on the apparatus 200. Thus, some or all of the functionality described herein may be provided by a third-party circuitry. For example, the apparatus 200 may access one or more third-party circuitries via a networked connection configured to transmit and receive data and electronic information between the apparatus 200 and the third-party circuitries. In turn, the apparatus 200 may be in remote communication with one or more of the data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, and cryptographic technique selection circuitry 259.

As illustrated in FIG. 2B, an apparatus 280 is shown that represents an example server device 110, client device 112, database server device 114, remote server device 116, any other suitable device, or a combination thereof. The apparatus 280 may include one or more of processing circuitry 202, memory 204, input-output circuitry 206, communications circuitry 208 (including, but not limited to, classical communications circuitry 210 and quantum communications circuitry 212), cryptographic circuitry 248 (including, but not limited to, non-PQC cryptographic circuitry 250, PQC cryptographic circuitry 252, and, in some instances, PQC shim circuitry 260, wherein PQC shim circuitry 260 comprises PQC cryptographic circuitry 252), gateway circuitry 264, concentrator circuitry 266, store controller circuitry 268, terminal manager circuitry 270, PoS software upgrade circuitry 272, hardware security module (HSM) circuitry 274, any other suitable circuitry, or any combination thereof. It will be understood, however, that additional components providing additional functionality may be included in the apparatus 280 without departing from the scope of the present disclosure. The apparatus 280 may be involved in execution of various operations described above with respect to FIGS. 1 and 2A and below with respect to FIGS. 3-16.

In some embodiments, such as in embodiments where the apparatus 280 is a classical, non-PQC device that does not include PQC cryptographic circuitry, the apparatus 280 may be modified to include PQC shim circuitry 260. The PQC shim circuitry 260 may include hardware components designed or configured to allow communication with a PQC callback (e.g., PQC callback circuitry 207 shown in FIG. 2A). The PQC shim circuitry 260 includes hardware components designed or configured to request, receive, process, generate, and transmit data, data structures, control signals, and electronic information for use in PQC, non-PQC, or hybrid cryptographic techniques. For example, PQC shim circuitry 260 may be configured to provide PQC communications channel-based cryptographic techniques, such as the transmission and receipt of sensitive portions (e.g., payloads) of electronic communications to a PQC callback over one or more PQC communications channels. In some embodiments, the PQC shim circuitry 260 may be installed in a network layer of the apparatus 280. In some embodiments, the PQC shim circuitry 260 may comprise the PQC cryptographic circuitry 252.

In some embodiments, the first portion of the electronic communication may comprise a PQC request data structure indicative of a request for an acknowledgment or confirmation that the client device (e.g., the apparatus 280) is configured to communicate over a PQC communications channel. The client device may be configured to communicate over a PQC communications channel if the client device, or a PQC add-on device (e.g., apparatus 290 shown in FIG. 3C) coupled to the client device, comprises the PQC cryptographic circuitry 252, either without the PQC shim circuitry 260 or as a part of the PQC shim circuitry 260. For example, the classical communications circuitry 210 may be configured to receive the first portion of the electronic communication comprising the PQC request data structure from the server device (e.g., the apparatus 200 shown in FIG. 2A) over the non-PQC communications channel.

In some embodiments, if the client device is configured to communicate over a PQC communications channel, the classical communications circuitry 210 may be configured to transmit, to the server device, a PQC acknowledgement data structure indicating that it is configured to communicate over a PQC communications channel. In response to receipt of the PQC acknowledgement data structure by the server device, the PQC callback circuitry 207 of the server device may be configured to transmit the second portion of the electronic communication to the client device over the PQC communications channel. Subsequently, the PQC cryptographic circuitry 252, either without the PQC shim circuitry 260 or as a part of the PQC shim circuitry 260, may be configured to receive the second portion of the electronic communication from the server device over the PQC communications channel.

In some embodiments, if the client device is not configured to communicate over a PQC communications channel, the classical communications circuitry 210 may be configured to transmit, to the server device, a PQC negative-acknowledgement data structure indicating that it is not configured to communicate over a PQC communications channel. Alternatively, if the client device is not configured to communicate over a PQC communications channel, the classical communications circuitry 210 may be configured to not transmit any response to the server device.

In some embodiments, in response to receipt of the PQC negative-acknowledgement data structure by the server device, or the lack of receipt of a response by the server device after a predetermined time period (e.g., a predetermined period of inactivity or predetermined elapsed time, such as a timeout), the PQC callback circuitry 207 of the server device may be configured to transmit a PQC indicator data structure to the client device over the PQC communications channel. The PQC indicator data structure may comprise a link to a PQC shim configured to allow communication with the PQC callback circuitry 207 over the PQC communications channel. Subsequently, the classical communications circuitry 210 may be configured to transmit, to the server device, a PQC acknowledgement data structure indicating that it is configured to communicate over a PQC communications channel.

In some embodiments, the PQC indicator data structure may further identify the quantum communications channel and indicate that a quantum cryptographic key is to be transmitted over the quantum communications channel. The PQC indicator data structure may comprise a link or pointer to the quantum communications channel, a header that identifies the quantum communications channel and comprises other identification and routing information. In some embodiments, the PQC indicator data structure may comprise a link to the quantum cryptographic key. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a quantum flag value. In another example, the PQC indicator data structure may comprise a link to a quantum electronic agreement (e.g., a bilateral agreement between the PQC system and the client device to exchange quantum information over the quantum communications channel) comprising the PQC indicator data structure.

In some embodiments, the first portion of the electronic communication may comprise a quantum request data structure indicative of a request for an acknowledgment or confirmation that the client device (e.g., the apparatus 280) is configured to communicate over a quantum communications channel. The client device may be configured to communicate over a quantum communications channel if the client device, or a PQC add-on device (e.g., apparatus 290 shown in FIG. 3C) coupled to the client device, comprises the quantum communications circuitry 212. For example, the classical communications circuitry 210 may be configured to receive the first portion of the electronic communication comprising the quantum request data structure from the server device (e.g., the apparatus 200 shown in FIG. 2A) over the non-PQC communications channel.

In some embodiments, if the client device is configured to communicate over a quantum communications channel, the classical communications circuitry 210 may be configured to transmit, to the server device, a quantum acknowledgement data structure indicating that it is configured to communicate over a quantum communications channel. In response to receipt of the quantum acknowledgement data structure by the server device, the quantum communications circuitry 212 of the server device may be configured to transmit the quantum cryptographic key to the client device over the quantum communications channel. The quantum communications circuitry 212 may be configured to receive the quantum cryptographic key from the server device over the quantum communications channel. Subsequently, the cryptographic circuitry 248 may be configured to authenticate a session (e.g., perform a cryptographic handshake) with the client device over the non-PQC communications channel based on the quantum cryptographic key that was transmitted to the client device over the quantum communications channel.

In some embodiments, if the client device is not configured to communicate over a quantum communications channel, the classical communications circuitry 210 may be configured to transmit, to the server device, a quantum negative-acknowledgement data structure indicating that the client device is not configured to communicate over a quantum communications channel. Alternatively, if the client device is not configured to communicate over a quantum communications channel, the classical communications circuitry 210 may be configured to not transmit any response to the server device. In some embodiments, in response to receipt of the quantum negative-acknowledgement data structure by the server device, or the lack of receipt of a response by the server device after a predetermined time period (e.g., a predetermined period of inactivity or predetermined elapsed time, such as a timeout), the quantum communications circuitry 212 of the server device may be configured to not transmit the quantum cryptographic key or the second portion of the electronic communication to the client device.

The gateway circuitry 264 includes hardware components designed or configured to request, receive, process, generate, and transmit data, data structures, control signals, and electronic information for use in PQC, non-PQC, or hybrid cryptographic techniques. In some embodiments, the gateway circuitry 264 may be configured to provide transactions management, payment processing, any other suitable functionality, and any combination thereof for one or more PoS devices or other devices communicatively coupled to the apparatus 280.

The concentrator circuitry 266 includes hardware components designed or configured to request, receive, process, generate, and transmit data, data structures, control signals, and electronic information for use in PQC, non-PQC, or hybrid cryptographic techniques. In some embodiments, the concentrator circuitry 266 may be configured to connect multiple PoS devices or other devices to the apparatus 280. For example, the concentrator circuitry 266 may be configured to provide communications management, connectivity, any other suitable functionality, and any combination thereof for one or more PoS devices or other devices communicatively coupled to the apparatus 280.

The store controller circuitry 268 includes hardware components designed or configured to request, receive, process, generate, and transmit data, data structures, control signals, and electronic information for use in PQC, non-PQC, or hybrid cryptographic techniques. In some embodiments, the store controller circuitry 268 may be configured to provide applications, services, any other suitable functionality, and any combination thereof for one or more PoS devices or other devices communicatively coupled to the apparatus 280.

The terminal manager circuitry 270 includes hardware components designed or configured to request, receive, process, generate, and transmit data, data structures, control signals, and electronic information for use in PQC, non-PQC, or hybrid cryptographic techniques. In some embodiments, the terminal manager circuitry 270 may be configured to provide terminal management, terminal monitoring, terminal control, terminal updating, any other suitable functionality, and any combination thereof for one or more PoS devices or other devices communicatively coupled to the apparatus 280.

The PoS software upgrade circuitry 272 includes hardware components designed or configured to request, receive, process, generate, and transmit data, data structures, control signals, and electronic information for use in PQC, non-PQC, or hybrid cryptographic techniques. In some embodiments, the PoS software upgrade circuitry 272 may be configured to provide software upgrading functionality, proxy upgrade functionality (e.g., upgrade to a PQC or PQC-related proxy), any other suitable functionality, and any combination thereof for one or more PoS devices or other devices communicatively coupled to the apparatus 280. In some embodiments, the PoS software upgrade circuitry 272 may be configured to upgrade the PoS proxy of connected PoS devices.

The HSM circuitry 274 includes hardened, tamper-resistant hardware components designed or configured to request, receive, process, generate, and transmit data, data structures, control signals, and electronic information for use in PQC, non-PQC, or hybrid cryptographic techniques. In some embodiments, the HSM circuitry 274 may be configured to provide: protection for cryptographic keys, customer personal identification numbers (PINs), magnetic stripe data, EMV (originally Europay, Mastercard, and Visa) chip data, and mobile application counterparts thereof (e.g., virtual debit cards and credit cards stored in a user's mobile wallet); native cryptographic support for card scheme payment applications; any other suitable functionality; and any combination thereof for one or more PoS devices or other devices communicatively coupled to the apparatus 280. In some embodiments, the HSM circuitry 274 may be configured to provide: personal identification number (PIN) generation, management and validation; PIN block translation during the network switching of ATM and PoS transactions; card, user, and cryptogram validation during payment transaction processing; payment credential issuing for payment cards and mobile applications; point-to-point encryption (P2PE) key management and secure data decryption; secure key sharing with third parties to facilitate secure communications; any other suitable functionality; and any combination thereof.

It should also be appreciated that, in some embodiments, each of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, PoS software upgrade circuitry 272, and HSM circuitry 274 may include a separate processor, specially configured FPGA, ASIC, or cloud utility to perform the above functions.

In some embodiments, the hardware components described above with reference to cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, PoS software upgrade circuitry 272, and HSM circuitry 274, may, for instance, utilize communications circuitry 208 or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, the PQC callback circuitry of another apparatus (e.g., the PQC callback circuitry 207 of a separate apparatus implementing one or more portions of apparatus 200 shown in FIG. 2A), the PQC shim circuitry of another apparatus (e.g., the PQC shim circuitry 260 of a separate apparatus implementing one or more portions of apparatus 280), the communications circuitry of another apparatus (e.g., the communications circuitry 208 of a separate apparatus implementing one or more portions of apparatus 200, 280, or 290), each other, or any other suitable circuitry or device.

In some embodiments, one or more of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, PoS software upgrade circuitry 272, and HSM circuitry 274 may be hosted locally by the apparatus 280.

In some embodiments, one or more of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, PoS software upgrade circuitry 272, and HSM circuitry 274 may be hosted remotely (e.g., by one or more cloud servers) and thus need not physically reside on the apparatus 280. Thus, some or all of the functionality described herein may be provided by a third-party circuitry. For example, the apparatus 280 may access one or more third-party circuitries via a networked connection configured to transmit and receive data and electronic information between the apparatus 280 and the third-party circuitries. In turn, the apparatus 280 may be in remote communication with one or more of the cryptographic circuitry 248, non-PQC cryptographic circuitry 250, PQC cryptographic circuitry 252, PQC shim circuitry 260, gateway circuitry 264, concentrator circuitry 266, store controller circuitry 268, terminal manager circuitry 270, PoS software upgrade circuitry 272, and HSM circuitry 274.

Figure 2C:
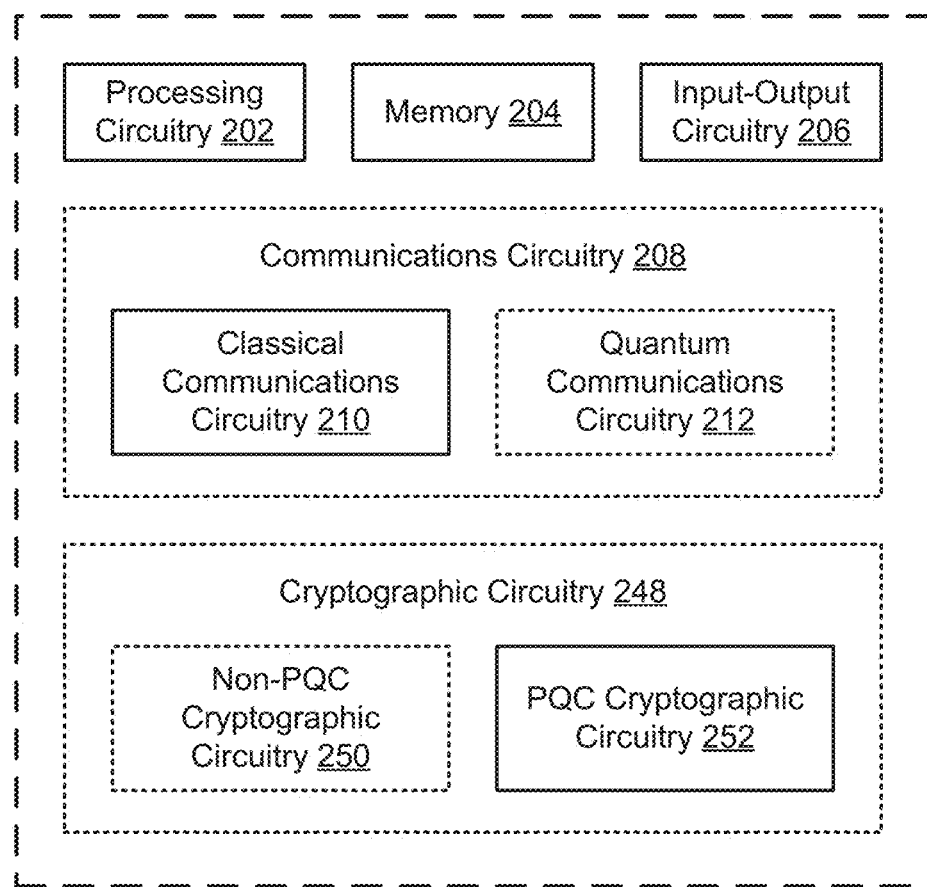

As illustrated in FIG. 2C, an apparatus 290 is shown that represents an example PQC add-on device configured to be communicatively coupled (e.g., wirelessly connected, electrically connected) to a client device, such as a server device 110, client device 112, database server device 114, remote server device 116, any other suitable device, or a combination thereof. In some embodiments, the apparatus 290 may be a PQC peripheral device communicatively coupled to the client device. In some embodiments, the apparatus 290 may be, or comprise, a PQC ASIC installed within a housing of the client device.

In some embodiments, the apparatus 290 may include one or more of processing circuitry 202, memory 204, input-output circuitry 206, communications circuitry 208 (including, but not limited to, classical communications circuitry 210 and quantum communications circuitry 212), cryptographic circuitry 248 (including, but not limited to, non-PQC cryptographic circuitry 250 and PQC cryptographic circuitry 252), any other suitable circuitry, or any combination thereof. It will be understood, however, that additional components providing additional functionality may be included in the apparatus 290 without departing from the scope of the present disclosure. The apparatus 290 may be involved in execution of various operations described above with respect to FIGS. 1 and 2A and below with respect to FIGS. 3-16.

In some embodiments, the apparatus 290 may hardware components designed or configured to allow communication with a PQC callback (e.g., PQC callback circuitry 207 shown in FIG. 2A). The apparatus 290 includes hardware components designed or configured to request, receive, process, generate, and transmit data, data structures, control signals, and electronic information for use in PQC, non-PQC, or hybrid cryptographic techniques. For example, the apparatus 290 may be configured to provide PQC communications channel-based cryptographic techniques, such as the transmission and receipt of sensitive portions (e.g., payloads) of electronic communications to a PQC callback over one or more PQC communications channels.

It should also be appreciated that, in some embodiments, each of the cryptographic circuitry 248, non-PQC cryptographic circuitry 250, PQC cryptographic circuitry 252 may include a separate processor, specially configured FPGA, ASIC, or cloud utility to perform the above functions.

In some embodiments, the hardware components described above with reference to cryptographic circuitry 248, non-PQC cryptographic circuitry 250, and PQC cryptographic circuitry 252, may, for instance, utilize communications circuitry 208 or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, the PQC callback circuitry of another apparatus (e.g., the PQC callback circuitry 207 of a separate apparatus implementing one or more portions of apparatus 200 shown in FIG. 2A), the PQC shim circuitry of another apparatus (e.g., the PQC shim circuitry 260 of a separate apparatus implementing one or more portions of apparatus 280 shown in FIG. 2B), the communications circuitry of another apparatus (e.g., the communications circuitry 208 of a separate apparatus implementing one or more portions of apparatus 200, 280, or 290), each other, or any other suitable circuitry or device.

In some embodiments, one or more of the cryptographic circuitry 248, non-PQC cryptographic circuitry 250, PQC cryptographic circuitry 252 may be hosted locally by the apparatus 290.

In some embodiments, one or more of the cryptographic circuitry 248, non-PQC cryptographic circuitry 250, PQC cryptographic circuitry 252 may be hosted remotely (e.g., by one or more cloud servers) and thus need not physically reside on the apparatus 290. Thus, some or all of the functionality described herein may be provided by a third-party circuitry. For example, the apparatus 290 may access one or more third-party circuitries via a networked connection configured to transmit and receive data and electronic information between the apparatus 290 and the third-party circuitries. In turn, the apparatus 290 may be in remote communication with one or more of the cryptographic circuitry 248, non-PQC cryptographic circuitry 250, PQC cryptographic circuitry 252.

Although some of these components of apparatuses 200, 280, and 290 are described with respect to their functional capabilities, it should be understood that the particular implementations necessarily include the use of particular hardware to implement such functional capabilities. It should also be understood that certain of these components may include similar or common hardware. For example, two sets of circuitries may both leverage use of the same processor, network interface, quantum communications interface, optoelectronic components, storage medium, machine learning circuitry, or the like to perform their associated functions, such that duplicate hardware is not required for each set of circuitries. It should also be appreciated that, in some embodiments, one or more of these components may include a separate processor, specially configured FPGA, ASIC, or cloud utility to perform its corresponding functions as described herein.

The use of the term "circuitry" as used herein with respect to components of apparatuses 200, 280, and 290 includes particular hardware configured to perform the functions associated with respective circuitry described herein. While the term "circuitry" should be understood broadly to include hardware, in some embodiments, circuitry may also include software for configuring the hardware. For example, in some embodiments, "circuitry" may include processing circuitry, storage media, network interfaces, quantum interfaces, input-output devices, optoelectronic components, and other components. In some embodiments, other elements of apparatuses 200, 280, and 290 may provide or supplement the functionality of particular circuitry. For example, the processing circuitry 202 may provide processing functionality, memory 204 may provide storage functionality, classical communications circuitry 210 may provide network interface functionality, and quantum communications circuitry 212 may provide quantum interface functionality among other features.

In some embodiments, various components of one or more of the apparatuses 200, 280, or 290 may be hosted remotely (e.g., by one or more cloud servers) and thus need not physically reside on the corresponding apparatus 200, 280, or 290. Thus, some or all of the functionality described herein may be provided by third-party circuitry. For example, a given apparatus 200, 280, or 290 may access one or more third-party circuitries via any sort of networked connection that facilitates transmission of data and electronic information between the apparatus 200, 280, or 290 and the third-party circuitries. In turn, that apparatus 200, 280, or 290 may be in remote communication with one or more of the other components described above as being comprised by the apparatus 200, 280, or 290.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions, any other type of code described herein, and any combination thereof may be loaded onto a computer, processor or other programmable apparatus's circuitry to produce a machine, such that the computer, processor, or other programmable circuitry that executes the code on the machine creates the means for implementing various functions, including the functions described herein.

The one or more server devices 110A-110N, one or more client devices 112A-112N, one or more database server devices 114, and one or more remote server devices 116 described with reference to FIG. 1 may be embodied by one or more computing devices, servers, data storage devices, or systems that also may include processing circuitry, memory, input-output circuitry, and communications circuitry. For example, a server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a client device 112 may be a smartphone on which an app (e.g., a mobile database app) is running or otherwise being executed by processing circuitry. As it relates to operations described in the present disclosure, the functioning of these devices may utilize components similar to the similarly named components described above with reference to FIG. 2. Additional description of the mechanics of these components is omitted for the sake of brevity. These device elements, operating together, provide the respective computing systems with the functionality necessary to facilitate the communication of data with the PQC system described herein.

FIGS. 3A, 3B, 3C, 3D, and 3E illustrate example PQC system architectures configured to perform various operations in accordance with some example embodiments described herein.

Figure 3A:
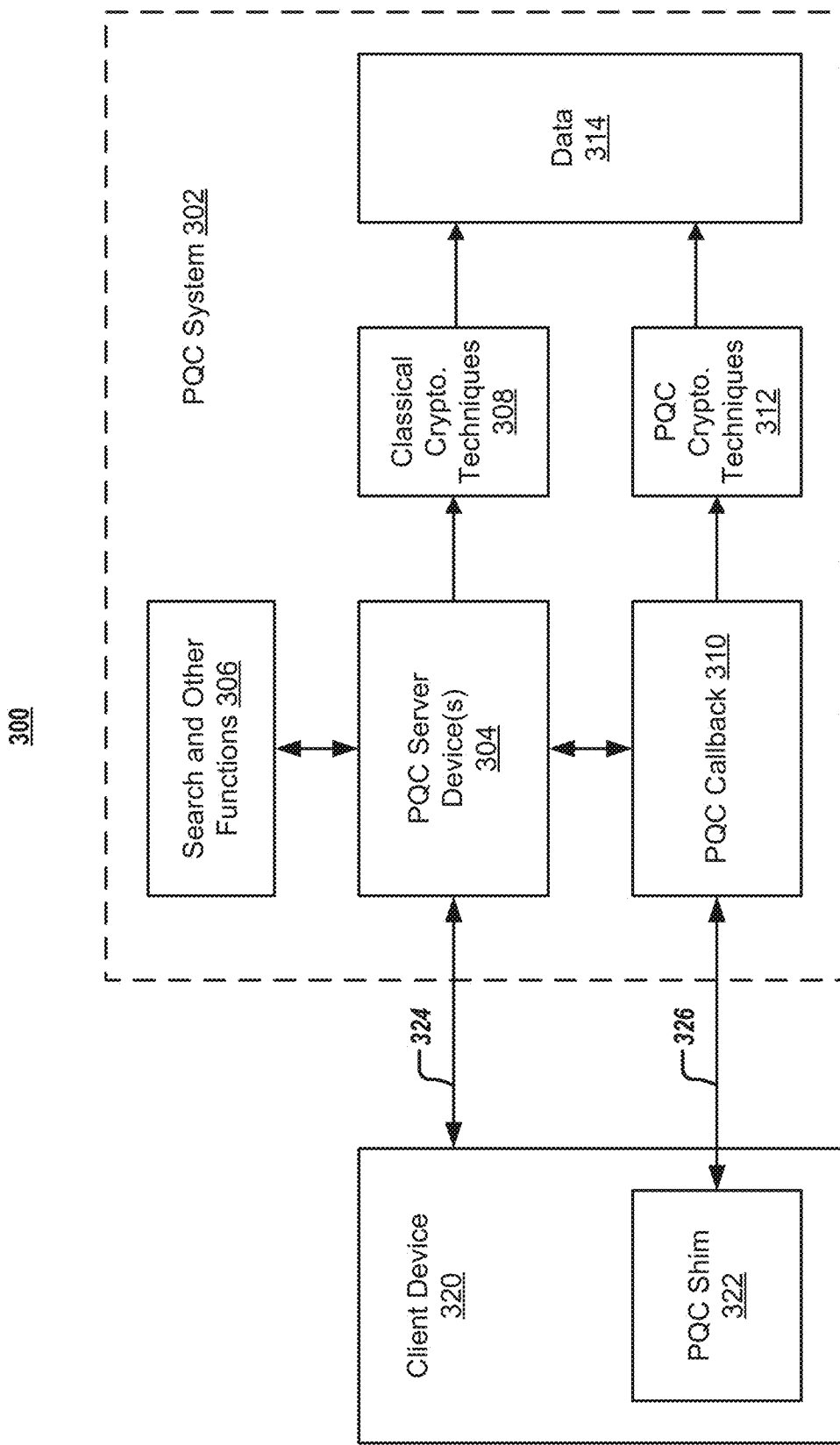
FIGS. 3A, 3B, 3C, 3D, and 3E illustrate example PQC system architectures configured to perform various operations in accordance with some example embodiments described herein.

FIG. 3A illustrates an example PQC system architecture 300 configured to perform various operations in accordance with some example embodiments described herein. The example PQC system architecture 300 may comprise, for example, PQC system 302 and client device 320.

In some embodiments, the PQC system 302 may comprise, for example, one or more data storage devices 306 comprising search and other functions, one or more PQC server devices 304, one or more non-PQC cryptographic technique storage devices 308 storing non-PQC cryptographic techniques and non-PQC cryptographic performance information related thereto, one or more PQC callbacks 310, one or more PQC cryptographic technique storage devices 312 storing PQC cryptographic techniques and PQC cryptographic performance information related thereto, and data 314. In some embodiments, the PQC system 302 may be configured to perform PQC in accordance with some example embodiments described herein (e.g., as described with reference to apparatus 200 shown in FIG. 2A).

In some embodiments, the client device 320 may comprise communications circuitry configured to communicate with the one or more PQC server devices 304 over one or more non-PQC communications channels 324. The client device 320 may comprise, for example, a PQC shim 322 configured to communicate with the one or more PQC callbacks 310 over one or more PQC communications channels 326. In some embodiments, the client device 320 may be configured to perform PQC in accordance with some example embodiments described herein (e.g., as described with reference to apparatus 280 shown in FIG. 2B, wherein apparatus 280 comprises the PQC shim circuitry 260, and the PQC shim circuitry 260 comprises the PQC cryptographic circuitry 252).

Figure 3B:
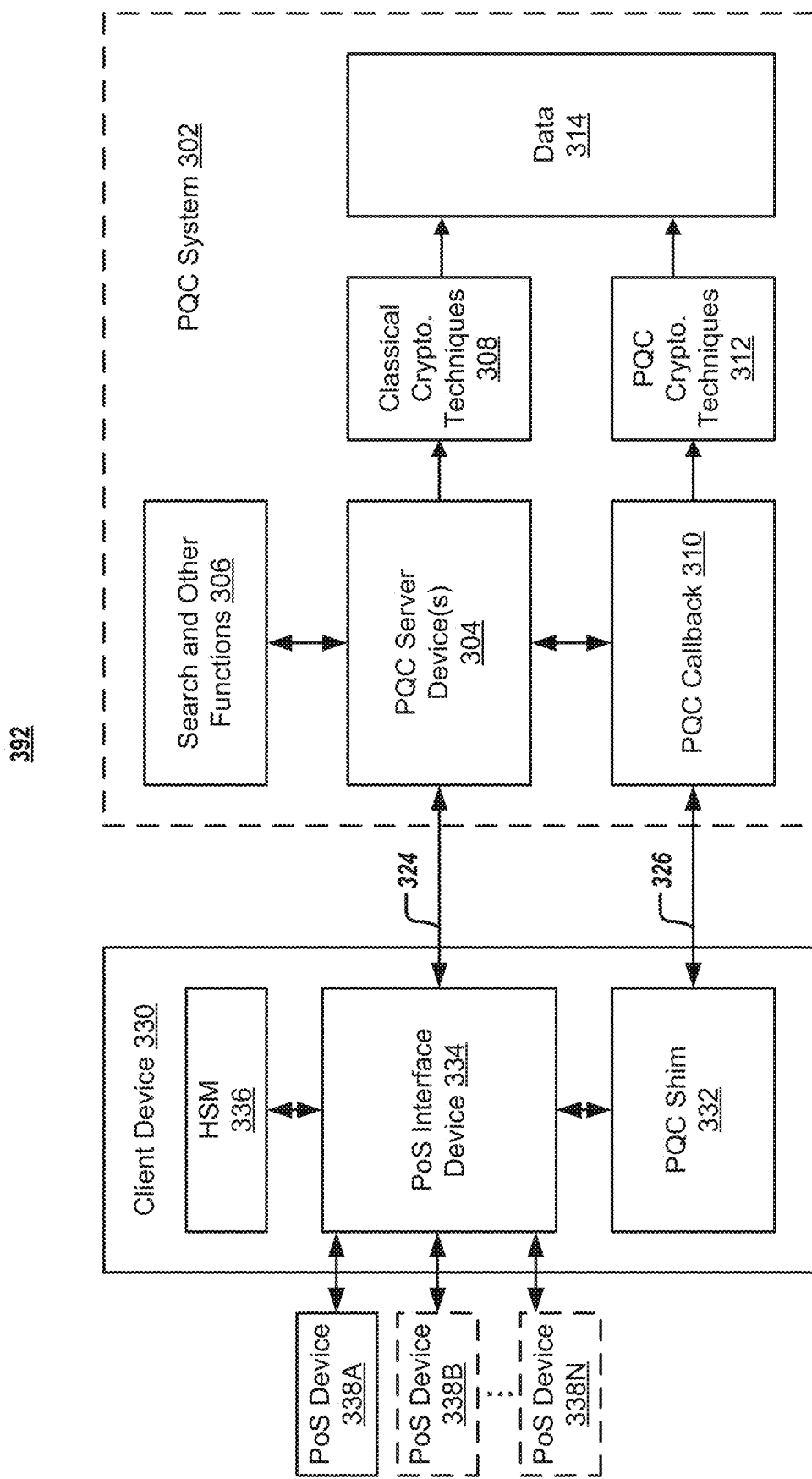

FIG. 3B illustrates an example PQC system architecture 392 configured to perform various operations in accordance with some example embodiments described herein. The example PQC system architecture 392 may comprise, for example, the PQC system 302, a client device 330, and one or more PoS devices 338A-338N.

In some embodiments, the client device 330 may comprise the PQC shim 332, an HSM 336, and a PoS interface device 334 comprising a concentrator, gateway, store controller, terminal manager, and upgraded PoS proxy. The PoS interface device 334 may be configured to communicate with the PoS devices 338A-338N over one or more non-PQC communications channels. The PoS interface device 334 may be further configured to communicate with the one or more PQC server devices 304 over one or more non-PQC communications channels 324. The PQC shim 322 configured to communicate with the one or more PQC callbacks 310 over one or more PQC communications channels 326. In some embodiments, the client device 330 may be configured to perform PQC in accordance with some example embodiments described herein (e.g., as described with reference to apparatus 280 shown in FIG. 2B, wherein apparatus 280 comprises the PQC shim circuitry 260, and the PQC shim circuitry 260 comprises the PQC cryptographic circuitry 252).

Figure 3C:
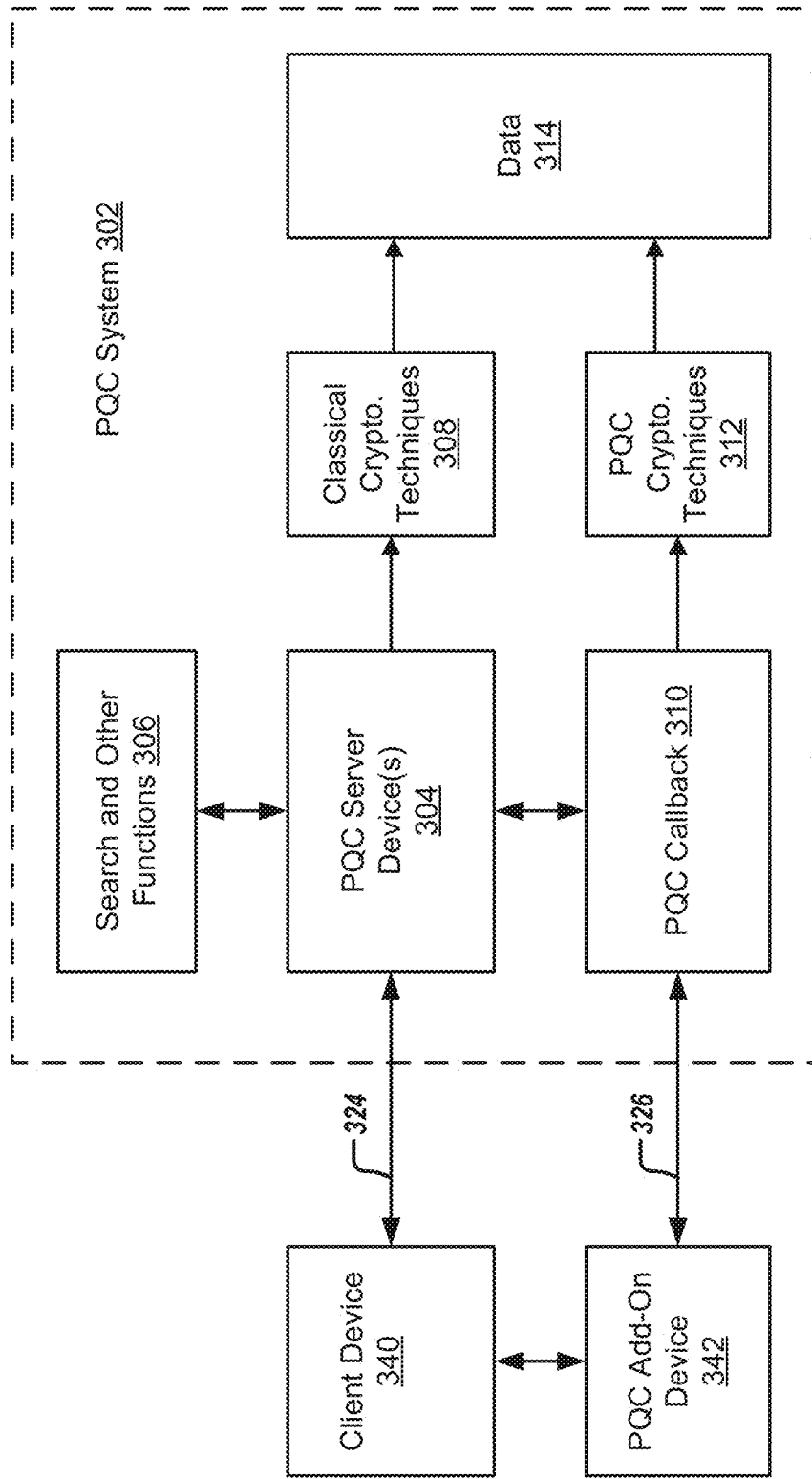

FIG. 3C illustrates an example PQC system architecture 394 configured to perform various operations in accordance with some example embodiments described herein. The example PQC system architecture 394 may comprise, for example, the PQC system 302, a client device 340, and a PQC add-on device 342.

The client device 340 may comprise communications circuitry configured to communicate with the one or more PQC server devices 304 over one or more non-PQC communications channels 324. The PQC add-on device 342 may be communicatively coupled to the client device 340 and configured to communicate with the one or more PQC callbacks 310 over one or more PQC communications channels 326. In some embodiments, the client device 340 may not be configured to perform PQC in accordance with some example embodiments described herein (e.g., as described with reference to apparatus 280 shown in FIG. 2B, wherein apparatus 280 includes neither the PQC cryptographic circuitry 252 nor the PQC shim circuitry 260). In some embodiments, the PQC add-on device 342 may be configured to perform PQC for the client device 340 (e.g., on behalf of the client device 340) in accordance with some example embodiments described herein (e.g., as described with reference to apparatus 290 shown in FIG. 2C).

Figure 3D:
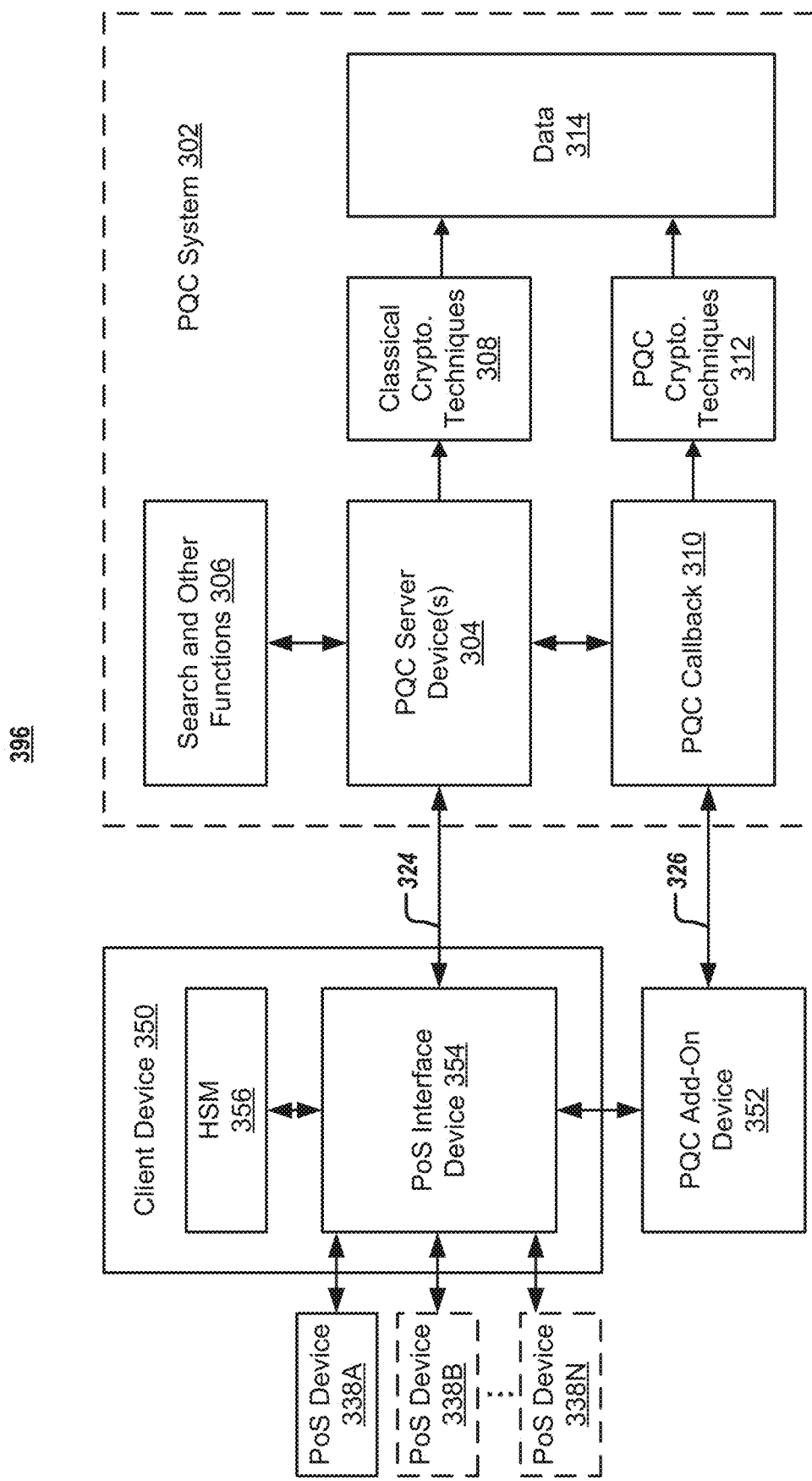

FIG. 3D illustrates an example PQC system architecture 396 configured to perform various operations in accordance with some example embodiments described herein. The example PQC system architecture 396 may comprise, for example, the PQC system 302, a client device 350, a PQC add-on device 352, and one or more PoS devices 338A-338N.

In some embodiments, the client device 350 may comprise an HSM 356 and a PoS interface device 354 comprising a concentrator, gateway, store controller, terminal manager, and upgraded PoS proxy. The PoS interface device 354 may be configured to communicate with the PoS devices 338A-338N over one or more non-PQC communications channels. The PoS interface device 354 may be further configured to communicate with the one or more PQC server devices 304 over one or more non-PQC communications channels 324. The PQC add-on device 352 may be communicatively coupled to the client device 350 and configured to communicate with the one or more PQC callbacks 310 over one or more PQC communications channels 326. In some embodiments, the client device 350 may not be configured to perform PQC in accordance with some example embodiments described herein (e.g., as described with reference to apparatus 280 shown in FIG. 2B, wherein apparatus 280 includes neither the PQC cryptographic circuitry 252 nor the PQC shim circuitry 260). In some embodiments, the PQC add-on device 352 may be configured to perform PQC for the client device 350 (e.g., on behalf of the client device 350) in accordance with some example embodiments described herein (e.g., as described with reference to apparatus 290 shown in FIG. 2C).

Figure 3E:
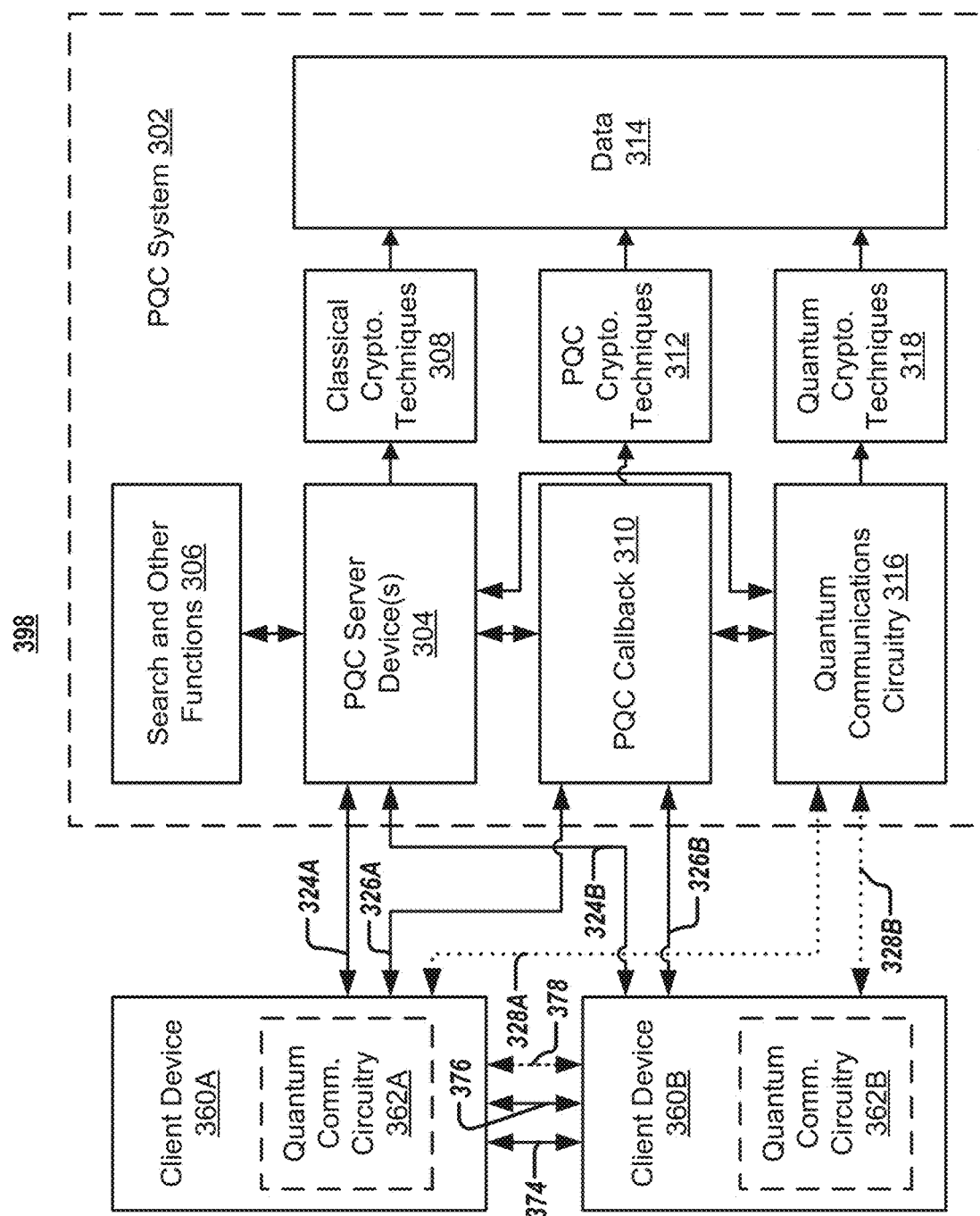

FIG. 3E illustrates an example PQC system architecture 398 configured to perform various operations in accordance with some example embodiments described herein. The example PQC system architecture 398 may comprise, for example, the PQC system 302 and a set of client devices comprising a client device 360A and a second client device 360B. Further to the embodiments shown in FIGS. 3A-3D, the PQC system 302 may further comprise quantum communications circuitry 316 and one or more quantum cryptographic technique storage devices 318 storing quantum cryptographic techniques and quantum cryptographic performance information related thereto.

In some embodiments, the first client device 360A and the second client device 360B may be embodied by any of the client devices shown in FIGS. 3A-3D, such as client device 320; client device 330; client device 340 and PQC add-on device 342; or client device 350 and PQC add-on device 352. Further still to the embodiments shown in FIGS. 3A-3D, the first client device 360A may comprise quantum communications circuitry 362A, and the second client device 360B may comprise quantum communications circuitry 362B. In some embodiments, the first client device 360A may be communicatively coupled to a PQC add-on device comprising the quantum communications circuitry 362A, and the second client device 360B may be communicatively coupled to a PQC add-on device comprising the quantum communications circuitry 362B.

In some embodiments, the client device 360A and the client device 360B may comprise communications circuitry configured to communicate with the one or more PQC server devices 304 over one or more non-PQC communications channels 324A and 324B, respectively, and to communicate with each other over one or more non-PQC communications channels 374. In some embodiments, the client device 360A and the client device 360B may comprise communications circuitry configured to communicate with the one or more PQC callbacks 310 over one or more PQC communications channels 326A and 326B, respectively, and to communicate with each other over one or more PQC communications channels 376. In some embodiments, the client device 360A and the client device 360B may comprise quantum communications circuitry 362A and 362B, respectively, configured to communicate with the quantum communications circuitry 316 over one or more quantum communications channels 328A and 228B, respectively, and to communicate with each other over one or more quantum communications channels 378.

Figure 4:
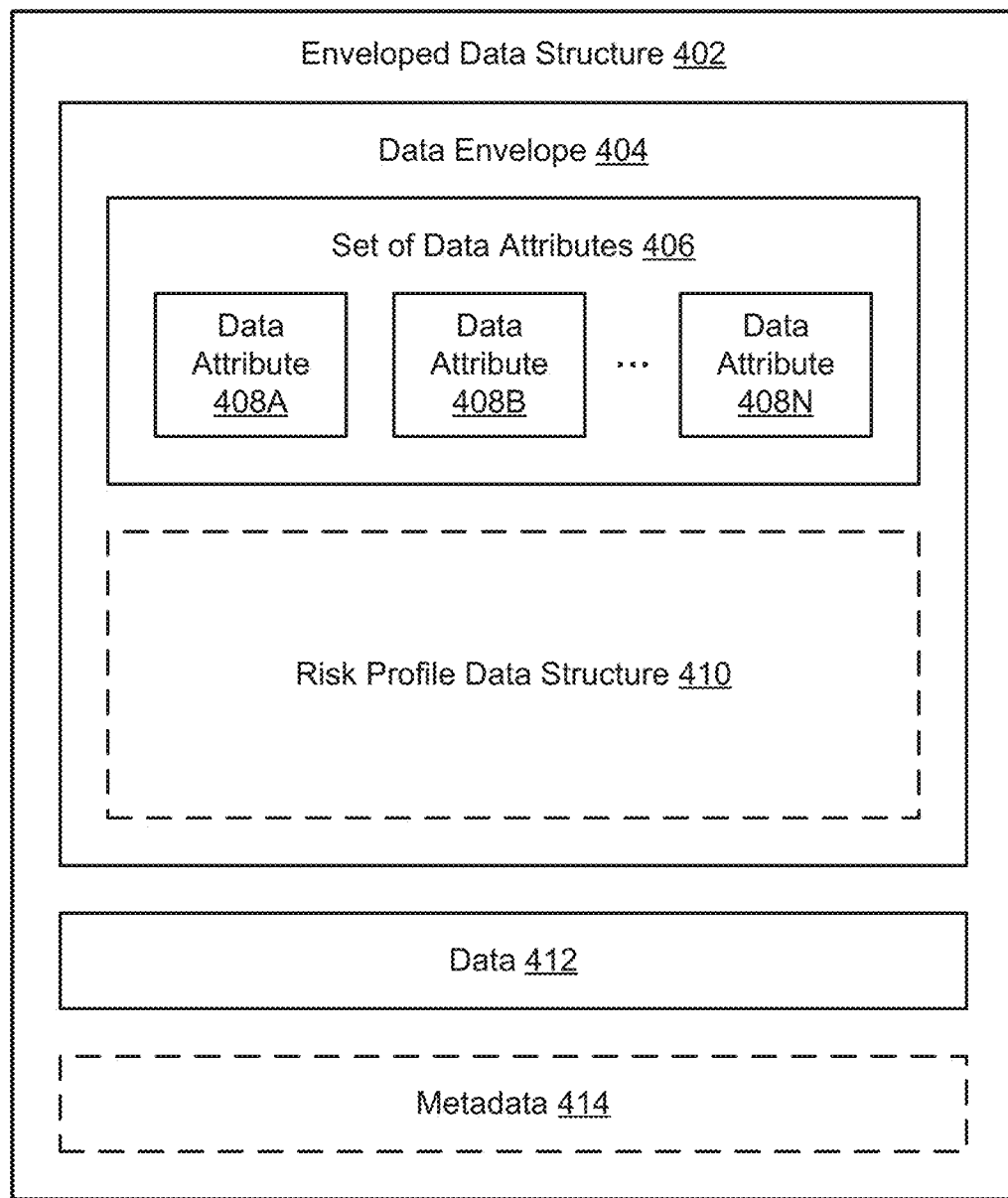
FIG. 4 illustrates an example enveloped data structure in accordance with some example embodiments described herein.

FIG. 4 illustrates example data structures 400 that comprise an example enveloped data structure 402 in accordance with some example embodiments described herein. In some embodiments, the example enveloped data structure 402 may comprise a data envelope 404, data 412, and metadata 414. The data envelope may comprise a set of data attributes 406 comprising data attributes 408A-408N. In some embodiments, the data envelope may comprise a risk profile data structure 410.

Figure 5:
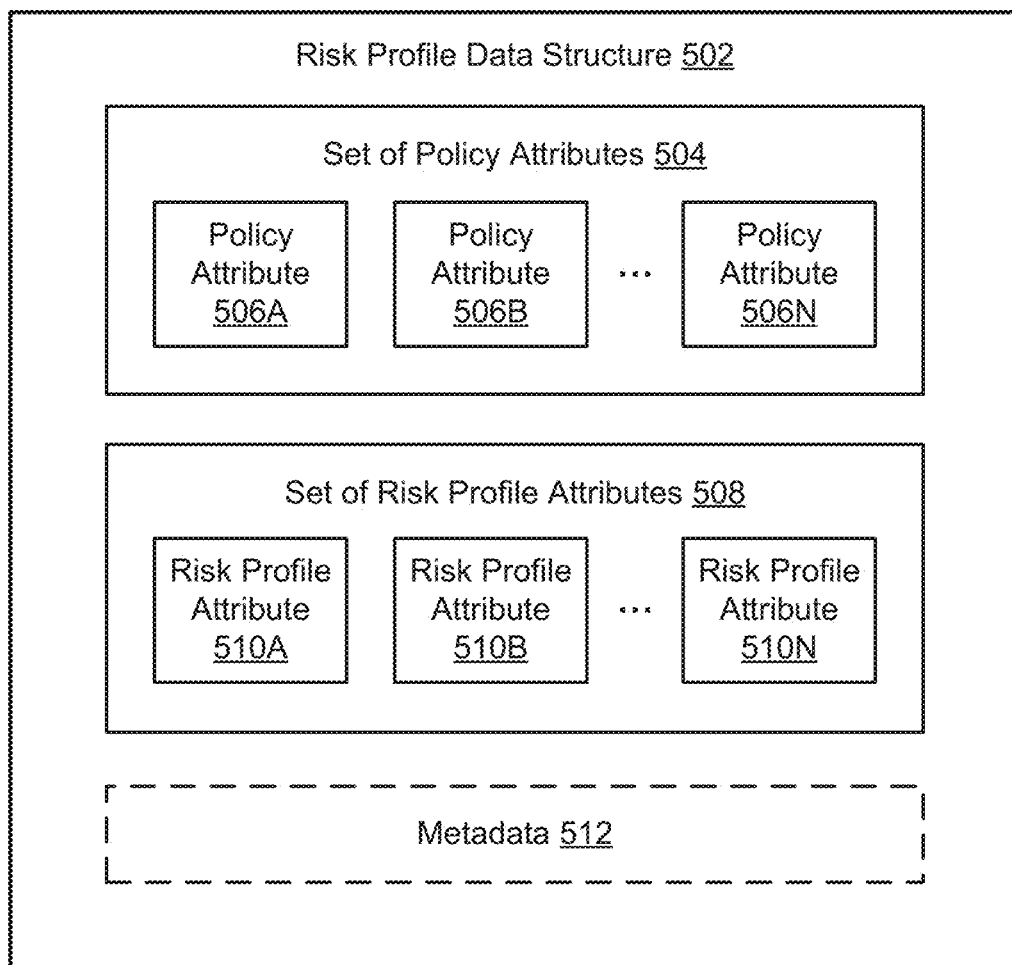
FIG. 5 illustrates an example risk profile data structure in accordance with some example embodiments described herein.

FIG. 5 illustrates example data structures 500 that comprise an example risk profile data structure 502 in accordance with some example embodiments described herein. In some embodiments, the example risk profile data structure 502 may comprise a set of policy attributes 504, a set of risk profile attributes 508, and metadata 512. The set of policy attributes 504 may comprise policy attributes 506A-506N. The set of risk profile attributes 508 may comprise risk profile attributes 510A-510N.

Figure 6:
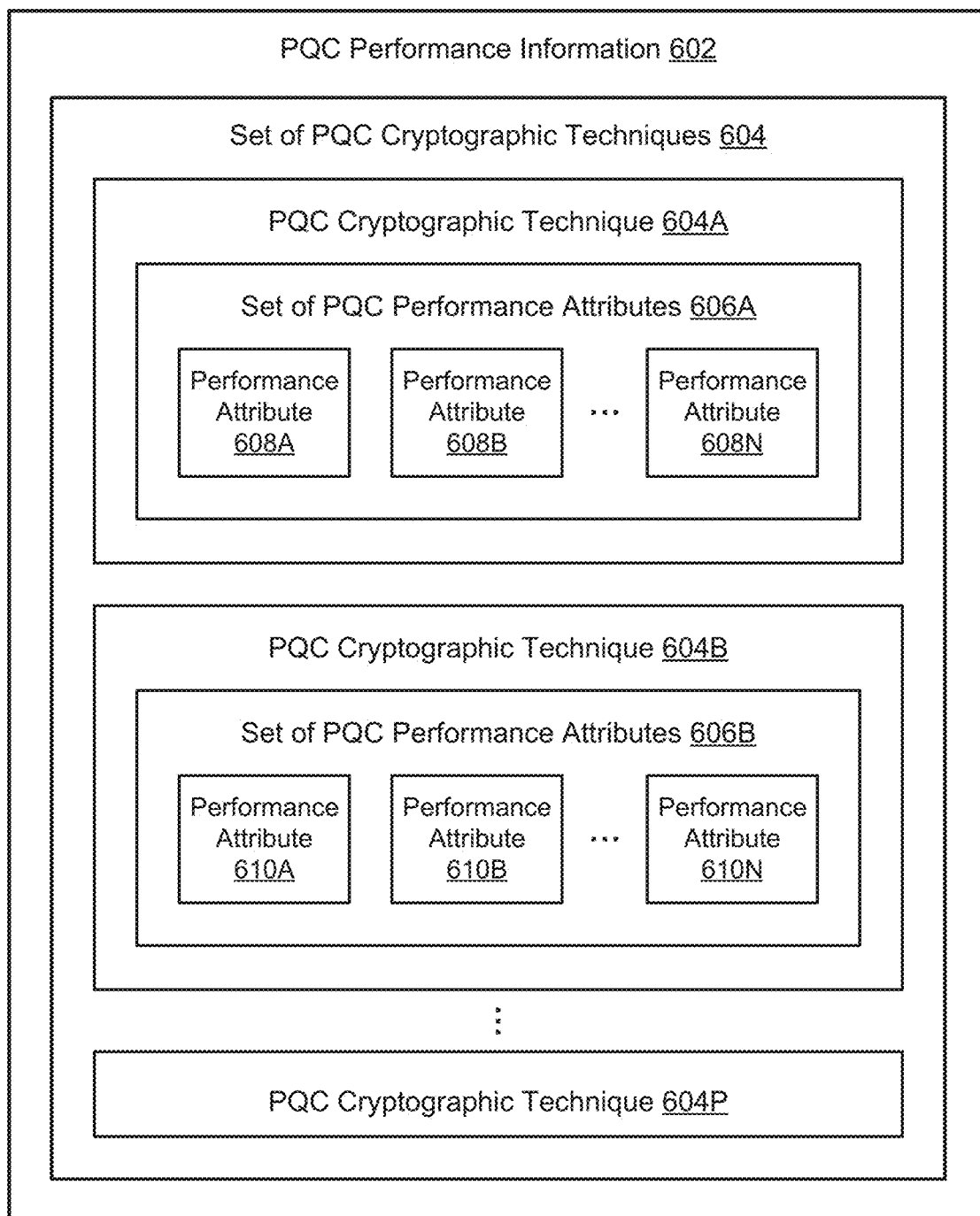
FIG. 6 illustrates example PQC cryptographic performance information in accordance with some example embodiments described herein.

FIG. 6 illustrates example data structures 600 that comprise example PQC cryptographic performance information 602 in accordance with some example embodiments described herein. In some embodiments, the example PQC cryptographic performance information 602 may comprise PQC cryptographic performance information for a set of PQC cryptographic techniques 604, such as: PQC cryptographic performance information for PQC cryptographic technique 604A that comprises a set of PQC cryptographic performance attributes 606A comprising performance attributes 608A-608N; PQC cryptographic performance information for PQC cryptographic technique 604B that comprises a set of PQC cryptographic performance attributes 606B comprising performance attributes 610A-610N; through PQC cryptographic performance information for PQC cryptographic technique 604N that comprises a set of PQC cryptographic performance attributes comprising performance attributes.

Figure 7A:
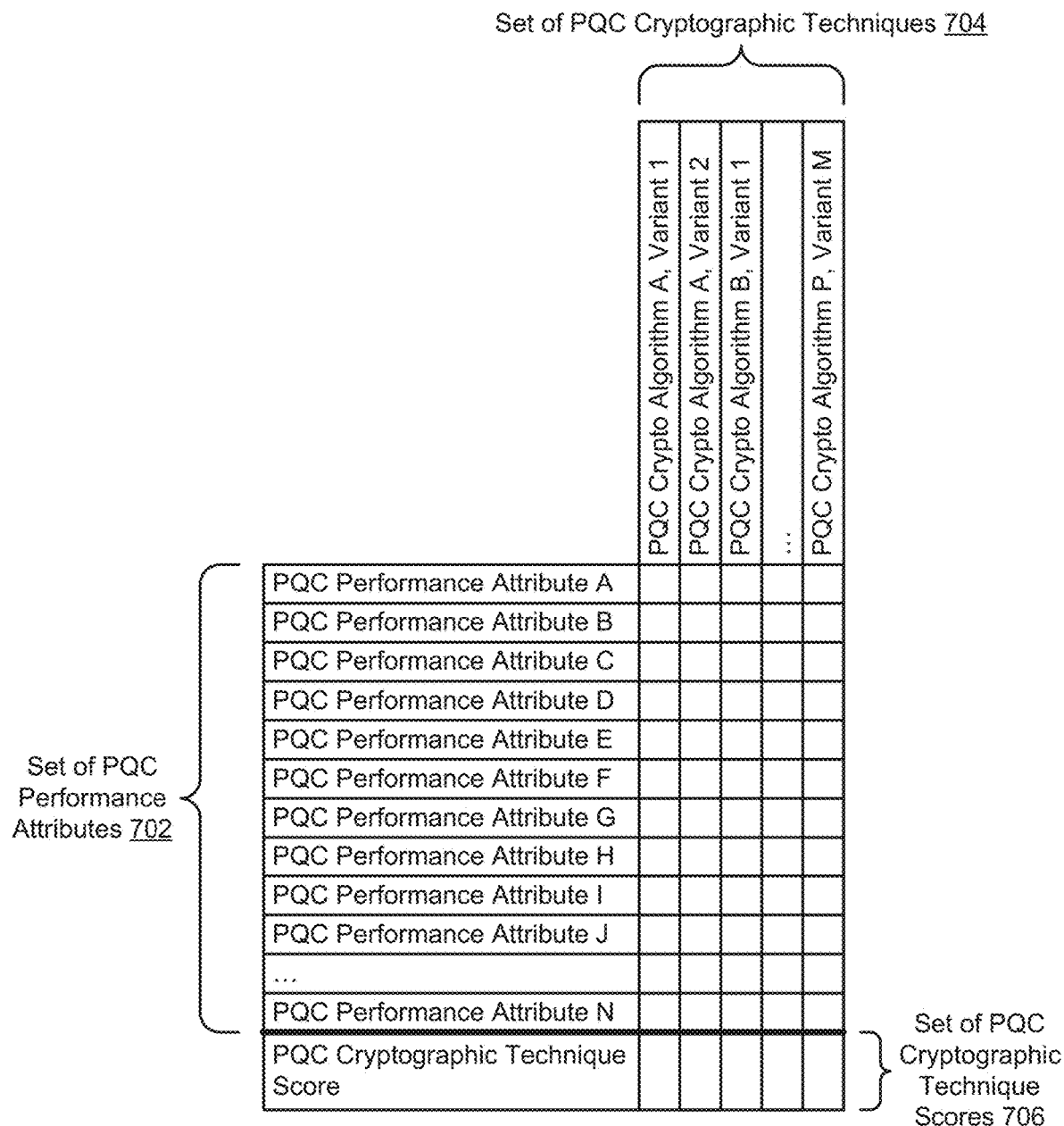
FIGS. 7A, 7B, and 7C illustrate example operations for generating an optimal PQC cryptographic technique in accordance with some example embodiments described herein.
Figure 7B:
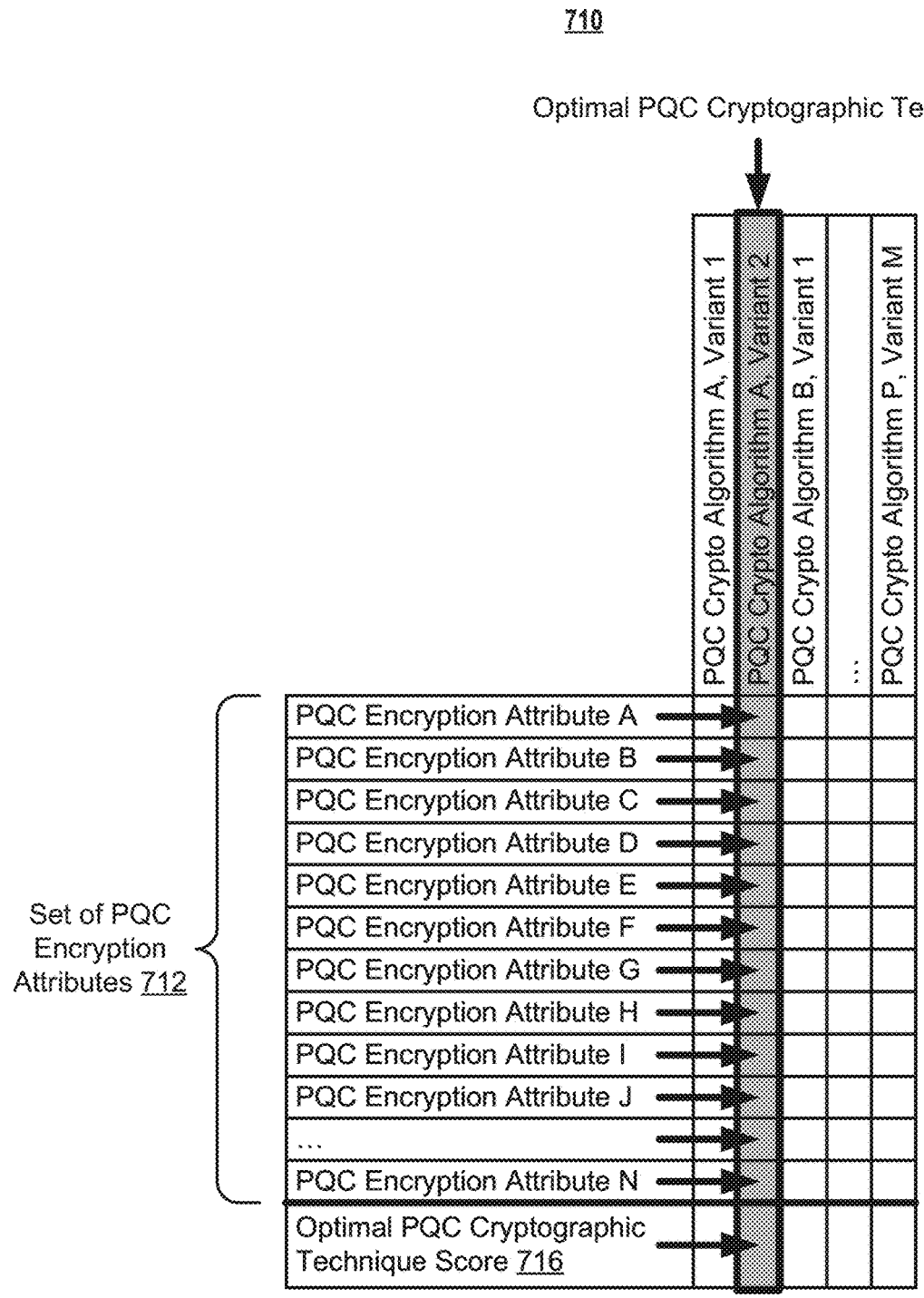
Figure 7C:
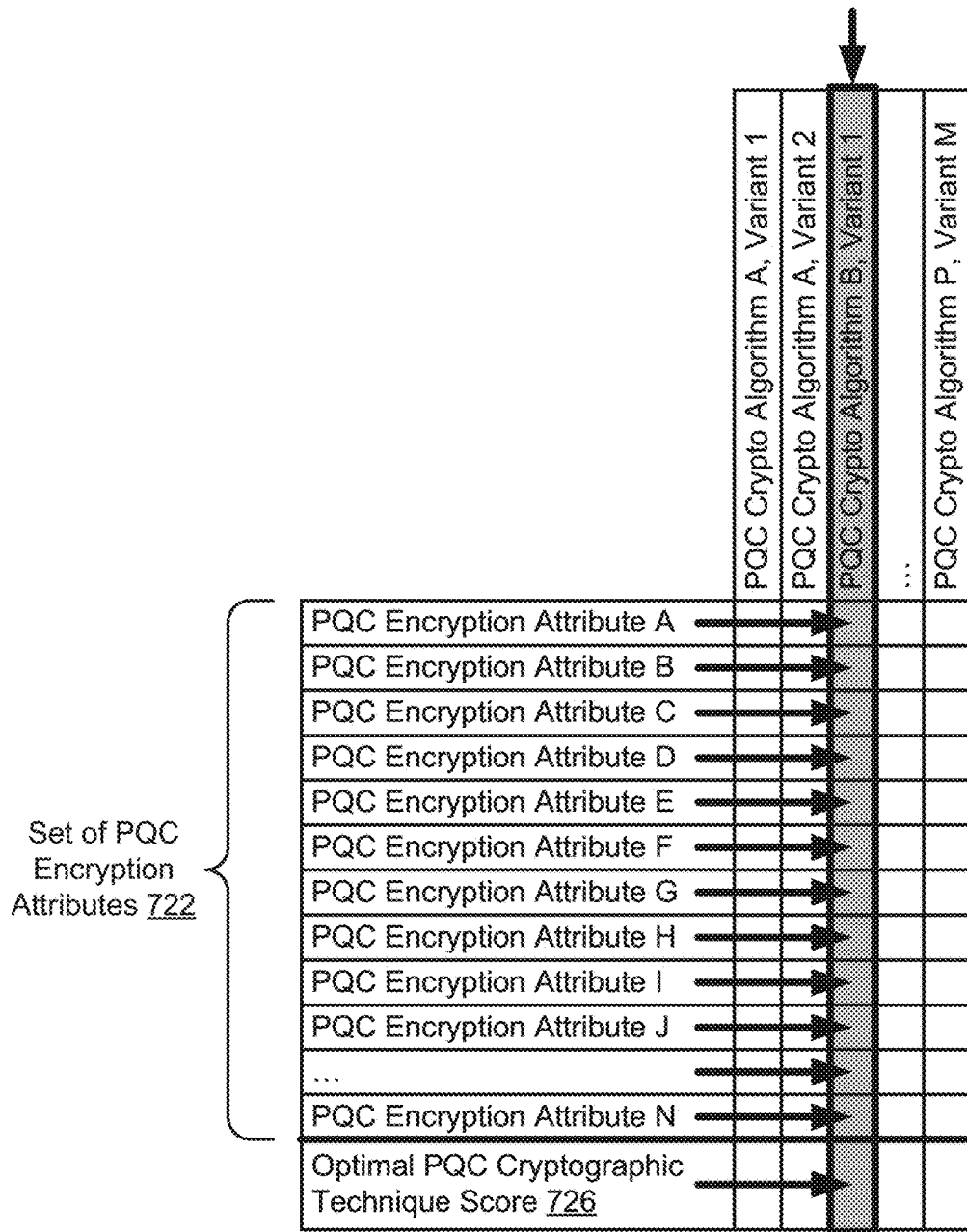

FIGS. 7A, 7B, and 7C illustrate example operations for generating an optimal PQC cryptographic technique in accordance with some example embodiments described herein. Although FIGS. 7A, 7B, and 7C are described with reference to PQC cryptographic techniques, the PQC system described herein may use other cryptographic techniques as well, such as non-PQC cryptographic techniques and hybrid PQC cryptographic techniques (e.g., hybrid PQC cryptographic technique={PQC cryptographic technique, Non-PQC cryptographic technique}).

FIG. 7A illustrates PQC cryptographic performance information 700 associated with a set of PQC cryptographic techniques 704. In some embodiments, the PQC cryptographic performance information 700 may comprise a set of PQC cryptographic performance attributes 702 for each PQC cryptographic technique in the set of PQC cryptographic techniques 704. In some embodiments, each PQC cryptographic technique in the set of PQC cryptographic techniques 704 may be a variant of a PQC cryptographic algorithm. In some embodiments, the PQC cryptographic performance information 700 may comprise a set of PQC cryptographic technique scores 706, wherein each PQC cryptographic technique score in the set of PQC cryptographic technique scores 706 may correspond to a respective PQC cryptographic technique in the set of PQC cryptographic techniques. In some embodiments, the PQC system described herein may be configured to generate the PQC cryptographic performance information 700 based on one or more operations configured to be performed by the PQC cryptographic attribute generation circuitry 246 shown in FIG. 2A. For example, the PQC system described herein may be configured to generate the PQC cryptographic performance information 700 based on equations 1 and 2 described above.

FIG. 7B illustrates example data structures for providing PQC for use in encrypting data based on a set of PQC encryption attributes. For example, FIG. 7B illustrates PQC cryptographic performance information 710 associated with an optimal PQC cryptographic technique 714. In some embodiments, the PQC cryptographic performance information 710 may comprise a set of PQC encryption attributes 712 for encrypting data. In some embodiments, the set of PQC encryption attributes 712 may correspond to an optimal PQC cryptographic technique 714. In some embodiments, the PQC system described herein may be configured to determine the optimal PQC cryptographic technique 714 and the set of PQC encryption attributes 712 based on one or more operations configured to be performed by the PQC cryptographic attribute generation circuitry 246 shown in FIG. 2A. For example, the PQC system described herein may be configured to determine the optimal PQC cryptographic technique 714 and the set of PQC encryption attributes 712 based on the optimal PQC cryptographic technique score 716.

FIG. 7C illustrates example data structures for providing adaptive PQC for use in re-encrypting or double encrypting data based on a modified set of PQC encryption attributes. For example, FIG. 7C illustrates PQC cryptographic performance information 720 associated with an optimal PQC cryptographic technique 724. In some embodiments, the PQC cryptographic performance information 720 may comprise a set of PQC encryption attributes 722 (e.g., a second set of PQC encryption attributes) for re-encrypting or double encrypting the data encrypted based on the set of PQC encryption attributes 712 (e.g., a first set of PQC encryption attributes). In some embodiments, the set of PQC encryption attributes 722 may correspond to an optimal PQC cryptographic technique 724 (e.g., a second optimal PQC cryptographic technique), which may be different from the optimal PQC cryptographic technique 714 (e.g., a first optimal PQC cryptographic technique). For example, the optimal PQC cryptographic technique 724 may be different from the optimal PQC cryptographic technique 714 as a result of a change in the data envelope (e.g., a change in a data attribute, a change in a risk policy data structure) associated with the data. In another example, the optimal PQC cryptographic technique 724 may be different from the optimal PQC cryptographic technique 714 as a result of a change in a PQC cryptographic performance attribute (e.g., a revision to a PQC cryptographic performance attributes made by a machine learning process that automatically tracks estimated and actual PQC cryptographic performance attributes), a change in a PQC cryptographic performance attribute weightage value (e.g., based on a change in a risk profile data structure, data environment, or use case) for a PQC cryptographic performance attribute, any other suitable data or process, or a combination thereof. In some embodiments, the PQC system described herein may be configured to determine the optimal PQC cryptographic technique 724 and the set of PQC encryption attributes 722 based on one or more operations configured to be performed by the PQC cryptographic attribute generation circuitry 246 shown in FIG. 2A. For example, the PQC system described herein may be configured to determine the optimal PQC cryptographic technique 724 and the set of PQC encryption attributes 722 based on the optimal PQC cryptographic technique score 726.

Figure 8:
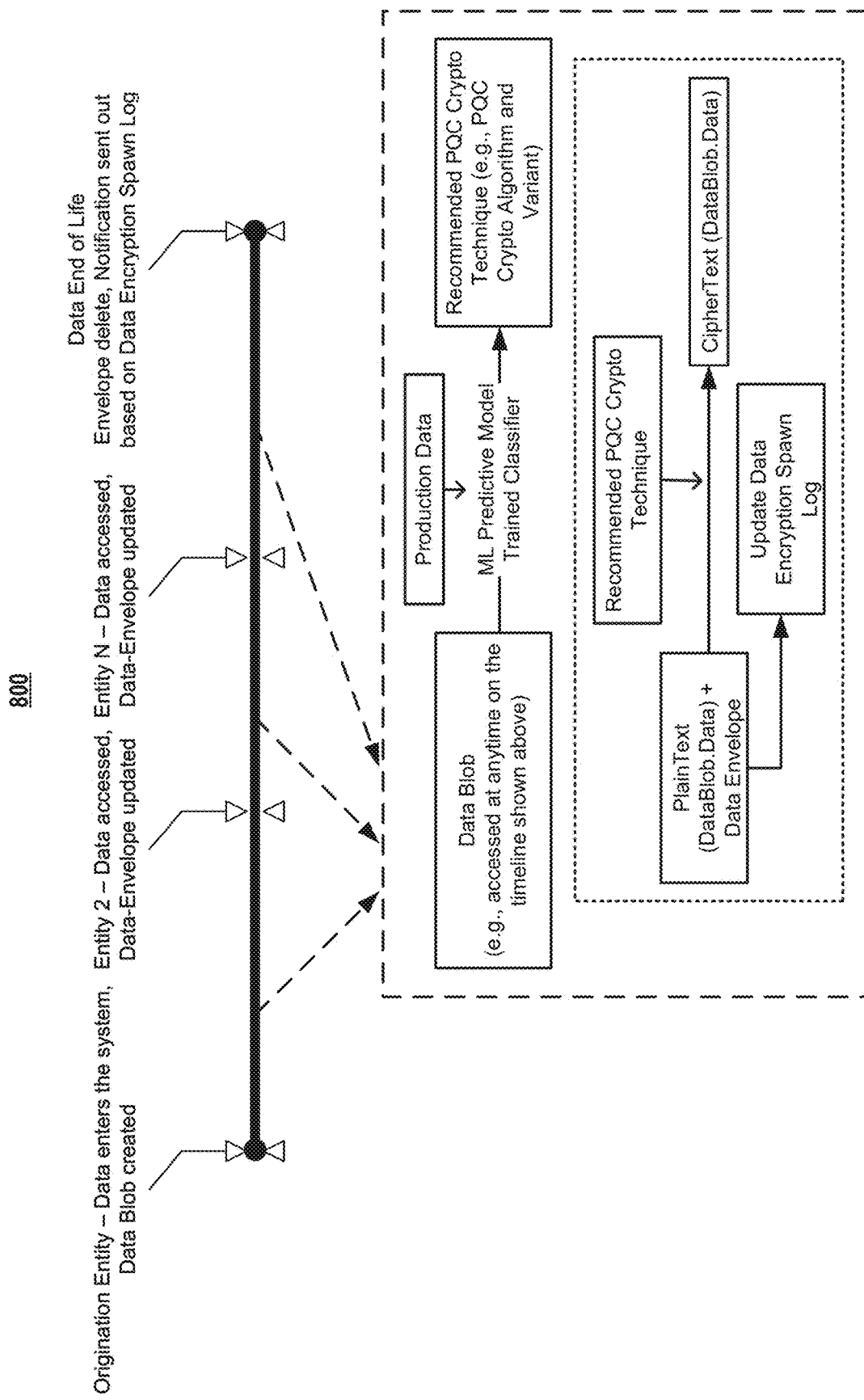
FIG. 8 illustrates an example data life cycle in accordance with some example embodiments described herein.

FIG. 8 illustrates an example data life cycle 800 in accordance with some example embodiments described herein. As shown in FIG. 8, an enveloped data structure (e.g., a data BLOB) may be configured to move across the PQC system during the lifetime of the data. In some embodiments, the PQC system may generate a data envelope for data that is entering the PQC system so that the data may be encrypted using a recommended PQC cryptographic technique selected by the cryptographic optimization circuitry 254 (e.g., an optimal PQC cryptographic technique) and ready for PQC migration. In some embodiments, the data envelope may also manage when "transition of zone" occurs. In some embodiments, the PQC system may use the enveloped data structure at any time to generate the recommended PQC cryptographic technique based on the data envelope. Once the PQC system has encrypted the data based on the recommended PQC cryptographic technique, the PQC system may update the cryptographic spawn log (e.g., the data encryption spawn log) included in the data envelope.

Although FIG. 8 is described with reference to PQC cryptographic techniques, the PQC system described herein may recommend other cryptographic techniques, such as non-PQC cryptographic techniques and hybrid PQC cryptographic techniques. For example, the PQC system may recommend a hybrid PQC cryptographic mode, such as a signature-based hybrid PQC cryptographic mode consisting of a non-PQC cryptographic signature and a PQC cryptographic signature, where the hybrid PQC cryptographic mode is valid only if both the non-PQC cryptographic signature and the PQC cryptographic signature are valid. In some instances, the PQC system may recommend different cryptographic techniques for encrypting data used by different lines of business (LOBs) or entities.

Figure 9:
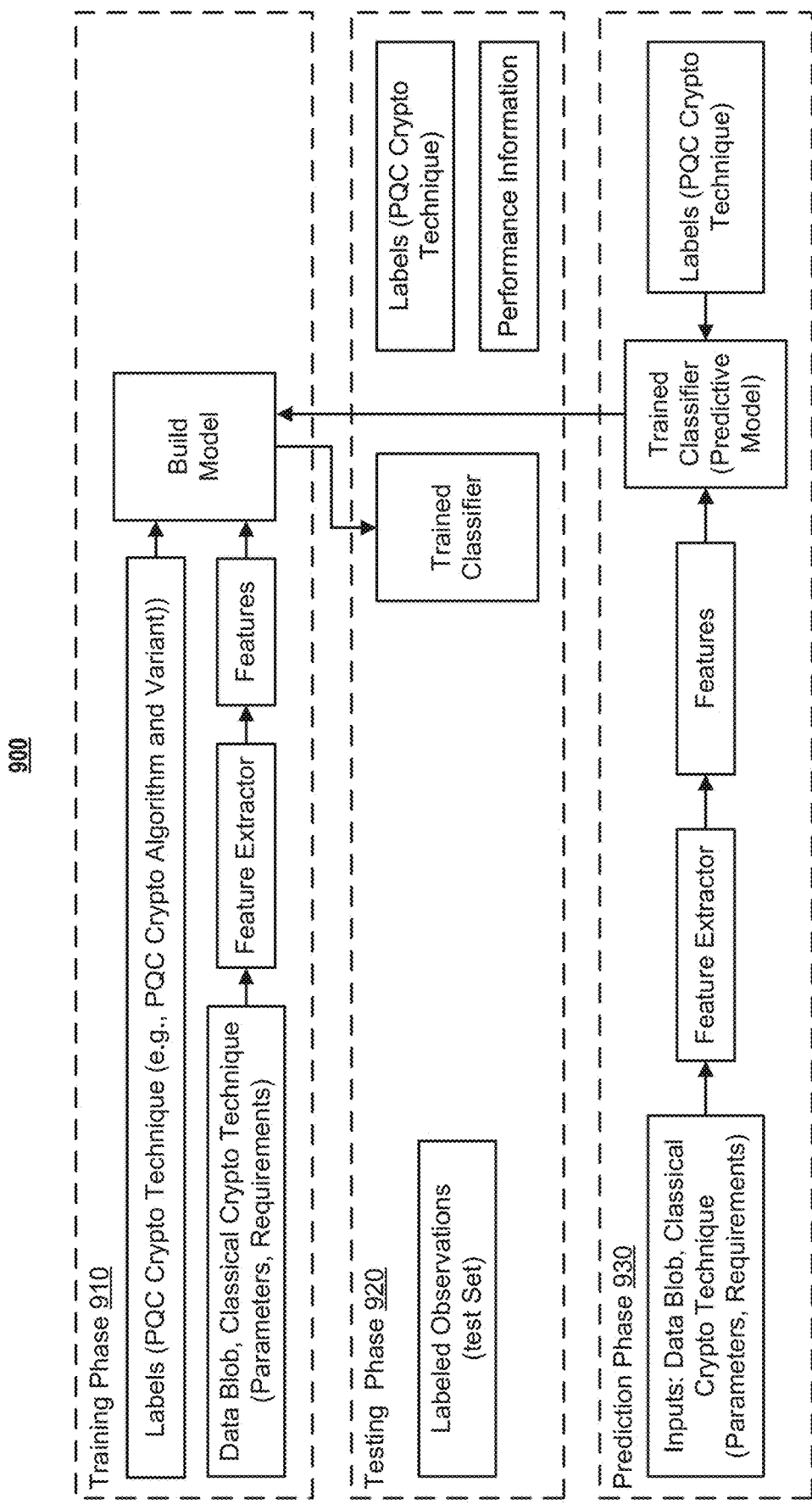
FIG. 9 illustrates an example PQC system architecture configured to perform various operations in accordance with some example embodiments described herein.

FIG. 9 illustrates an example PQC system architecture 900 configured to perform various operations in accordance with some example embodiments described herein. In some embodiments, the example PQC system architecture 900 illustrates, at a very high level, the machine learning processes involved in performing the various operations in accordance with some example embodiments described herein. For example, the machine learning processes may a training phase 910, a testing phase 920, and a prediction phase 930.

Figure 10A:
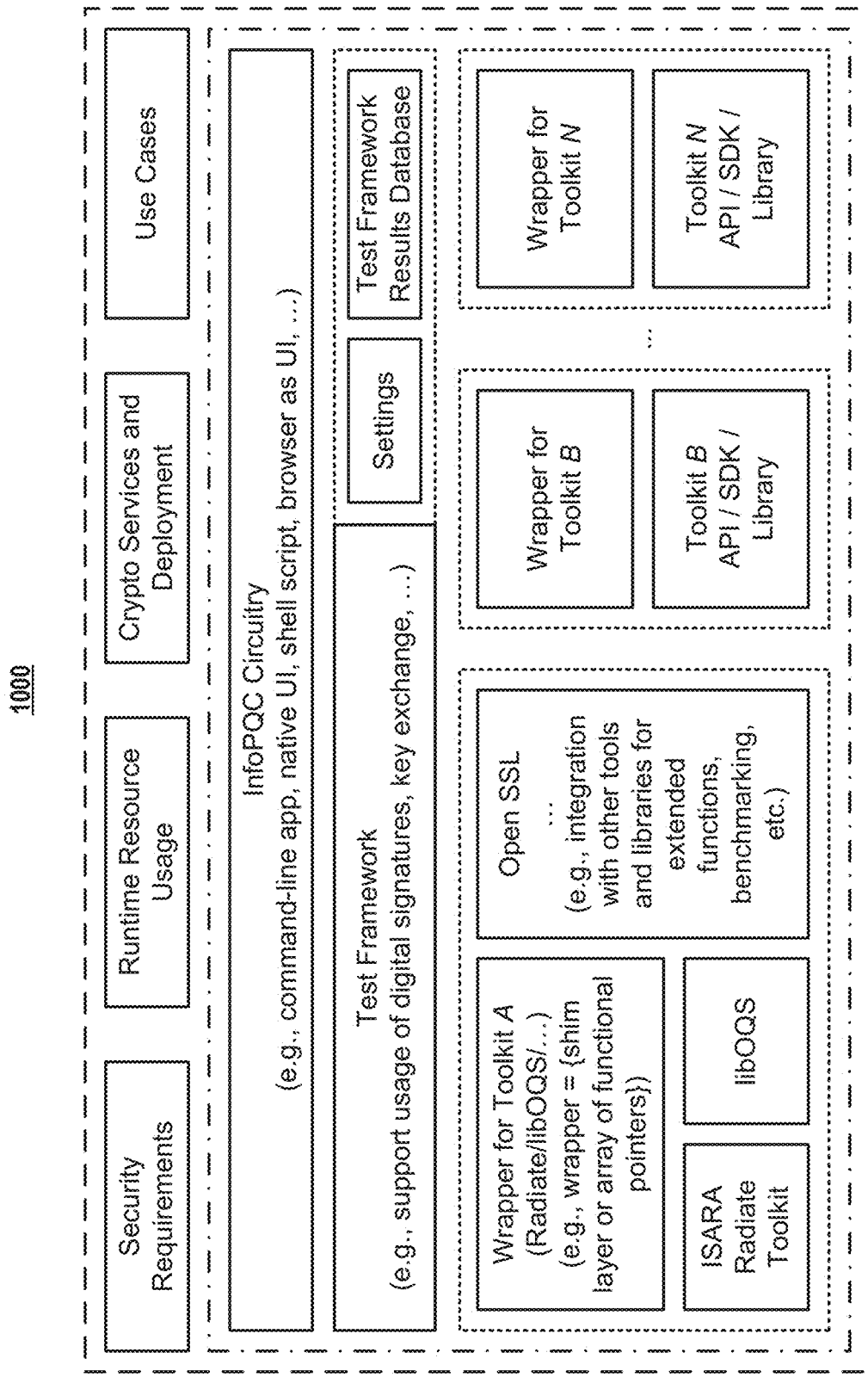
Figure 10B:
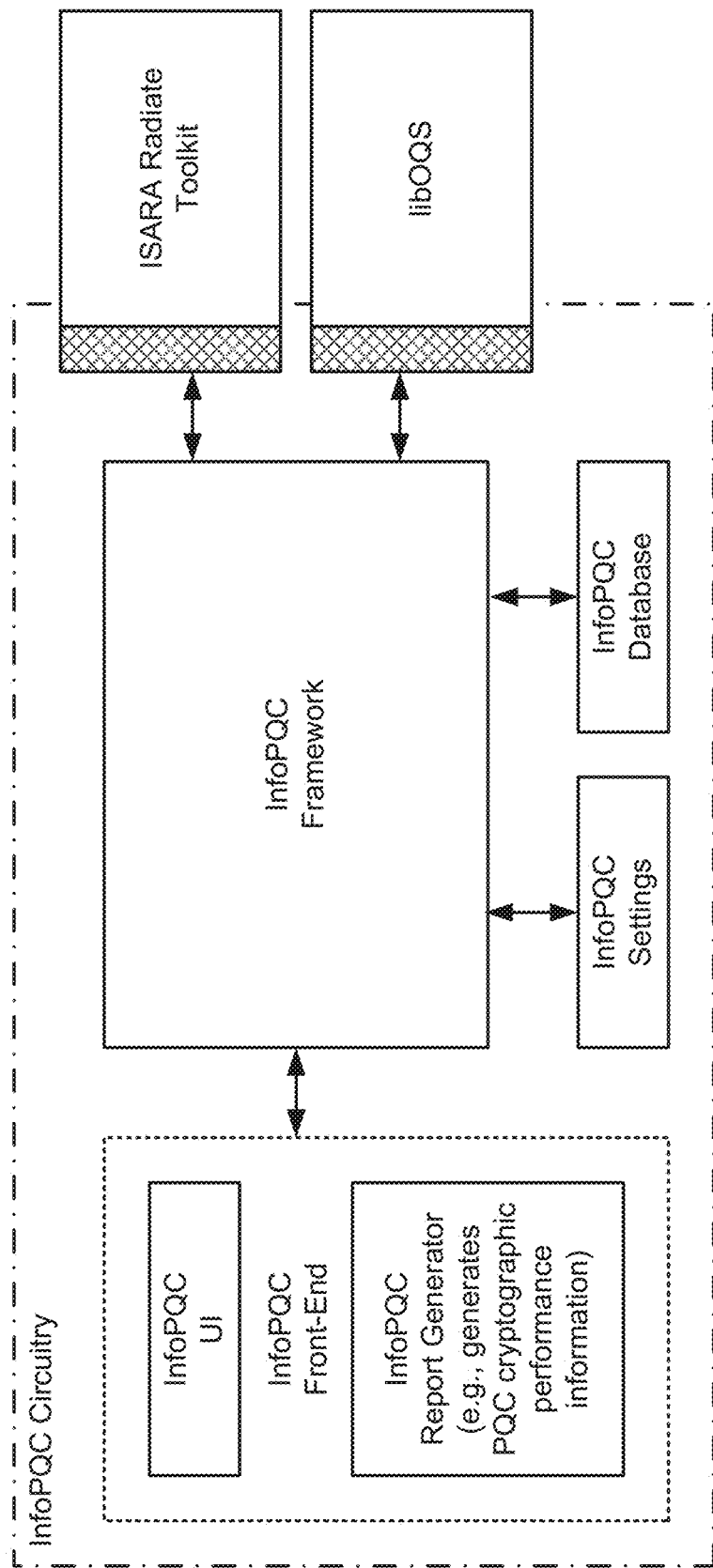

FIGS. 10A, 10B, and 10C illustrate example PQC system architectures configured to perform various operations in accordance with some example embodiments described herein. FIG. 10A illustrates a stack-based view of an example PQC system architecture 1000 configured to perform various operations in accordance with some example embodiments described herein. FIG. 10B illustrates an example InfoPQC system architecture 1010 comprising the key functional elements of the InfoPQC circuitry included in the example PQC system architecture 1000 shown in FIG. 10A.

In some embodiments, the InfoPQC circuitry shown in FIGS. 10A and 10B may be configured to analyze and evaluate the performance of multiple PQC cryptographic techniques (e.g., PQC cryptographic algorithms and variants thereof) by actively conducting performance analyses and identifying characteristics of those PQC cryptographic techniques. In some embodiments, the PQC system may be configured to generate deployment information indicative of issues, concerns, or recommendations for deploying the PQC cryptographic techniques. In some embodiments, the InfoPQC circuitry may be configured to generate data (e.g., PQC cryptographic performance information) to analyze the performance metrics of various PQC cryptographic technique libraries. In some embodiments, the InfoPQC circuitry may be configured to perform the following functionality:

(i) the InfoPQC circuitry may be configured to analyze various PQC cryptographic techniques and gather data to characterize these PQC cryptographic techniques and better understand their usability and implementations for use in facilitating the migration of classical security infrastructure to a quantum-resistant security infrastructure;

(ii) the InfoPQC circuitry may be configured to compare the implementations (e.g., variants) of the same PQC cryptographic algorithm from different toolkits (e.g., ISARA Radiate Toolkit, libOQS, NIST);

(iii) the InfoPQC circuitry may be configured to determine whether and how these PQC cryptographic techniques scale with their resource requirements;

(iv) the InfoPQC circuitry may be configured to determine whether and how these PQC cryptographic techniques are evolving by generating baseline data and subsequent performance data;

(v) the InfoPQC circuitry may be configured to perform functional testing of various quantum resistant cryptographic algorithms and quantum resistant digital certificates to gather performance metrics and computing resource requirements of the implementations;

(vi) the InfoPQC circuitry may be configured to verify whether the implementations can scale and integrate with existing infrastructure; and (vii) the InfoPQC circuitry may be configured to perform any other suitable operation or combination of operations described herein.

In some embodiments, the InfoPQC circuitry may further be configured to collect the performance analysis and associated metrics of these PQC cryptographic techniques and generate PQC cryptographic performance information, such as PQC cryptographic performance information 1020 shown in FIG. 10C.

FIG. 10C illustrates example PQC cryptographic performance information 1020 associated with a set of PQC cryptographic techniques 1024. In some embodiments, the PQC cryptographic performance information 1020 may comprise a set of PQC cryptographic performance attributes 1022 for each PQC cryptographic technique in the set of PQC cryptographic techniques 1024. In some embodiments, each PQC cryptographic technique in the set of PQC cryptographic techniques 1024 may be a variant (e.g., "II"; "III"; "IV"; "128"; "160") of a PQC cryptographic algorithm (e.g., "Dilithium"). For example, the example PQC cryptographic performance information 1120 may provide a visual comparison of the performance of Dilithium variants across the two libraries: Dilithium II/III/IV from libOQS; and Dilithium 128/160 from the ISARA Radiate Toolkit. As shown in FIG. 10C, the Dilithium variants from the ISARA Radiate Toolkit are much more efficient that the Dilithium variants from libOQS.

In some embodiments, the PQC system described herein may be configured to generate the PQC cryptographic performance information 1020 based on one or more operations configured to be performed by the PQC cryptographic attribute generation circuitry 246 shown in FIG. 2A. In some embodiments, the example PQC cryptographic performance information 1020 may be included in a cryptograph optimization GUI.

In some embodiments, the example PQC cryptographic performance information 1020 may provide a display (e.g., InfoPQC UI) showing the PQC cryptographic techniques that were analyzed by the InfoPQC circuitry shown in FIGS. 10A and 10B in association with the metrics captured by the InfoPQC circuitry based on (i) a basic use case and (ii) and integrated use case. In some embodiments, the InfoPQC circuitry may be configured to use OpenSSL integration for encryption and decryption.

In some embodiments, the PQC system may further be configured to generate, based on the generated PQC cryptographic performance information, (i) a relationship between memory usage and CPU usage for each variant of each PQC cryptographic technique; (ii) a measurement of standard deviation (e.g., the PQC system may determine that a large variation (e.g., a variation that exceeds a predetermined threshold value or a dynamic threshold generated by machine learning circuitry) indicates that the variant is unstable or unpredictable and thus is not a candidate to be considered for PQC migration); (iii) a determination of whether the variant has constant-time functions (e.g., runtime is not proportional to the length, size, or magnitude of the input); (iv) a collection of enough data to perform regression analysis and thereby predict resource usage; and (v) a determination of whether the distribution is skewed to the left or the right based on a comparison of average and median values.

In some embodiments, the PQC system may further be configured to analyze and evaluate the performance and deployment of various HSM, operating system, secure messaging and cryptographic accelerators to understand their preferences and deployment impacts. In some embodiments, the PQC system may further be configured to compare traditional cryptographic techniques (e.g., non-PQC cryptographic techniques) with select PQC cryptographic techniques to measure the drop-in replacement ability of particular PQC cryptographic techniques as part of a potential or actual PQC migration. In some embodiments, the PQC system may further be configured to analyze and evaluate hybrid PQC cryptographic techniques and emerging cryptographic techniques, such as post-quantum hybrid X.509 certificates. In some embodiments, the PQC system may further be configured to provide a testbed for integrating a selected or recommended PQC cryptographic technique into a real-world application, such as in the deployment of TLS 1.3 with a quantum resistant cipher suite.

Having described specific components of example devices and circuitries involved in various embodiments contemplated herein, example procedures for PQC are described below in connection with FIGS. 11-15.

Example Operations for PQC

Figure 11:
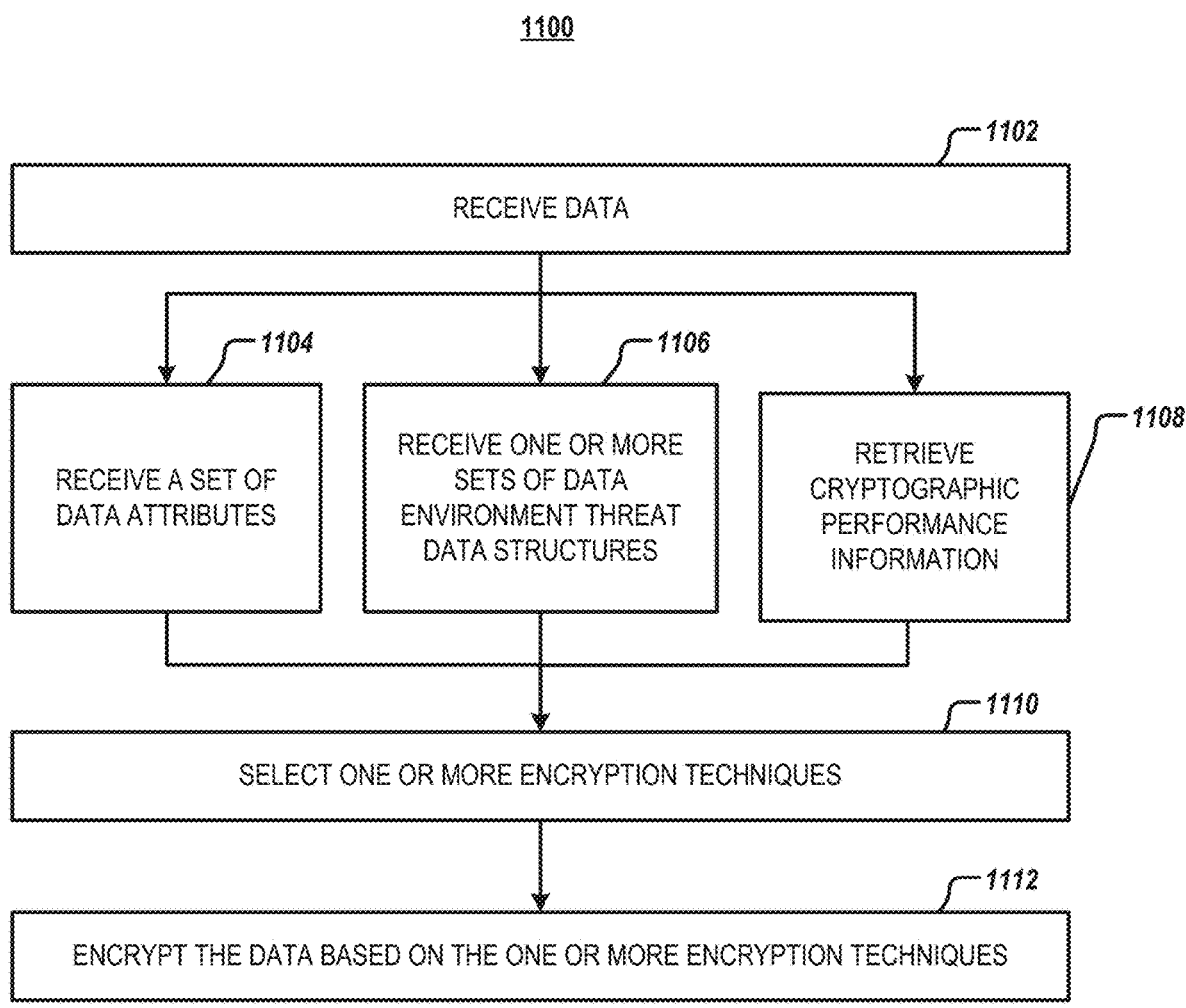
FIG. 11 illustrates example flowchart for selecting one or more cryptographic techniques for one or more data environments in accordance with some example embodiments described herein.

FIG. 11 illustrates an example flowchart 1100 that contains example operations for selecting one or more PQC cryptographic techniques for one or more data environments in accordance with some example embodiments described herein. The operations illustrated in FIG. 11 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 11 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, cryptographic technique selection circuitry 259, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1102, the apparatus 200 includes means, such as communications circuitry 208 or the like, for receiving data. In some embodiments, the apparatus 200 may receive the data as described in more detail with reference to, by way of example, FIGS. 1-3.

As shown by operation 1104, the apparatus 200 includes means such as the communications circuitry 208 or the like, for receiving a set of data attributes about the data. In some embodiments, the apparatus 200 may receive the set of data attributes about the data as described in more detail with reference to, by way of example, FIGS. 1-3. In some embodiments, the set of data attributes comprises one or more sets of data environment data attributes that are each representative of a set of data environments associated with the data. the data attribute generation circuitry 214 may generate a set of data attributes about the data that comprises more than one set of data environment data attributes that are each representative of a set of data environments associated with the data. In some embodiments, each set of data environments associated with the data are data environments that the data are expected to be transmitted through in the process of transmission in one possible path identified, by way of example, by the data route identification circuitry 237. In some embodiments, the set of data environments associated with the data are all or a subset of data environments that the data are expected to be transmitted through in the process of transmission in the particular one possible path.

In some embodiments, the set of data environments are one or more of internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, remote recognized authoritative data sources, Internet of Things networks comprising distributed devices that can store data and pre-defined states such as edge networks, content delivery networks (CDNs), cloud service platforms, social media platforms, dark websites, one or more devices associated with any of the above, one or more device identifiers associated with any of the above, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, one or more devices associated with any of the above, one or more device identifiers associated with any of the above, and/or any combination thereof. In some embodiments, the one or more data environments may be identified based on one or more of: one or more device identifiers, one or more network identifiers, one or more geographic locations associated with one or more devices associated with the one or more data environments, or any other identifier that may be determined, generated, or identified by the apparatus 200 or another apparatus.

As shown by operation 1106, the apparatus 200 includes means such as the communications circuitry 208 or the like, for receiving one or more sets of data environment threat data structures associated with one or more data environments in the one or more sets of data environments associated with the data. In some embodiments, the data environment threat data structures may further include one or more pre-selected cryptographic techniques that are pre-determined to be appropriate for each data environment associated with the data environment threat data structures. In such embodiments, the pre-selected cryptographic techniques may serve as basis for selecting the cryptographic techniques in later operations. In some alternative embodiments, the one or more data environment threat data structures do not include the one or more pre-selected cryptographic techniques. In some embodiments, the apparatus 200 may receive the one or more sets of data environment threat data structures as described in more detail with reference to, by way of example, FIGS. 1-3.

As shown by operation 1108, the apparatus 200 includes means, such as cryptographic performance circuitry 236 or the like, for retrieving cryptographic performance information associated with a set of cryptographic techniques. In some embodiments, the cryptographic performance information may comprise a set of PQC cryptographic performance attributes for each PQC cryptographic technique in a set of PQC cryptographic techniques. In some embodiments, the cryptographic performance information may comprise a set of non-PQC cryptographic performance attributes for each non-PQC cryptographic technique in a set of non-PQC cryptographic techniques. In some embodiments, each PQC cryptographic technique in the set of PQC cryptographic techniques may be a variant of a PQC cryptographic algorithm. In some embodiments, the set of cryptographic performance attributes may comprise a CPU utilization for each cryptographic technique in the set of cryptographic techniques. In some embodiments, the set of cryptographic performance attributes may comprise a memory utilization for each cryptographic technique in the set of cryptographic techniques. In some embodiments, the set of cryptographic performance attributes may comprise an encryption time (e.g., a determined processing time needed to encrypt a unit of data, such as seconds per megabyte of data) for each cryptographic technique in the set of cryptographic techniques. In some embodiments, the set of cryptographic performance attributes may comprise a decryption time (e.g., a determined processing time needed to decrypt a unit of encrypted data, such as seconds per megabyte of data) for each cryptographic technique in the set of cryptographic techniques. In some embodiments, the set of cryptographic performance attributes may comprise a verification time (e.g., a determined processing time needed to verify a unit of encrypted data, such as seconds per megabyte of data) for each cryptographic technique in the set of PQC cryptographic techniques. In some embodiments, the set of cryptographic performance attributes may comprise a key length (e.g., key size) for each cryptographic technique in the set of cryptographic techniques. In some embodiments, the set of cryptographic performance attributes may comprise a payload size for each cryptographic technique in the set of cryptographic techniques. In some embodiments, the set of cryptographic performance attributes may comprise a payload longevity for each cryptographic technique in the set of cryptographic techniques. In some embodiments, the set of cryptographic performance attributes may comprise a set of policy attributes for each cryptographic technique in the set of cryptographic techniques. In some embodiments, the set of cryptographic performance attributes may comprise an information classification for each cryptographic technique in the set of cryptographic techniques. In some embodiments, the set of PQC cryptographic performance attributes may comprise a mode of operation for each cryptographic technique in the set of cryptographic techniques. In some embodiments, the apparatus 200 may retrieve the PQC cryptographic performance information from one or more PQC server devices (e.g., one or more PQC server devices 104, one or more PQC server devices 304, PQC callback 310), one or more PQC databases (e.g., one or more PQC databases 106), one or more PQC cryptographic technique storage devices (e.g., one or more PQC cryptographic technique storage devices 312), one or more quantum cryptographic technique storage devices (e.g., one or more quantum cryptographic technique storage devices 318), any other suitable device, or any combination thereof. In some embodiments, the apparatus 200 may generate the cryptographic performance information based on a machine learning technique. In some embodiments, the apparatus 200 may retrieve the cryptographic performance information as described in more detail with reference to, by way of example, FIGS. 1-3.

As shown by operation 1110, the apparatus 200 includes means, such as PQC cryptographic attribute generation circuitry 246 or the like, for selecting one or more cryptographic techniques for encrypting the data for at least the one or more data environments based at least on the set of data attributes, the one or more sets of data environment threat data structures, and a cryptograph optimization machine learning model. In some embodiments, the one or more cryptographic techniques may be one or more of a PQC, a non-PQC, or a hybrid cryptographic technique.

In some embodiments, the apparatus 200 includes means for determining a current load associated with the cryptographic circuitry and selecting the cryptographic technique may be further based on the current load. In some embodiments, the PQC cryptographic circuitry may be allocated a pre-defined amount of computing resources, such as CPU computing power, memory, or the like. In some embodiments, the encryption algorithm may be selected based on the current load such that the PQC cryptographic circuitry will not use more than the pre-defined amount of computing resources so that the PQC cryptographic circuitry will not use computing resources allocated for other circuitries. In some embodiments, additional computing resources may be allocated to the PQC cryptographic circuitry so that the PQC cryptographic circuitry may utilize more than the pre-defined amount of computing resources. In some embodiments, the apparatus 200 includes means for receiving a set of real time network status data and the selecting of the cryptographic technique may be further based on the set of real time network status data. In some embodiments, the apparatus 200 includes means for generating an allowable transaction time of the data and selecting the cryptographic technique may be further based on the allowable transaction time. In some embodiments, randomness (such as randomness in the form of quantum computing randomness) may be introduced in selecting the cryptographic technique.

As shown by operation 1112, the apparatus 200 includes means, such as PQC cryptographic circuitry 252, non-PQC cryptographic circuitry 250, or the like, for encrypting the data. In some embodiments, the apparatus 200 may encrypt the data based at least on the one or more selected encryption techniques. In some embodiments, the apparatus 200 may encrypt the data as described in more detail with reference to, by way of example, FIGS. 1-3. In some embodiments, the apparatus may include an indication of the one or more selected encryption techniques in the set of data attribute which may be in turn be included in an enveloped data structure as described in more detail with reference to, by way of example, FIG. 12.

Figure 14:
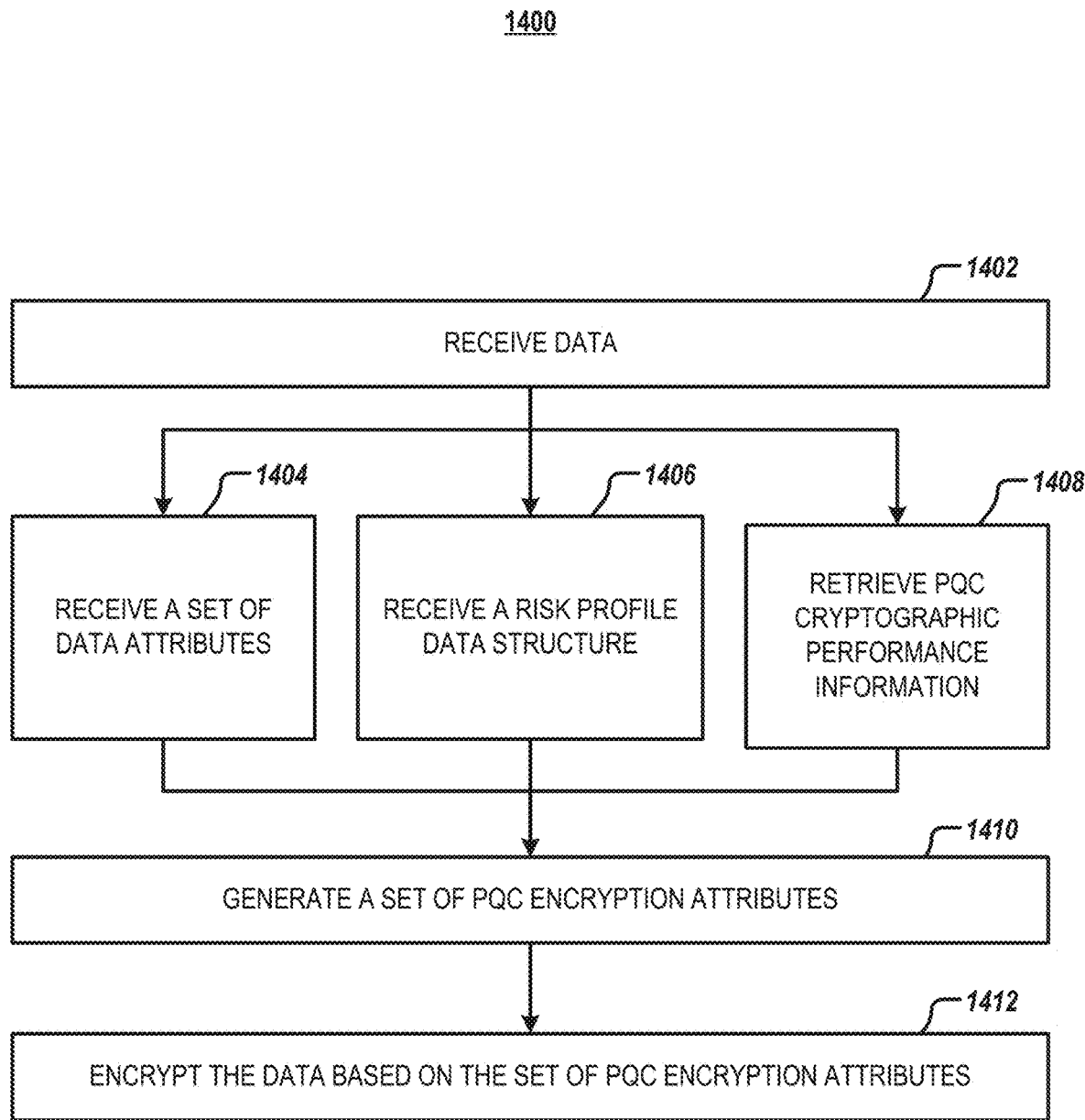
FIG. 14 illustrates an example flowchart for generating a set of PQC encryption attributes in accordance with some example embodiments described herein.

In some embodiments, operations 1102, 1104, 1106, 1108, 910, and 1112 may not necessarily occur in the order depicted in FIG. 11, and in some cases one or more of the operations depicted in FIG. 11 may occur substantially simultaneously, or additional steps may be involved before, after, or between any of the operations shown in FIG. 14.

Figure 12:
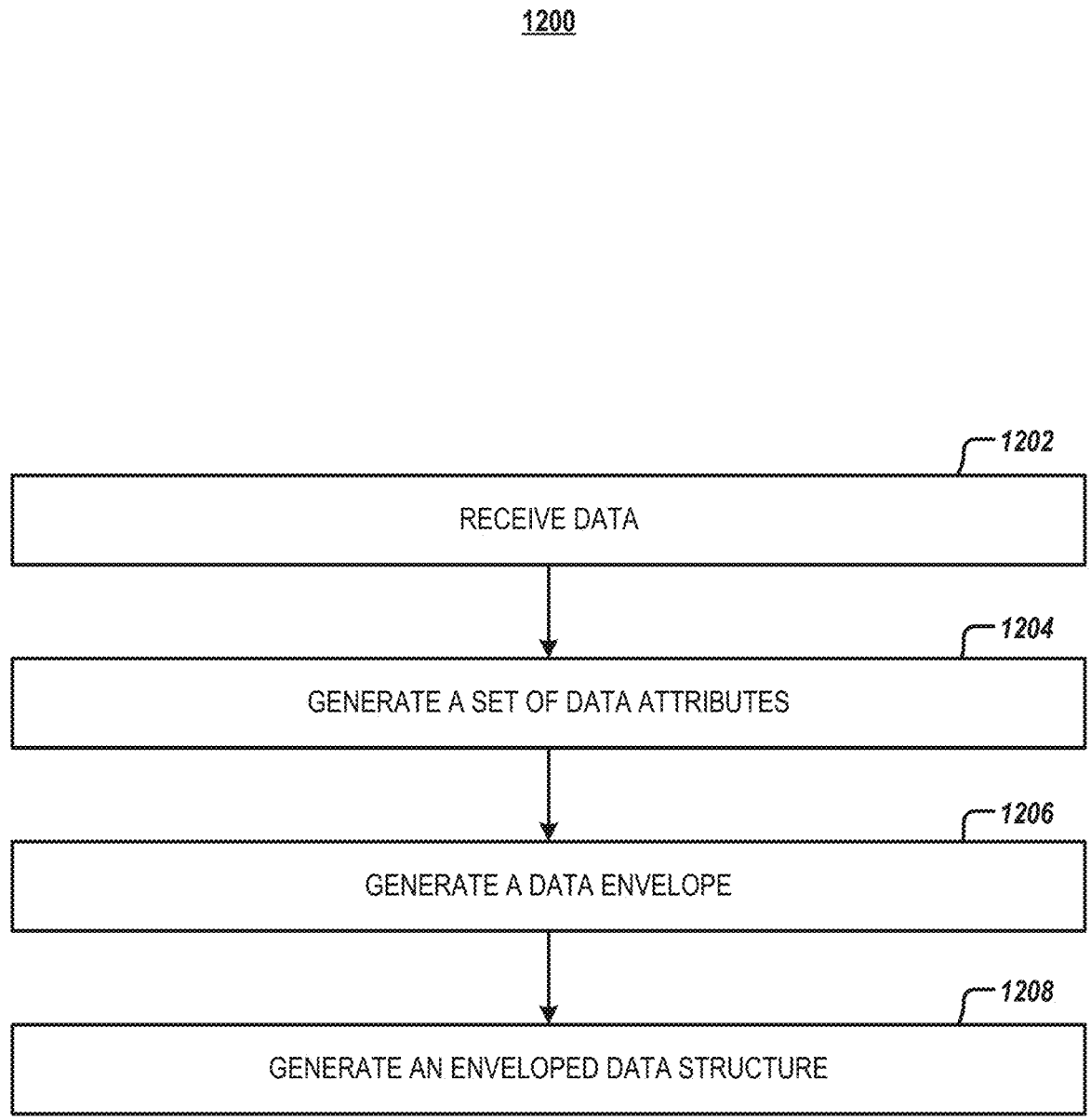
FIG. 12 illustrates an example flowchart for generating an enveloped data structure in accordance with some example embodiments described herein.

FIG. 12 illustrates an example flowchart 1200 that contains example operations for generating an enveloped data structure in accordance with some example embodiments described herein. The operations illustrated in FIG. 12 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 12 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, Cryptographic technique selection circuitry 259, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1202, the apparatus 200 includes means, such as communications circuitry 208 or the like, for receiving data. In some embodiments, the data may comprise data access control information, a link or pointer to the data (e.g., a link to a credit card number), a bitstream, a BLOB, any other suitable data, or any combination thereof. In some embodiments, the data may have been encrypted based on a set of encryption attributes, such as a set of non-PQC encryption attributes, a set of PQC encryption attributes, or both (e.g., double encryption where the data has been encrypted based on a set of non-PQC encryption attributes and then double encrypted based on a set of PQC encryption attributes). In some embodiments, the apparatus 200 may receive the data as described in more detail with reference to, by way of example, FIGS. 1-3.

As shown by operation 1204, the apparatus 200 includes means, such as data attribute generation circuitry 214 or the like, for generating a set of data attributes about the data. In some embodiments, the set of data attributes about the data may comprise a data lineage data attribute indicative of a data lineage of the data. In some embodiments, the set of data attributes about the data may comprise a cryptographic data attribute indicative of a cryptographic technique used to encrypt the data. For example, the apparatus 200 may generate, without user interactivity, the cryptographic data attribute based on an automated analysis of a bitstream of the data. In some embodiments, the set of data attributes about the data may comprise a cryptographic spawn log indicative of a set of cryptographic techniques used to encrypt the data. For example, the apparatus 200 may generate a cryptographic spawn log comprising a set of timestamps and information indicative of sets of PQC encryption attributes used to encrypt the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the apparatus 200 may generate a cryptographic spawn log comprising a set of encryption identification numbers and information indicative of sets of PQC encryption attributes used to encrypt the data over an amount of encryptions (e.g., all encryptions; the last five encryptions, or any other suitable amount of encryptions), wherein each encryption identification number in the set of encryption identification numbers corresponds to a set of PQC encryption attributes used to encrypt the data at the time associated with the encryption identification number. In some embodiments, the set of data attributes about the data may comprise a data zone data attribute indicative of a data zone associated with the data. In some embodiments, the set of data attributes about the data may comprise a data access log indicative of a set of data activity monitoring information (e.g., database activity monitoring information, access credentials, user identification information, machine identification information) associated with electronic access to the data. For example, the apparatus 200 may generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In some embodiments, the set of data attributes about the data may comprise a determination that the data has been accessed. In some embodiments, the set of data attributes about the data may comprise a determination that the data has transitioned from the first data zone to the second data zone. In some embodiments, the apparatus 200 may generate the set of data attributes about the data based on the data itself, overhead data (e.g., protocol overhead, header, metadata) associated with the data, any other suitable data or electronic information, or any combination thereof. In some embodiments, the apparatus 200 may generate the set of data attributes about the data based on a machine learning technique. In some embodiments, the apparatus 200 may generate the set of data attributes as described in more detail with reference to, by way of example, FIGS. 1-3.

As shown by operation 1206, the apparatus 200 includes means, such as data envelope generation circuitry 216 or the like, for generating a data envelope. In some embodiments, the data envelope comprises the set of data attributes. In some embodiments, the apparatus 200 may generate the data envelope based on the set of data attributes. In some embodiments, the data envelope comprises the set of data attributes, a risk profile data structure, any other suitable data, or any combination thereof. In some embodiments, the apparatus 200 may generate the data envelope as described in more detail with reference to, by way of example, FIGS. 1-3.

As shown by operation 1208, the apparatus 200 includes means, such as data structure generation circuitry 218 or the like, for generating an enveloped data structure. In some embodiments, the enveloped data structure comprises the data envelope and the data. In some embodiments, the enveloped data structure comprises the data envelope (e.g., set of data attributes, risk profile data structure, any other suitable data, or any combination thereof) and the data (e.g., data access control information, link or pointer to the data, bitstream, BLOB, any other suitable data, or any combination thereof). For example, the enveloped data structure may comprise the data enveloped by the data envelope. In some embodiments, the apparatus 200 may generate the enveloped data structure based on the data envelope and the data. In some embodiments, the apparatus 200 may generate the enveloped data structure as described in more detail with reference to, by way of example, FIGS. 1-3.

In some embodiments, operations 1202, 1204, 1206, and 1208 may not necessarily occur in the order depicted in FIG. 12, and in some cases one or more of the operations depicted in FIG. 12 may occur substantially simultaneously, or additional steps may be involved before, after, or between any of the operations shown in FIG. 12.

Figure 13:
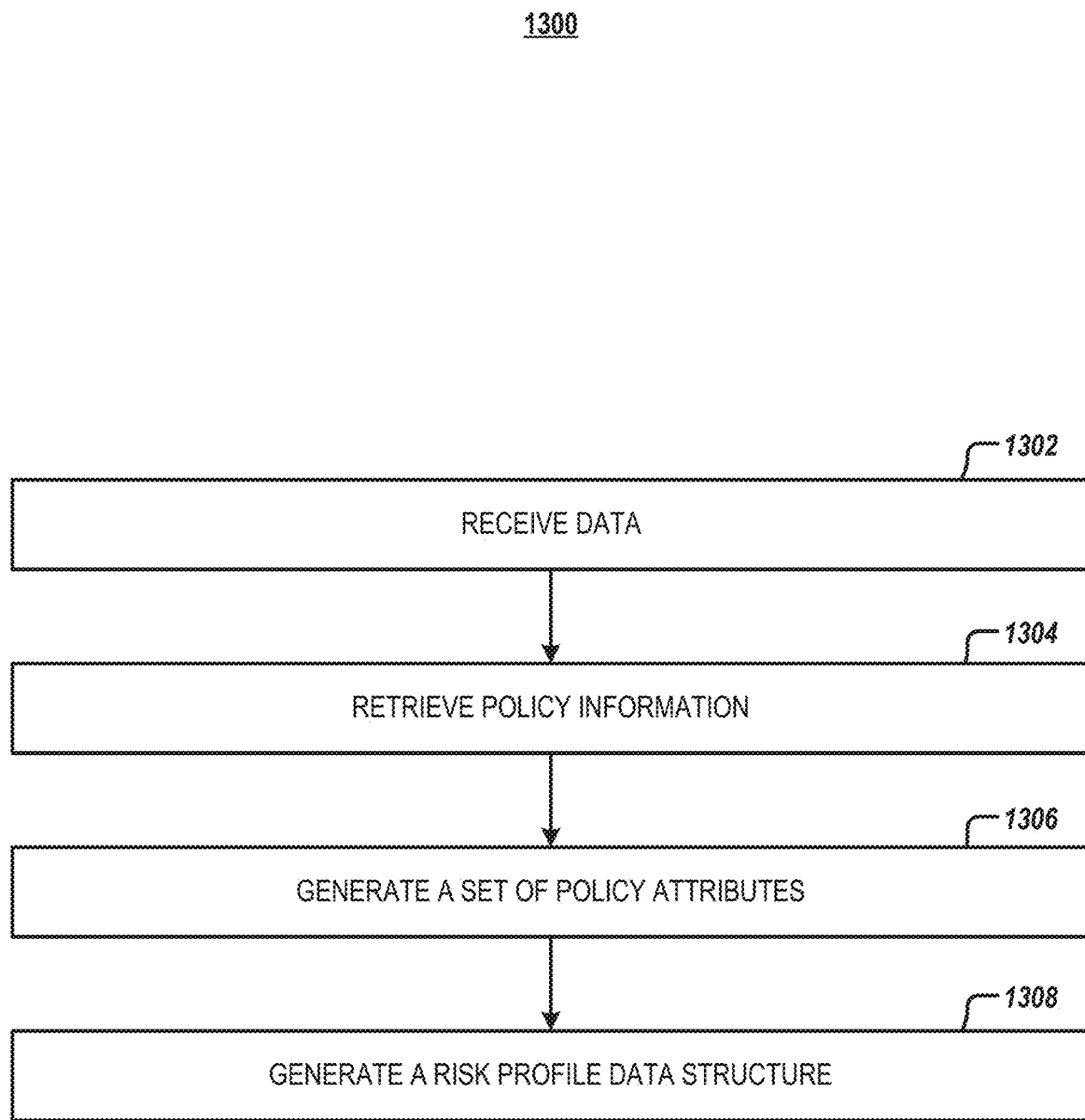
FIG. 13 illustrates an example flowchart for generating a risk profile data structure in accordance with some example embodiments described herein.

FIG. 13 illustrates an example flowchart 1300 that contains example operations for generating a risk profile data structure in accordance with some example embodiments described herein. The operations illustrated in FIG. 13 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 13 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1302, the apparatus 200 includes means, such as communications circuitry 208 or the like, for receiving data. In some embodiments, the apparatus 200 may receive the data as described in more detail with reference to, by way of example, FIGS. 1-3.

As shown by operation 1304, the apparatus 200 includes means, such as policy attribute generation circuitry 226 or the like, for retrieving policy information associated with the data. In some embodiments, the policy information may comprise a set of technological advancements, such as advancements in materials science related to quantum computing (e.g., room temperature superconductors), advancements in quantum computing capabilities (e.g., the number of qubits in a scalable quantum computing architecture, advancements related to Rose's law), any other suitable data, or any combination thereof. In some embodiments, the policy information may comprise data retention policy information, such as data retention requirements for various classes of data records listed in the FDIC's Records Retention Schedule discussed above with reference to Table 1. In some embodiments, the policy information may comprise compliance information indicative of a set of compliance requirements for the data. In some embodiments, the apparatus 200 may retrieve the policy information from one or more remote devices, such as one or more database server devices (e.g., one or more database server devices 114), one or more remote server devices (e.g., one or more remote server devices 116), any other suitable device, or any combination thereof. In some embodiments, the apparatus 200 may retrieve the policy information as described in more detail with reference to, by way of example, FIGS. 1-3.

As shown by operation 1306, the apparatus 200 includes means, such as the policy attribute generation circuitry 226 or the like, for generating a set of policy attributes about the data. In some embodiments, the set of policy attributes may comprise a temporal PQC threat policy attribute indicative of an approximate time to a quantum computing threat. For example, the apparatus 200 may generate the temporal PQC threat policy attribute based on a set of technological advancements included in the policy information. In some embodiments, the set of policy attributes may comprise a value of the data. In some embodiments, the set of policy attributes may comprise a longevity of the data. For example, the apparatus 200 may generate the longevity of the data based on data retention policy information included in the policy information. In some embodiments, the set of policy attributes may comprise a cryptostrength of the data. In some embodiments, the set of policy attributes may comprise a set of vulnerability scan results. For example, the apparatus 200 may perform a vulnerability scan of the data and generate the set of vulnerability scan results based on the performance of the vulnerability scan. In some embodiments, the apparatus 200 may generate the set of policy attributes about the data based on the data and the policy information. In some embodiments, the apparatus 200 may receive a set of data attributes about the data and generate the set of policy attributes about the data further based on the set of data attributes about the data. In some embodiments, the apparatus 200 may generate the set of policy attributes about the data based on a machine learning technique. In some embodiments, the apparatus 200 may generate the set of policy attributes as described in more detail with reference to, by way of example, FIGS. 1-3.

As shown by operation 1308, the apparatus 200 includes means, such as risk profile generation circuitry 228 or the like, for generating a risk profile data structure indicative of a vulnerability of the data in a PQC data environment. In some embodiments, the risk profile data structure may comprise a plurality of risk profile data elements indicative of a vulnerability of the data in a PQC data environment. In some embodiments, the risk profile data structure may comprise a vulnerability score data structure, a vulnerability score explanation data structure, a compliance score data structure, a compliance score explanation data structure, any other suitable data, or any combination thereof. In some embodiments, the apparatus 200 may generate the risk profile data structure based on the set of policy attributes. In some embodiments, the apparatus 200 may generate the risk profile data structure as described in more detail with reference to, by way of example, FIGS. 1-3.

In some embodiments, operations 1302, 1304, 1306, and 1308 may not necessarily occur in the order depicted in FIG. 13, and in some cases one or more of the operations depicted in FIG. 13 may occur substantially simultaneously, or additional steps may be involved before, after, or between any of the operations shown in FIG. 13.

FIG. 14 illustrates an example flowchart 1400 that contains example operations for generating a set of PQC encryption attributes in accordance with some example embodiments described herein. The operations illustrated in FIG. 14 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 14 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1402, the apparatus 200 includes means, such as communications circuitry 208 or the like, for receiving data. In some embodiments, the apparatus 200 may receive the data as described in more detail with reference to, by way of example, FIGS. 1-3.

As shown by operation 1404, the apparatus 200 includes means such as the communications circuitry 208 or the like, for receiving a set of data attributes about the data. In some embodiments, the apparatus 200 may receive the set of data attributes about the data as described in more detail with reference to, by way of example, FIGS. 1-3.

As shown by operation 1406, the apparatus 200 includes means such as the communications circuitry 208 or the like, for receiving a risk profile data structure indicative of a vulnerability of the data in a PQC data environment. In some embodiments, the apparatus 200 may receive the risk profile data structure as described in more detail with reference to, by way of example, FIGS. 1-3.

As shown by operation 1408, the apparatus 200 includes means, such as PQC cryptographic performance circuitry 240 or the like, for retrieving PQC cryptographic performance information associated with a set of PQC cryptographic techniques. In some embodiments, the PQC cryptographic performance information may comprise a set of PQC cryptographic performance attributes for each PQC cryptographic technique in the set of PQC cryptographic techniques. In some embodiments, each PQC cryptographic technique in the set of PQC cryptographic techniques may be a variant of a PQC cryptographic algorithm. In some embodiments, the set of PQC cryptographic performance attributes may comprise a CPU utilization for each PQC cryptographic technique in the set of PQC cryptographic techniques. In some embodiments, the set of PQC cryptographic performance attributes may comprise a memory utilization for each PQC cryptographic technique in the set of PQC cryptographic techniques. In some embodiments, the set of PQC cryptographic performance attributes may comprise an encryption time (e.g., a determined processing time needed to encrypt a unit of data, such as seconds per megabyte of data) for each PQC cryptographic technique in the set of PQC cryptographic techniques. In some embodiments, the set of PQC cryptographic performance attributes may comprise a decryption time (e.g., a determined processing time needed to decrypt a unit of encrypted data, such as seconds per megabyte of data) for each PQC cryptographic technique in the set of PQC cryptographic techniques. In some embodiments, the set of PQC cryptographic performance attributes may comprise a verification time (e.g., a determined processing time needed to verify a unit of encrypted data, such as seconds per megabyte of data) for each PQC cryptographic technique in the set of PQC cryptographic techniques. In some embodiments, the set of PQC cryptographic performance attributes may comprise a key length (e.g., key size) for each PQC cryptographic technique in the set of PQC cryptographic techniques. In some embodiments, the set of PQC cryptographic performance attributes may comprise a payload size for each PQC cryptographic technique in the set of PQC cryptographic techniques. In some embodiments, the set of PQC cryptographic performance attributes may comprise a payload longevity for each PQC cryptographic technique in the set of PQC cryptographic techniques. In some embodiments, the set of PQC cryptographic performance attributes may comprise a set of policy attributes for each PQC cryptographic technique in the set of PQC cryptographic techniques. In some embodiments, the set of PQC cryptographic performance attributes may comprise an information classification for each PQC cryptographic technique in the set of PQC cryptographic techniques. In some embodiments, the set of PQC cryptographic performance attributes may comprise a mode of operation for each PQC cryptographic technique in the set of PQC cryptographic techniques. In some embodiments, the apparatus 200 may retrieve the PQC cryptographic performance information from one or more PQC server devices (e.g., one or more PQC server devices 104, one or more PQC server devices 304, PQC callback 310), one or more PQC databases (e.g., one or more PQC databases 106), one or more PQC cryptographic technique storage devices (e.g., one or more PQC cryptographic technique storage devices 312), one or more quantum cryptographic technique storage devices (e.g., one or more quantum cryptographic technique storage devices 318), any other suitable device, or any combination thereof. In some embodiments, the apparatus 200 may generate the PQC cryptographic performance information based on a machine learning technique. In some embodiments, the apparatus 200 may retrieve the PQC cryptographic performance information as described in more detail with reference to, by way of example, FIGS. 1-3.

As shown by operation 1410, the apparatus 200 includes means, such as PQC cryptographic attribute generation circuitry 246 or the like, for generating a set of PQC encryption attributes for encrypting the data. In some embodiments, the apparatus 200 may generate the set of PQC encryption attributes based on the set of data attributes, the risk profile data structure, and the PQC cryptographic performance information. In some embodiments, the apparatus 200 may generate the set of PQC encryption attributes based on the cryptograph optimization machine learning model. In some embodiments, the apparatus 200 may generate the set of PQC encryption attributes as described in more detail with reference to, by way of example, FIGS. 1-3.

In some embodiments, the apparatus 200 includes means for determining a current load associated with the PQC cryptographic circuitry and generating the set of PQC encryption attributes may be further based on the current load In some embodiments, the apparatus 200 includes means for receiving a set of real time network status data and generating the set of PQC encryption attributes may be further based on the set of real time network status data. In some embodiments, the apparatus 200 includes means for generating an allowable transaction time of the data and generating the set of PQC encryption attributes may be further based on the allowable transaction time.

As shown by operation 1412, the apparatus 200 includes means, such as PQC cryptographic circuitry 252 or the like, for encrypting the data. In some embodiments, the apparatus 200 may encrypt the data based on the set of PQC encryption attributes. In some embodiments, the apparatus 200 may encrypt the data as described in more detail with reference to, by way of example, FIGS. 1-3.

In some embodiments, operations 1402, 1404, 1406, 1408, 1410, and 1412 may not necessarily occur in the order depicted in FIG. 14, and in some cases one or more of the operations depicted in FIG. 14 may occur substantially simultaneously, or additional steps may be involved before, after, or between any of the operations shown in FIG. 14.

Figure 15:
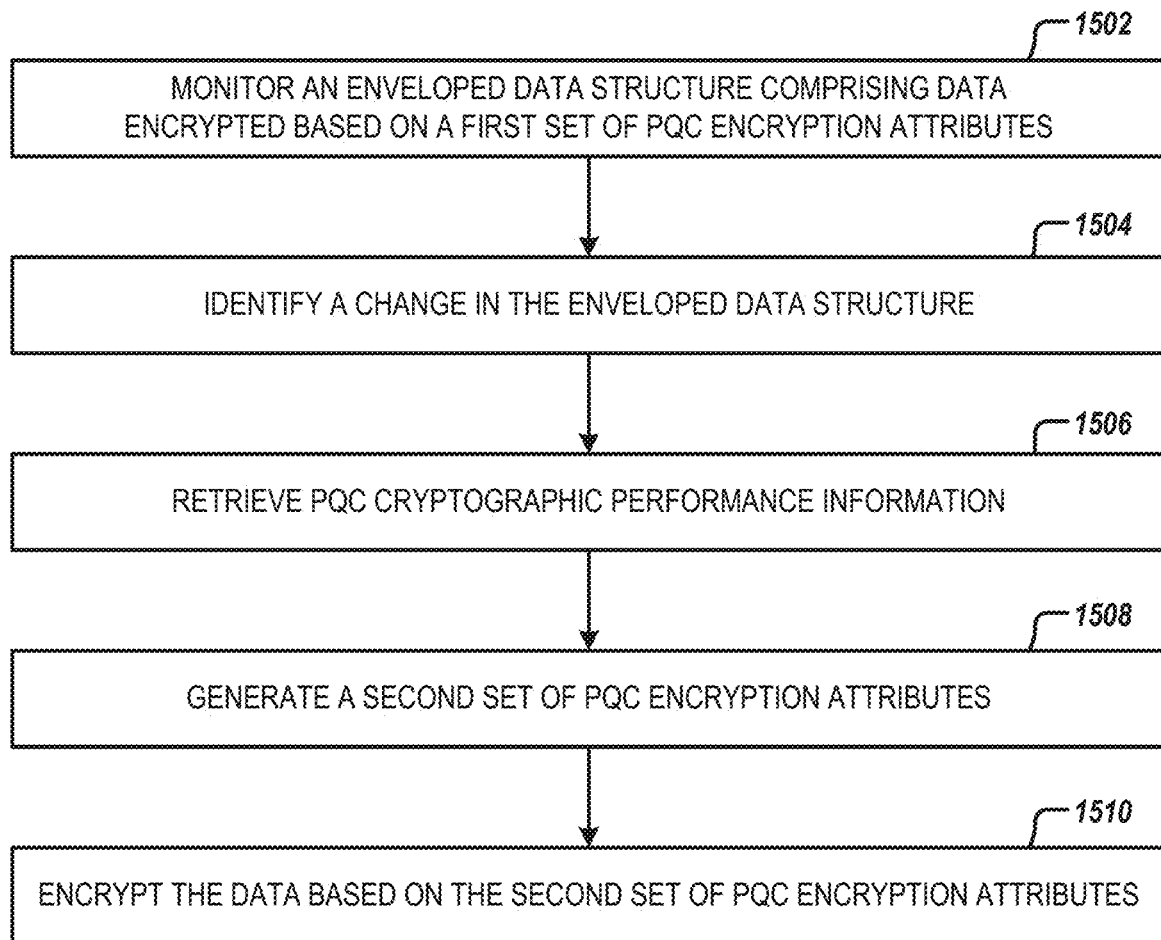
FIG. 15 illustrates an example flowchart for providing adaptive PQC in accordance with some example embodiments described herein.

FIG. 15 illustrates an example flowchart 1500 that contains example operations for providing adaptive PQC in accordance with some example embodiments described herein. In some embodiments, the example flowchart 1500 contains example operations for providing adaptive PQC by dynamically optimizing (e.g., dynamically upgrading, dynamically downgrading, dynamically throttling) the PQC encryption attributes used to encrypt data contained in an enveloped data structure. The operations illustrated in FIG. 15 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 15 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 214, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1502, the apparatus 200 includes means, such as data monitoring circuitry 220 or the like, for monitoring an enveloped data structure. In some embodiments, the enveloped data structure may comprise a data envelope and data. In some embodiments, the data envelope may comprise a set of data attributes about the data and a risk profile data structure indicative of a vulnerability of the data in a PQC data environment. In some embodiments, the data has been encrypted based on a first set of PQC encryption attributes. In some embodiments, the apparatus 200 may monitor the enveloped data structure as described in more detail with reference to, by way of example, FIGS. 1-3.

As shown by operation 1504, the apparatus 200 includes means, such as data monitoring circuitry 220 or the like, for identifying a change in the enveloped data structure. In some embodiments, the change in the enveloped data structure may be a change in the risk profile data structure, such as a change in a value of the data, a change in a longevity of the data, a change in a cryptostrength of the data, a change in a result of a vulnerability scan of the data, a change in a vulnerability score value (e.g., any value associated with a vulnerability score data structure comprising a vulnerability score range comprising a minimum vulnerability score value, a maximum vulnerability score value, a median vulnerability score value, a mean vulnerability score value, a first quartile vulnerability score value, a third quartile vulnerability score value, an interquartile vulnerability score range between the first quartile vulnerability score value and the third quartile vulnerability score value, any other suitable value, metric, or range, or any combination thereof) indicative of a percentage of vulnerability of the data in the PQC data environment, a change in a compliance score value indicative of a percentage of compliance of the data to a set of compliance requirements, a change in an approximate time to a quantum computing threat (e.g., changes in vulnerabilities to existing algorithms), a change in exogenous data associated with the data, wherein the exogenous data comprises a public sentiment data structure (e.g., a widespread data breach at a third-party system, such as a merchant). In some embodiments, the apparatus 200 may identify the change in the enveloped data structure by generating an electronic indication of the change in the enveloped data structure. In some embodiments, the apparatus 200 may identify the change in the enveloped data structure as described in more detail with reference to, by way of example, FIGS. 1-3.

As shown by operation 1506, the apparatus 200 includes means, such as PQC cryptographic performance circuitry 240 or the like, for retrieving PQC cryptographic performance information associated with a set of PQC cryptographic techniques. In some embodiments, the PQC cryptographic performance information may comprise a set of PQC cryptographic performance attributes for each PQC cryptographic technique in the set of PQC cryptographic techniques. In some embodiments, the apparatus 200 may retrieve the PQC cryptographic performance information in response to identification the change in the enveloped data structure. For example, the apparatus 200 may retrieve the PQC cryptographic performance information in response to generation of the electronic indication of the change in the enveloped data structure. In some embodiments, the apparatus 200 may retrieve the PQC cryptographic performance information from one or more PQC server devices (e.g., one or more PQC server devices 104, one or more PQC server devices 304, PQC callback 310), one or more PQC databases (e.g., one or more PQC databases 106), one or more PQC cryptographic technique storage devices (e.g., one or more PQC cryptographic technique storage devices 312), one or more quantum cryptographic technique storage devices (e.g., one or more quantum cryptographic technique storage devices 318), any other suitable device, or any combination thereof. In some embodiments, the apparatus 200 may generate the PQC cryptographic performance information based on a machine learning technique. In some embodiments, the apparatus 200 may retrieve the PQC cryptographic performance information as described in more detail with reference to, by way of example, FIGS. 1-3.

As shown by operation 1508, the apparatus 200 includes means, such as PQC cryptographic attribute generation circuitry 246 or the like, for generating a second set of PQC encryption attributes for encrypting the data. In some embodiments, the apparatus 200 may generate the second set of PQC encryption attributes based on the set of data attributes, the risk profile data structure, the change in the enveloped data structure, and the PQC cryptographic performance information. In some embodiments, the apparatus 200 may generate the second set of PQC encryption attributes based on a machine learning technique. In some embodiments, the apparatus 200 may generate the second set of PQC encryption attributes as described in more detail with reference to, by way of example, FIGS. 1-3.

As shown by operation 1510, the apparatus 200 includes means, such as PQC cryptographic circuitry 252 or the like, for encrypting the data. In some embodiments, the apparatus 200 may encrypt the data based on the second set of PQC encryption attributes. In one example, the apparatus 200 may decrypt the data based on the first set of PQC encryption attributes and then encrypt the data based on the second set of PQC encryption attributes. In another example, the apparatus 200 may double encrypt (e.g., double layer encryption; generation of an encryption wrapper based on the second set of PQC encryption attributes) the data based on the second set of PQC encryption attributes. In some embodiments, the apparatus 200 may encrypt the data as described in more detail with reference to, by way of example, FIGS. 1-3.

In some embodiments, operations 1502, 1504, 1506, 1508, and 1510 may not necessarily occur in the order depicted in FIG. 15, and in some cases one or more of the operations depicted in FIG. 15 may occur substantially simultaneously, or additional steps may be involved before, after, or between any of the operations shown in FIG. 15.

As noted above, methods, apparatuses, systems, and computer program products are described herein that provide for improved PQC for migrating classical information systems to quantum-resistant information systems using one or more of the PQC cryptographic techniques described herein. By doing so, data owners and hosting services are able to avoid the traditional problems surrounding migrating classical information systems to quantum-resistant information systems. For instance, through performance of the above operations, data owners and hosting services can use the PQC system described herein to identify PQC cryptographic techniques for reducing the attack surface of their cryptographic operations. In another instance, through performance of the above operations, data owners and hosting services can use the PQC system described herein to detect realized QC threats and, in response, identify PQC cryptographic techniques for reducing the attack surface of their cryptographic operations. Further, example embodiments described herein provide for migration of large volumes of data to quantum-resistant information systems that utilize PQC cryptographic techniques in a faster, cheaper, and less computing resource and data intensive manner. Accordingly, example embodiments described herein facilitate and streamline these migration processes so that data owners and hosting services may more quickly and easily migrate and maintain their data in a quantum-resistant PQC system before quantum computing capabilities are realized. Moreover, in some embodiments, example embodiments described herein facilitate the upgrading of complex, high volume data storage systems to use quantum-resistant PQC cryptographic techniques in a faster, cheaper, and less data and resource intensive manner.

QC Detection Based on a Digital Signature

Figure 16:
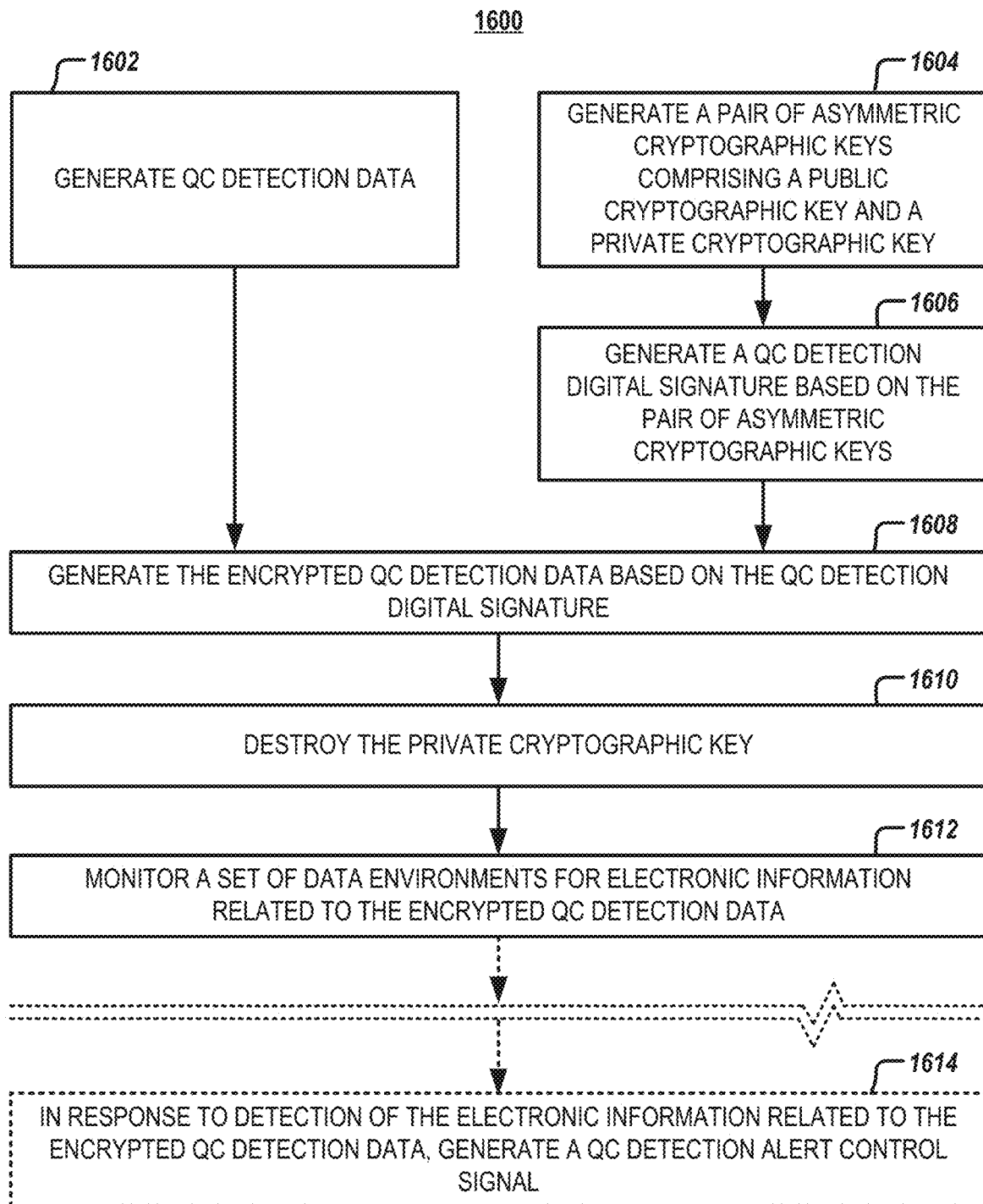
FIG. 16 illustrates an example flowchart for providing a first QC detection technique in accordance with some example embodiments described herein.

FIG. 16 illustrates an example flowchart 1600 that contains example operations for providing a first QC detection technique based on a digital signature (e.g., an RSA digital signature) in accordance with some example embodiments described herein. For example, the example flowchart 1600 may contain, among other operations, example operations for using a pair of RSA cryptographic keys to generate an RSA digital signature, destroying the RSA private key, and retaining the RSA public key. The operations illustrated in FIG. 16 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 15 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 229, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1602, the apparatus 200 includes means, such as the QC detection data generation circuitry 229 or the like, for generating QC detection data. In some embodiments, the apparatus 200 may generate the QC detection data as described in more detail with reference to FIGS. 1-3 and 20.

As shown by operation 1604, the apparatus 200 includes means, such as the cryptographic circuitry 248 or the like, for generating a pair of asymmetric cryptographic keys comprising a public cryptographic key and a private cryptographic key. In some embodiments, the pair of asymmetric cryptographic keys may be a pair of RSA, RSA-PSS, DSA, or ECDSA cryptographic keys. In some embodiments, the apparatus 200 may generate the pair of asymmetric cryptographic keys as described in more detail with reference to FIGS. 1-3 and 20.

As shown by operation 1606, the apparatus 200 includes means, such as the cryptographic circuitry 248 or the like, for generating a QC detection digital signature based on the pair of asymmetric cryptographic keys. In some embodiments, the QC detection digital signature may be a fictitious digital signature, such as a fictitious RSA, RSA-PSS, DSA, or ECDSA digital signature, and the pair of asymmetric cryptographic keys may be a pair of RSA asymmetric cryptographic keys. For example, the QC detection digital signature may be an RSA digital signature, and the pair of asymmetric cryptographic keys may be a pair of RSA cryptographic keys. In some embodiments, the apparatus 200 may generate the QC detection digital signature as described in more detail with reference to FIGS. 1-3 and 20.

As shown by operation 1608, the apparatus 200 includes means, such as the cryptographic circuitry 248 or the like, for generating digitally-signed QC detection data based on the QC detection digital signature. In some embodiments, the apparatus 200 may generate the digitally-signed QC detection data by signing the QC detection data with the QC detection digital signature. In some embodiments, the apparatus 200 may generate the digitally-signed QC detection data as described in more detail with reference to FIGS. 1-3 and 20.

As shown by operation 1610, the apparatus 200 includes means, such as the cryptographic circuitry 248 or the like, for destroying the private cryptographic key. In some embodiments, the apparatus 200 may be configured to destroy the private cryptographic key by overwriting, or zeroizing, all instances of the private cryptographic key. In some embodiments, the apparatus 200 may be configured to generate an electronic confirmation signal indicating that the private cryptographic key has been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy the private cryptographic key as described in more detail with reference to FIGS. 1-3 and 20.

As shown by operation 1612, the apparatus 200 includes means, such as the data monitoring circuitry 222 or the like, for monitoring a set of data environments for electronic information related to the digitally-signed QC detection data. In some embodiments, the apparatus 200 may monitor the set of data environments for the electronic information related to the digitally-signed QC detection data as described in more detail with reference to FIGS. 1-3 and 20.

Optionally, as shown by optional operation 1614, the apparatus 200 includes means, such as the data monitoring circuitry 222 or the like, for generating a QC detection alert control signal in response to detection of the electronic information related to the digitally-signed QC detection data. In some embodiments, the data monitoring circuitry 222 may be configured to detect electronic information related to the digitally-signed QC detection data, wherein the detected electronic information related to the digitally-signed QC detection data comprises a detected digital signature. In some embodiments, the data monitoring circuitry 222 may be configured to verify the detected digital signature based on the public cryptographic key. In some embodiments, the data monitoring circuitry 222 may be configured to generate the QC detection alert control signal in response to verification of the detected digital signature. In some embodiments, the data monitoring circuitry 222 may be further configured to generate a tampering alert control signal when the detected electronic information related to the digitally-signed QC detection data further comprises detected payload data that has been digitally signed based on the detected digital signature, the detected digital signature is the same as the QC detection digital signature, and the detected payload data is different from the QC detection data. In some embodiments, the tampering alert control signal may indicate, for example, that the QC detection data has been altered but signed using the same digital signature (e.g., in an instance in which the detected digital signature is correct, but the detected data is different from the QC detection data). For example, when the QC detection data comprises a fictitious stock transfer agreement comprising a first stock transfer attribute indicative of a first amount of transferred shares (e.g., 10 transferred shares), but the detected payload data comprises a detected stock transfer agreement comprising a second stock transfer attribute indicative of a second amount of transferred shares (e.g., 10,000 transferred shares) different from the first amount of transferred shares, the tampering alert control signal may indicate that the fictitious stock transfer agreement has been tampered with. In some embodiments, the apparatus 200 may generate the QC detection alert control signal as described in more detail with reference to FIGS. 1-3 and 20.

Optionally, the apparatus 200 includes means, such as the cryptographic circuitry 248 or the like, for generating a QC detection public cryptography key certificate (e.g., a fictitious public cryptography key certificate) based on the public cryptographic key and the QC detection digital signature. In some embodiments, the apparatus 200 may be configured to transmit the QC detection public cryptography key certificate to a remote device in an external data environment, such as a publicly accessible certificate authority, database, or content provider. In some embodiments, the apparatus 200 may be configured to receive a request for the QC detection public cryptography key certificate from a remote device, such as a remote client device or a remote server device. In response to receipt of the request for the QC detection public cryptography key certificate, the apparatus 200 may be configured to generate a flagged QC detection public cryptography key certificate comprising the QC detection public cryptography key certificate and an elevated monitoring flag that identifies the QC detection data for an elevated level of monitoring by the data monitoring circuitry 222.

In some embodiments, operations 1602, 1604, 1606, 1608, 1610, 1612, and 1614 may not necessarily occur in the order depicted in FIG. 16, and in some cases one or more of the operations depicted in FIG. 16 may occur substantially simultaneously, or additional steps may be involved before, after, or between any of the operations shown in FIG. 16.

QC Detection Based on a Symmetric Key Encrypted Based on an Asymmetric Key Pair

Figure 17:
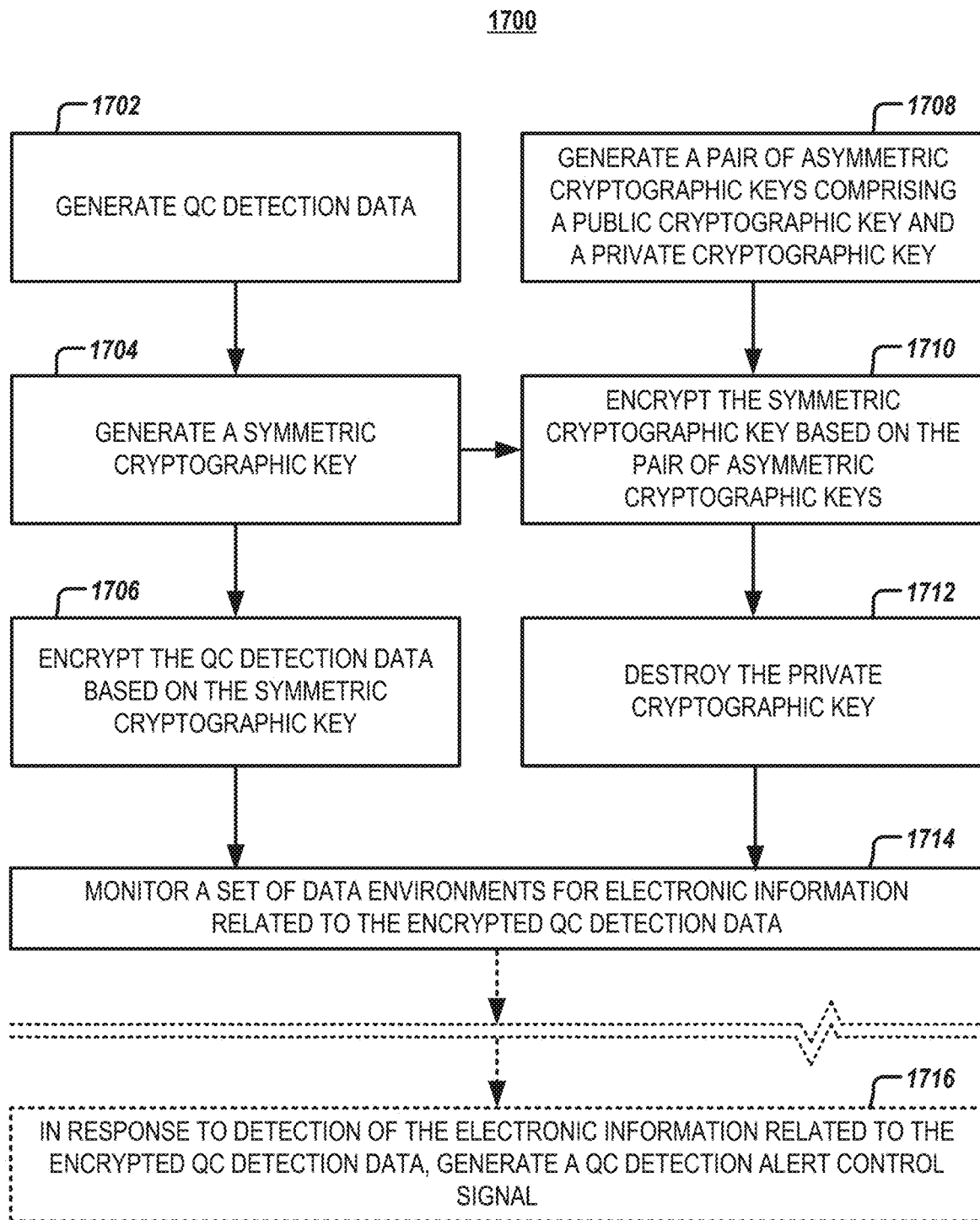
FIG. 17 illustrates an example flowchart for providing a second QC detection technique in accordance with some example embodiments described herein.

FIG. 17 illustrates an example flowchart 1700 that contains example operations for providing a second QC detection technique based on a pair of asymmetric cryptographic keys (e.g., an RSA key pair) used to encrypt a symmetric cryptographic key (e.g., an AES key) in accordance with some example embodiments described herein. For example, the example flowchart 1700 may contain, among other operations, example operations for using a pair of RSA cryptographic keys to encrypt an AES cryptographic key, destroying the RSA private key, and retaining the RSA public key. The operations illustrated in FIG. 17 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 15 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 229, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1702, the apparatus 200 includes means, such as the QC detection data generation circuitry 229 or the like, for generating QC detection data. In some embodiments, the apparatus 200 may generate the QC detection data as described in more detail with reference to FIGS. 1-3 and 20.

As shown by operation 1704, the apparatus 200 includes means, such as the cryptographic circuitry 248 or the like, for generating a symmetric cryptographic key. In some embodiments, the symmetric cryptographic key may be an AES cryptographic key. In some embodiments, the apparatus 200 may generate the symmetric cryptographic key as described in more detail with reference to FIGS. 1-3 and 20.

As shown by operation 1706, the apparatus 200 includes means, such as the cryptographic circuitry 248 or the like, for encrypting the QC detection data based on the symmetric cryptographic key. In some embodiments, the apparatus 200 may encrypt the QC detection data as described in more detail with reference to FIGS. 1-3 and 20.

As shown by operation 1708, the apparatus 200 includes means, such as the cryptographic circuitry 248 or the like, for generating a pair of asymmetric cryptographic keys comprising a public cryptographic key and a private cryptographic key. In some embodiments, the pair of asymmetric cryptographic keys may be a pair of RSA cryptographic keys. In some embodiments, the apparatus 200 may generate the pair of asymmetric cryptographic keys as described in more detail with reference to FIGS. 1-3 and 20.

As shown by operation 1710, the apparatus 200 includes means, such as the cryptographic circuitry 248 or the like, for encrypting the symmetric cryptographic key based on the pair of asymmetric cryptographic keys. In some embodiments, the apparatus 200 may encrypt an AES cryptographic key based on a pair of RSA cryptographic keys. In some embodiments, the apparatus 200 may encrypt the symmetric cryptographic key as described in more detail with reference to FIGS. 1-3 and 20.

As shown by operation 1712, the apparatus 200 includes means, such as the cryptographic circuitry 248 or the like, for destroying the private cryptographic key. In some embodiments, the apparatus 200 may be configured to destroy the private cryptographic key by overwriting, or zeroizing, all instances of the private cryptographic key. In some embodiments, the apparatus 200 may be configured to generate an electronic confirmation signal indicating that the private cryptographic key has been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy the private cryptographic key as described in more detail with reference to FIGS. 1-3 and 20.

As shown by operation 1714, the apparatus 200 includes means, such as the data monitoring circuitry 222 or the like, for monitoring a set of data environments for electronic information related to the decrypted QC detection data. In some embodiments, the apparatus 200 may monitor the set of data environments for the electronic information related to the decrypted QC detection data as described in more detail with reference to FIGS. 1-3 and 20.

Optionally, as shown by optional operation 1716, the apparatus 200 includes means, such as the data monitoring circuitry 222 or the like, for generating a QC detection alert control signal in response to detection of the electronic information related to the decrypted QC detection data. In some embodiments, the data monitoring circuitry 222 may be configured to detect electronic information related to the decrypted QC detection data, wherein the detected electronic information related to the decrypted QC detection data comprises decrypted QC detection data. In response to detection of decrypted QC detection data, the data monitoring circuitry 222 may be configured to generate a QC detection alert control signal indicating that a quantum computer having a particular set of capabilities was used to retrieve the symmetric cryptographic key (e.g., by implementing Shor's algorithm to retrieve the private key used to encrypt the symmetric cryptographic key) and decrypt the encrypted QC detection data. In some embodiments, the apparatus 200 may generate the QC detection alert control signal as described in more detail with reference to FIGS. 1-3 and 20.

Optionally, the apparatus 200 includes means, such as the cryptographic circuitry 248 or the like, for generating a QC detection public cryptography key certificate (e.g., a fictitious public cryptography key certificate) based on the public cryptographic key. In some embodiments, the apparatus 200 may be configured to transmit the QC detection public cryptography key certificate to a remote device in an external data environment, such as a publicly accessible certificate authority, database, or content provider. In some embodiments, the apparatus 200 may be configured to receive a request for the QC detection public cryptography key certificate from a remote device, such as a remote client device or a remote server device. In response to receipt of the request for the QC detection public cryptography key certificate, the apparatus 200 may be configured to generate a flagged QC detection public cryptography key certificate comprising the QC detection public cryptography key certificate and an elevated monitoring flag that identifies the QC detection data for an elevated level of monitoring by the data monitoring circuitry 222.

In some embodiments, operations 1702, 1704, 1706, 1708, 1710, 1712, 1714, and 1716 may not necessarily occur in the order depicted in FIG. 17, and in some cases one or more of the operations depicted in FIG. 17 may occur substantially simultaneously, or additional steps may be involved before, after, or between any of the operations shown in FIG. 17.

QC Detection Based on a Symmetric Key Generated Based on an Asymmetric Key Pair

Figure 18:
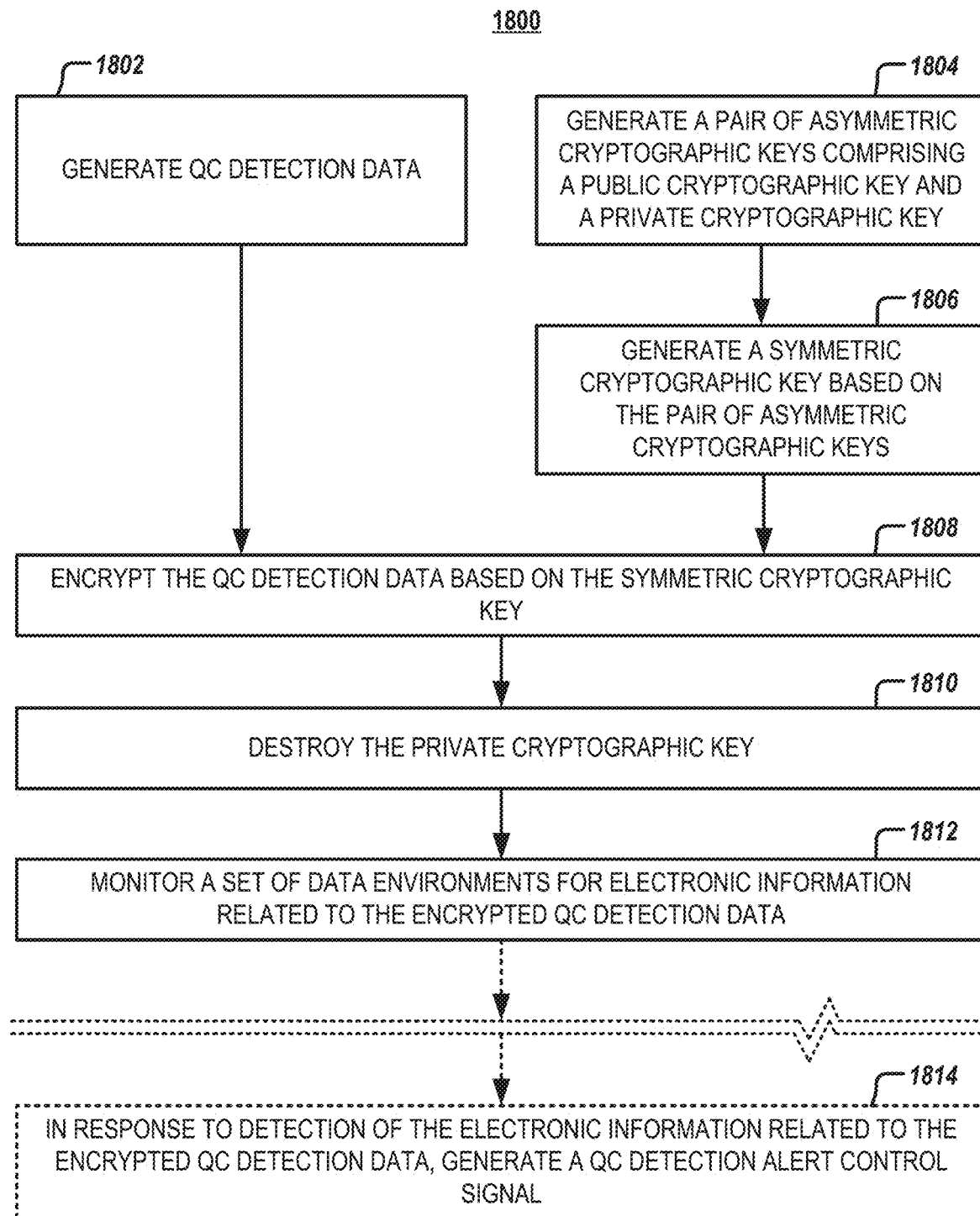
FIG. 18 illustrates an example flowchart for providing a third QC detection technique in accordance with some example embodiments described herein.

FIG. 18 illustrates an example flowchart 1800 that contains example operations for providing a third QC detection technique based on a symmetric cryptographic key (e.g., an AES key) generated based on a pair of asymmetric cryptographic keys (e.g., a DH key pair) in accordance with some example embodiments described herein. For example, the example flowchart 1800 may contain, among other operations, example operations for using a pair of DH cryptographic keys to generate an AES cryptographic key and destroying both the DH private key and the DH public key. The operations illustrated in FIG. 18 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 15 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 229, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1802, the apparatus 200 includes means, such as the QC detection data generation circuitry 229 or the like, for generating QC detection data. In some embodiments, the apparatus 200 may generate the QC detection data as described in more detail with reference to FIGS. 1-3 and 20.

As shown by operation 1804, the apparatus 200 includes means, such as the cryptographic circuitry 248 or the like, for generating a pair of asymmetric cryptographic keys comprising a public cryptographic key and a private cryptographic key. In some embodiments, the pair of asymmetric cryptographic keys may be a pair of DH cryptographic keys. In some embodiments, the apparatus 200 may generate the pair of asymmetric cryptographic keys as described in more detail with reference to FIGS. 1-3 and 20.

As shown by operation 1806, the apparatus 200 includes means, such as the cryptographic circuitry 248 or the like, for generating a symmetric cryptographic key based on the pair of asymmetric cryptographic keys. In some embodiments, the symmetric cryptographic key may be an AES cryptographic key. For example, the apparatus 200 may generate an AES cryptographic key based on a pair of DH cryptographic keys. In some embodiments, the apparatus 200 may generate the symmetric cryptographic key as described in more detail with reference to FIGS. 1-3 and 20.

As shown by operation 1808, the apparatus 200 includes means, such as the cryptographic circuitry 248 or the like, for encrypting the QC detection data based on the symmetric cryptographic key. In some embodiments, the apparatus 200 may encrypt the QC detection data as described in more detail with reference to FIGS. 1-3 and 20.

As shown by operation 1810, the apparatus 200 includes means, such as the cryptographic circuitry 248 or the like, for destroying the pair of asymmetric cryptographic keys. In some embodiments, the apparatus 200 may be configured to destroy the pair of asymmetric cryptographic keys by overwriting, or zeroizing, all instances of the private cryptographic key and the public cryptographic key. In some embodiments, the apparatus 200 may be configured to generate an electronic confirmation signal indicating that the pair of asymmetric cryptographic keys has been destroyed and transmit the electronic confirmation signal to a QC detection storage device, a remote device (e.g., a server device 110, a client device 112, a database server device 114, or a remote server device 116, any other suitable device, or a combination thereof. In some embodiments, the apparatus 200 may destroy the private cryptographic key as described in more detail with reference to FIGS. 1-3 and 20.

As shown by operation 1812, the apparatus 200 includes means, such as the data monitoring circuitry 222 or the like, for monitoring a set of data environments for electronic information related to the decrypted QC detection data. In some embodiments, the apparatus 200 may monitor the set of data environments for the electronic information related to the encrypted QC detection data as described in more detail with reference to FIGS. 1-3 and 20.

Optionally, as shown by optional operation 1814, the apparatus 200 includes means, such as the data monitoring circuitry 222 or the like, for generating a QC detection alert control signal in response to detection of the electronic information related to the encrypted QC detection data. In some embodiments, the apparatus 200 may generate the QC detection alert control signal as described in more detail with reference to FIGS. 1-3 and 20.

In some embodiments, operations 1802, 1804, 1806, 1808, 1810, 1812, and 1814 may not necessarily occur in the order depicted in FIG. 18, and in some cases one or more of the operations depicted in FIG. 18 may occur substantially simultaneously, or additional steps may be involved before, after, or between any of the operations shown in FIG. 18.

Figure 19:
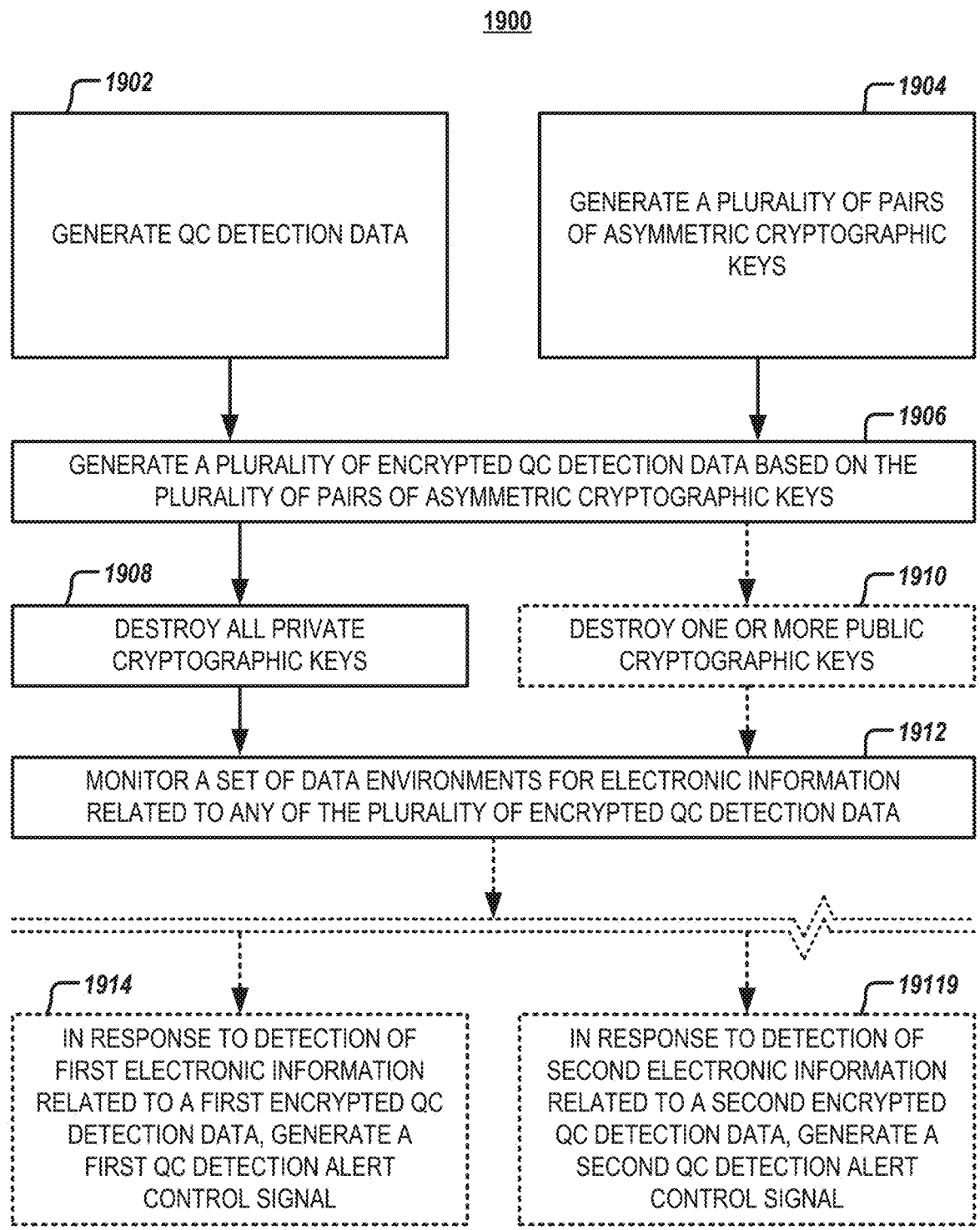
FIG. 19 illustrates an example flowchart for providing a fourth QC detection technique in accordance with some example embodiments described herein.

QC Detection Based on Multiple Cryptographic Techniques Having Staggered Key Sizes FIG. 19 illustrates an example flowchart 600 that contains example operations for providing a fourth QC detection technique based on multiple different cryptographic techniques (e.g., RSA as described with reference to FIGS. 16 and 17; DH, ECDH, or both as described with reference to FIG. 18; AES as described with reference to FIGS. 17 and 18) having staggered key (e.g., RSA-2048, RSA-3072; RSA-4096; DH-2048, DH-3072, DH-4096; ECDH-256, ECDH-384, ECDH-521; AES-192, AES-256, AES-512) in accordance with some example embodiments described herein. The operations illustrated in FIG. 19 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 15 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 229, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 1902, the apparatus 200 includes means, such as the QC detection data generation circuitry 229 or the like, for generating QC detection data. In some embodiments, the apparatus 200 may generate the QC detection data as described in more detail with reference to FIGS. 1-3, 16-18, and 20.

As shown by operation 1904, the apparatus 200 includes means, such as the cryptographic circuitry 248 or the like, for generating a plurality of pairs of asymmetric cryptographic keys, wherein each pair of asymmetric cryptographic keys in the plurality of pairs of asymmetric cryptographic keys comprises a respective public cryptographic key and a respective private cryptographic key. In some embodiments, each of the plurality of pairs of asymmetric cryptographic keys may correspond to a different cryptostrength, be associated with a different cryptographic technique, or both such that the apparatus 200 may determine the performance capabilities of a detected quantum computer. For example, the plurality of pairs of asymmetric cryptographic keys may comprise: a first pair of asymmetric cryptographic keys comprising a pair of 2048-bit RSA cryptographic keys; a second pair of asymmetric cryptographic keys comprising a pair of 3072-bit RSA cryptographic keys; a third pair of asymmetric cryptographic keys comprising a pair of 4096-bit RSA cryptographic keys; a fourth pair of asymmetric cryptographic keys comprising a pair of 2048-bit DH cryptographic keys; a fifth pair of asymmetric cryptographic keys comprising a pair of 3072-bit DH cryptographic keys; a sixth pair of asymmetric cryptographic keys comprising a pair of 4096-bit DH cryptographic keys; a seventh pair of asymmetric cryptographic keys comprising a pair of 256-bit ECDH cryptographic keys; an eighth pair of asymmetric cryptographic keys comprising a pair of 384-bit ECDH cryptographic keys; and a ninth pair of asymmetric cryptographic keys comprising a pair of 521-bit ECDH cryptographic keys. In some embodiments, the apparatus 200 may generate the plurality of pairs of asymmetric cryptographic keys as described in more detail with reference to FIGS. 13, 16-18, and 20.

As shown by operation 1906, the apparatus 200 includes means, such as the cryptographic circuitry 248 or the like, for generating a plurality of encrypted QC detection data based on the plurality of pairs of asymmetric cryptographic keys, wherein each encrypted QC detection data in the plurality of encrypted QC detection data is generated based on a respective pair of asymmetric cryptographic keys. In some embodiments, the apparatus 200 may generate the plurality of encrypted QC detection data based on: an RSA or RSA-PSS cryptographic technique as described with reference to FIGS. 16 and 17; a DH or ECDH cryptographic technique as described with reference to FIGS. 17 and 18; any other technique described herein; or any combination thereof. In some embodiments, as described with reference to FIGS. 4 and 18, the apparatus 200 may generate a subset of the plurality of encrypted QC detection data based on a plurality of symmetric cryptographic keys. In some embodiments, each of the plurality of symmetric cryptographic keys may correspond to a different cryptostrength, be associated with a different cryptographic technique, or both such that the apparatus 200 may determine the performance capabilities of a detected quantum computer. For example, the plurality of symmetric cryptographic keys may comprise: a first symmetric cryptographic key comprising a 192-bit AES cryptographic key; a second symmetric cryptographic key comprising a 256-bit AES cryptographic key; and a third symmetric cryptographic key comprising a 512-bit AES cryptographic key. In some embodiments, the apparatus 200 may generate the plurality of encrypted QC detection data as described in more detail with reference to FIGS. 1-3, 16-18, and 20.

As shown by operation 1908, the apparatus 200 includes means, such as the cryptographic circuitry 248 or the like, for destroying all of the private cryptographic keys in the plurality of pairs of asymmetric cryptographic keys. In some embodiments, the apparatus 200 may be configured to destroy all of the private cryptographic keys by overwriting, or zeroizing, all instances of the private cryptographic keys.

In some embodiments, the apparatus 200 may be configured to generate an electronic confirmation signal indicating that all of the private cryptographic keys have been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy all of the private cryptographic keys as described in more detail with reference to FIGS. 1-18 and 7.

As shown by operation 1910, the apparatus 200 includes means, such as the cryptographic circuitry 248 or the like, for destroying one or more of the public cryptographic keys in the plurality of pairs of asymmetric cryptographic keys. In some embodiments, the apparatus 200 may be configured to destroy one or more of the public cryptographic keys by overwriting, or zeroizing, all instances of the one or more public cryptographic keys. In some embodiments, the apparatus 200 may be configured to generate an electronic confirmation signal indicating that the one or more public cryptographic keys have been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy one or more of the public cryptographic keys as described in more detail with reference to FIGS. 1-18 and 7.

As shown by operation 1912, the apparatus 200 includes means, such as the data monitoring circuitry 222 or the like, for monitoring a set of data environments for electronic information related to any of the plurality of encrypted QC detection data. In some embodiments, the apparatus 200 may monitor the set of data environments for the electronic information related to any of the plurality of encrypted QC detection data as described in more detail with reference to FIGS. 1-18 and 7.

Optionally, as shown by optional operation 1914, the apparatus 200 includes means, such as the data monitoring circuitry 222 or the like, for generating a first QC detection alert control signal in response to detection of first electronic information related to a first encrypted QC detection data. In some embodiments, the apparatus 200 may generate the first QC detection alert control signal as described in more detail with reference to FIGS. 1-18 and 7.

Optionally, as shown by optional operation 1916, the apparatus 200 includes means, such as the data monitoring circuitry 222 or the like, for generating a second QC detection alert control signal in response to detection of second electronic information related to a second encrypted QC detection data. In one illustrative example, wherein the QC detection data is first QC detection data, the pair of asymmetric cryptographic keys is a first pair of asymmetric cryptographic keys having a first key length for a first cryptographic technique (e.g., RSA-16072), wherein the public cryptographic key is a first public cryptographic key, wherein the private cryptographic key is a first private cryptographic key, wherein the encrypted QC detection data is first encrypted QC detection data, wherein the electronic information related to the encrypted or unencrypted QC detection data is first electronic information related to the encrypted or unencrypted first QC detection data, and wherein the QC detection alert control signal is a first QC detection alert control signal, the cryptographic circuitry 248 may be configured to: generate a second pair of asymmetric cryptographic keys having a second key length for the first cryptographic technique (e.g., RSA-4096), wherein the second pair of asymmetric cryptographic keys comprises a second public cryptographic key and a second private cryptographic key, and wherein the second key length (e.g., 4096 bits) is different from the first key length (e.g., 3072 bits); generate second encrypted QC detection data based on the second pair of asymmetric cryptographic keys; and destroy the second private cryptographic key. Subsequently, the data monitoring circuitry 222 may be configured to monitor the set of data environments for second electronic information related to the second encrypted or unencrypted QC detection data and, in response to detection of the second electronic information related to the encrypted or unencrypted QC detection data, generate a second QC detection alert control signal (e.g., RSA-4096 has been compromised by a quantum computer and thus is now longer secure) different from the first QC detection alert control signal (e.g., RSA-16072 has been compromised by a quantum computer and thus is now longer secure). In some embodiments, the apparatus 200 may generate the second QC detection alert control signal as described in more detail with reference to FIGS. 1-3 and 16-20.

In some embodiments, operations 1902, 1904, 1906, 1908, 1910, 1912, 1914, and 1916 may not necessarily occur in the order depicted in FIG. 19, and in some cases one or more of the operations depicted in FIG. 19 may occur substantially simultaneously, or additional steps may be involved before, after, or between any of the operations shown in FIG. 19.

Having described specific components of example devices and circuitries involved in various embodiments contemplated herein, example procedures for data leakage, tampering, and QC detection are described below in connection with FIG. 20.

Example Operations for QC Detection

Figure 20:
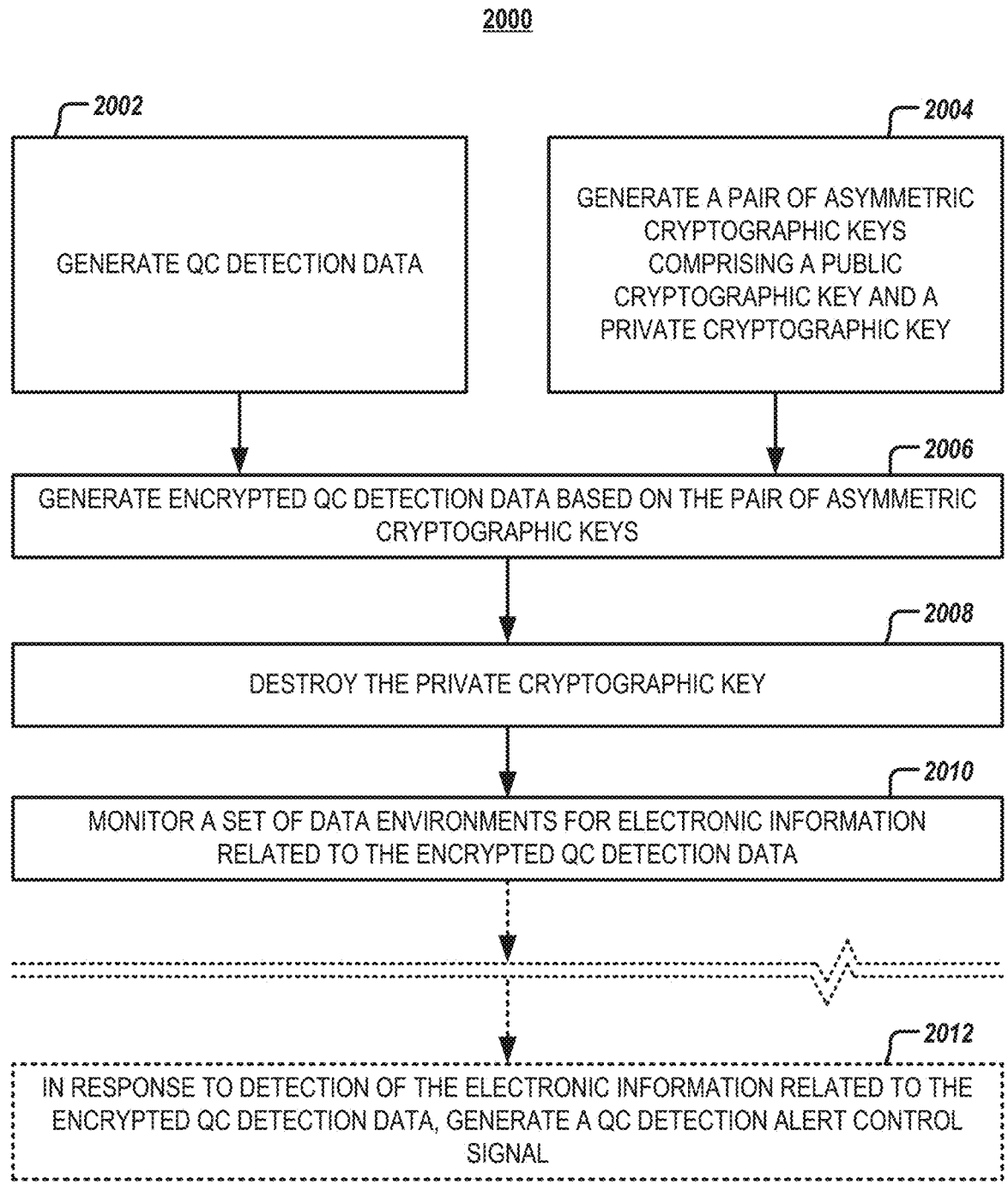
FIG. 20 illustrates an example flowchart for providing an example flowchart for providing QC detection in accordance with some example embodiments described herein.

FIG. 20 illustrates an example flowchart 2000 that contains example operations for QC detection in accordance with some example embodiments described herein. The operations illustrated in FIG. 20 may, for example, be performed by one or more components described with reference to PQC system 102 shown in FIG. 1; by a server device 110, a client device 112, a database server device 114, or a remote server device 116 in communication with PQC system 102; by apparatus 200 shown in FIG. 2A; by apparatus 280 shown in FIG. 2B; by apparatus 290 shown in FIG. 2C; by one or more components described with reference to PQC system 302 shown in FIG. 3A, 3B, 3C, 3D, or 3E; by a client device 320, client device 330, PoS device 338, PQC add-on device 342, PQC add-on device 352, or client device 360 in communication with PQC system 302; or by any combination thereof. In some embodiments, the various operations described in connection with FIG. 15 may be performed by the apparatus 200 by or through the use of one or more of processing circuitry 202, processing circuitry 202, memory 204, input-output circuitry 206, PQC callback circuitry 207, communications circuitry 208, classical communications circuitry 210, quantum communications circuitry 212, data attribute generation circuitry 229, data envelope generation circuitry 216, data structure generation circuitry 218, data monitoring circuitry 220, data access monitoring circuitry 222, data zone monitoring circuitry 224, policy attribute generation circuitry 226, risk profile generation circuitry 228, QC detection data generation circuitry 229, vulnerability scan circuitry 230, vulnerability score generation circuitry 232, compliance score generation circuitry 234, threat level generation circuitry 235, cryptographic performance circuitry 236, data route identification circuitry 237, non-PQC cryptographic performance circuitry 238, PQC cryptographic performance circuitry 240, cryptographic attribute generation circuitry 242, non-PQC cryptographic attribute generation circuitry 244, PQC cryptographic attribute generation circuitry 246, cryptographic circuitry 248, non-PQC cryptographic circuitry 250, PQC cryptographic circuitry 252, cryptograph optimization circuitry 254, data storage circuitry 256, UI circuitry 258, PQC shim circuitry 260, gateway circuitry 264, concentrator circuitry 266, store controller circuitry 268, terminal manager circuitry 270, PoS software upgrade circuitry 272, HSM circuitry 274, any other suitable circuitry, and any combination thereof.

As shown by operation 2002, the apparatus 200 includes means, such as the QC detection data generation circuitry 229 or the like, for generating QC detection data. In some embodiments, the apparatus 200 may generate the QC detection data as described in more detail with reference to FIGS. 1-3 and 16-19.

As shown by operation 2004, the apparatus 200 includes means, such as the cryptographic circuitry 248 or the like, for generating a pair of asymmetric cryptographic keys comprising a public cryptographic key and a private cryptographic key. In some embodiments, the apparatus 200 may generate the pair of asymmetric cryptographic keys as described in more detail with reference to FIGS. 1-3 and 16-19.

As shown by operation 706, the apparatus 200 includes means, such as the cryptographic circuitry 248 or the like, for generating encrypted QC detection data based on the pair of asymmetric cryptographic keys. In some embodiments, the apparatus 200 may generate the encrypted QC detection data as described in more detail with reference to FIGS. 1-3 and 16-19.

As shown by operation 2008, the apparatus 200 includes means, such as the cryptographic circuitry 248 or the like, for destroying the private cryptographic key. In some embodiments, the apparatus 200 may destroy the private cryptographic key as described in more detail with reference to FIGS. 1-3 and 16-19.

As shown by operation 710, the apparatus 200 includes means, such as the data monitoring circuitry 222 or the like, for monitoring a set of data environments for electronic information related to the encrypted QC detection data. In some embodiments, the apparatus 200 may monitor the set of data environments for the electronic information related to the encrypted QC detection data as described in more detail with reference to FIGS. 1-3 and 16-19.

Optionally, as shown by optional operation 2012, the apparatus 200 includes means, such as the data monitoring circuitry 222 or the like, for generating a QC detection alert control signal in response to detection of the electronic information related to the encrypted QC detection data. In some embodiments, the apparatus 200 may generate the QC detection alert control signal as described in more detail with reference to FIGS. 1-3 and 16-19.

In some embodiments, operations 2002, 2004, 2006, 2008, 2010, and 2012 may not necessarily occur in the order depicted in FIG. 20, and in some cases one or more of the operations depicted in FIG. 20 may occur substantially simultaneously, or additional steps may be involved before, after, or between any of the operations shown in FIG. 20.

FIGS. 12-20 thus illustrate flowcharts describing the operation of various systems (e.g., PQC system 102 described with reference to FIG. 1; PQC system 302 described with reference to FIGS. 3A, 3B, 3C, 3D, and 3E), apparatuses (e.g., apparatus 200 described with reference to FIG. 2A; apparatus 280 described with reference to FIG. 2B; apparatus 290 described with reference to FIG. 2C), methods (e.g., flowchart 1100 described with reference to FIG. 11; flowchart 1200 described with reference to FIG. 12; flowchart 1300 described with reference to FIG. 13; flowchart 1400 described with reference to FIG. 14; flowchart 1500 described with reference to FIG. 15; flowchart 1600 described with reference to FIG. 16; flowchart 1700 described with reference to FIG. 17; flowchart 1800 described with reference to FIG. 18; flowchart 1900 described with reference to FIG. 19; flowchart 2000 described with reference to FIG. 20), and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 9 and 12-20 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the PQC system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for post-quantum cryptography (PQC), the system comprising:
data monitoring circuitry configured to:
monitor an enveloped data structure, wherein (i) the enveloped data structure comprises data and (ii) the data is encrypted using a first cryptographic technique that was selected based on a set of PQC encryption attributes, and
identify a change in the enveloped data structure, wherein the identified change includes a change within an associated risk profile;
PQC performance circuitry configured to:
in response to the identified change, retrieve PQC cryptographic performance information, wherein the PQC cryptographic performance information is associated with a set of PQC cryptographic techniques;
PQC cryptographic attribute generation circuitry configured to:
generate a second set of PQC encryption attributes; and
PQC cryptographic circuitry configured to:
encrypt the data using a second cryptographic technique selected based on the second set of PQC encryption attributes.

2. The system of claim 1, wherein the PQC cryptographic circuitry is further configured to, prior to encrypting the data based on the second set of PQC encryption attributes, decrypt the data based on the set of PQC encryption attributes.

3. The system of claim 1, wherein the second set of PQC encryption attributes is generated based on one or more of (i) a set of data attributes, (ii) a risk profile data structure, (iii) PQC cryptographic performance information, or (iv) the change in the enveloped data structure.

4. The system of claim 1, wherein the enveloped data structure further comprises a data envelope and the data envelope comprises one or more of a set of data attributes about the data, a risk profile indicative of a vulnerability of the data in a PQC data environment.

5. The system of claim 1, further comprising data attribute generation circuitry configured to generate a cryptographic spawn log, wherein the cryptographic spawn log comprises a timestamp and information indicative of the set of PQC encryption attributes used to encrypt the data.

6. The system of claim 5, wherein the data attribute generation circuitry is further configured to update the cryptographic spawn log, wherein the updated cryptographic spawn log comprises a second timestamp and information indicative of the second set of PQC encryption attributes used to encrypt the data.

7. The system of claim 1, wherein the PQC cryptographic performance information comprises a set of PQC cryptographic performance attributes for one or more PQC cryptographic techniques in a set of PQC cryptographic techniques.

8. The system of claim 1, further comprising: cryptograph optimization circuitry configured to:
train a cryptograph optimization machine learning model based on a set of cryptograph optimization training data, wherein the set of cryptograph optimization training data comprises cryptographic performance information,
wherein the second set of PQC encryption attributes are generated based on the cryptograph optimization machine learning model.

9. The system of claim 1, wherein the data monitoring circuitry is configured to identify the change in the enveloped data structure in response to determining the data has transitioned from a first data zone to a second data zone.

10. The system of claim 1, wherein the data monitoring circuitry is configured to identify the change in the enveloped data structure in response to determining a change in a risk profile data structure associated with the data.

11. The system of claim 1, wherein the identified change in the enveloped data structure is a at least one: (I) of change in a value of the data, (ii) a change in a longevity of the data, (iii) a change in a cryptostrength of the data, (Iv) a change in a vulnerability score value associated with the data, (v) a change in a compliance score value associated with the data, (vi) a change in an approximate time to a quantum computing threat, or (vii) a change in exogenous data associated with the data.

12. The system of claim 1, further comprising:
data attribute generation circuitry configured to generate a set of data attributes for the data based on the data; and
data access monitoring circuitry configured to determine that the data has been accessed at a second time later than a first time,
wherein the data attribute generation circuitry is further configured to generate a second set of data attributes about the data based on the data and the determination that the data has been accessed at the second time.

13. The system of claim 12, further comprising:
data envelope generation circuitry configured to generate a second data envelope based on the second set of data attributes; and
data structure generation circuitry configured to generate a second enveloped data structure based on the second data envelope and the data.

14. The system of claim 12, wherein (I) the set of data attributes comprises a first data lineage data attribute indicative of a first data lineage of the data, (ii) the second set of data attributes comprises a second data lineage data attribute indicative of a second data lineage of the data, and (iii) the first data lineage data attribute is different from the second data lineage data attribute.

15. The system of claim 14, wherein (i) the first cryptographic technique is a non-PQC cryptographic technique and (ii) the second cryptographic technique is a PQC cryptographic technique.

16. The system of claim 1, wherein (i) the first cryptographic technique is a PQC cryptographic technique and (ii) the second cryptographic technique is a PQC cryptographic technique that is different from the first cryptographic technique.

17. The system of claim 1, further comprising: infoPQC circuitry configured to generate the PQC cryptographic performance information based on an analysis of a performance of one or more PQC cryptographic techniques.

18. The system of claim 1, further comprising:
policy attribute generation circuitry configured to:
retrieve policy information associated with received data, wherein
the policy information comprises one or more of (i) compliance requirements, (ii) policies, (iii) regulations, (iv) regulatory classifications, (v) industry, (vi) time to quantum computing threat, or (vii) dependencies on an encryption level for the received data, and
generate a set of policy attributes for the data based on the policy information; and
risk profile generation circuitry configured to generate a risk profile data structure based on the set of policy attributes, wherein the risk profile data structure is indicative of a vulnerability of the data in a PQC data environment.

19. A method for post-quantum cryptography (PQC), the method comprising:
- monitoring an enveloped data structure, wherein (i) the enveloped data structure comprises data and (ii) the data is encrypted using a first cryptographic technique that was selected based on a set of PQC encryption attributes;
- identifying a change in the enveloped data structure, wherein the identified change includes a change within an associated risk profile;
- in response to the identified change, retrieving PQC cryptographic performance information, wherein the PQC cryptographic performance information is associated with a set of PQC cryptographic techniques;
- generating a second set of PQC encryption attributes; and
- encrypting the data using a second cryptographic technique selected based on the second set of PQC encryption attributes.

20. A computer program product for post-quantum cryptography (PQC), the computer program product comprising at least one non-transitory computer-readable storage medium storing program instructions that, when executed, cause a system to:
- monitor an enveloped data structure, wherein (i) the enveloped data structure comprises data and (ii) the data is encrypted using a first cryptographic technique that was selected based on a set of PQC encryption attributes;
- identify a change in the enveloped data structure, wherein the identified change includes a change within an associated risk profile;
- in response to the identified change, retrieve PQC cryptographic performance information, wherein the PQC cryptographic performance information is associated with a set of PQC cryptographic techniques;
- generate a second set of PQC encryption attributes; and
- encrypt the data using a second cryptographic technique selected based on the second set of PQC encryption attributes.

* * * * *